US009702449B2

(12) United States Patent
Honda

(10) Patent No.: US 9,702,449 B2
(45) Date of Patent: Jul. 11, 2017

(54) POWER PLANT

(71) Applicant: HONDA MOTOR CO., LTD., Tokyo (JP)

(72) Inventor: Kenji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/112,357

(22) PCT Filed: Jan. 31, 2014

(86) PCT No.: PCT/JP2014/052210
§ 371 (c)(1),
(2) Date: Jul. 18, 2016

(87) PCT Pub. No.: WO2015/114795
PCT Pub. Date: Aug. 6, 2015

(65) Prior Publication Data
US 2016/0341295 A1 Nov. 24, 2016

(51) Int. Cl.
*F16H 48/10* (2012.01)
*F16H 48/36* (2012.01)
(Continued)

(52) U.S. Cl.
CPC ............ *F16H 48/36* (2013.01); *F16H 48/06* (2013.01); *F16H 48/10* (2013.01); *F16H 48/30* (2013.01);
(Continued)

(58) Field of Classification Search
CPC .......... F16H 48/36; F16H 48/06; F16H 48/10; F16H 48/30
See application file for complete search history.

(56) References Cited

U.S. PATENT DOCUMENTS 6,098,737 A * 8/2000 Aoki ...................... B60K 6/365
180/242
7,311,631 B2 * 12/2007 Kushino ................ B60K 6/365
475/221
(Continued)

FOREIGN PATENT DOCUMENTS

JP 4637136 B2 2/2011
JP 2011-237019 A 11/2011
(Continued)

OTHER PUBLICATIONS

International Search Report dated Apr. 8, 2014, issued in counterpart International Application No. PCT/JP2014/052210 (1 page).
(Continued)

*Primary Examiner* — Derek D Knight
(74) *Attorney, Agent, or Firm* — Westerman, Hattori, Daniels & Adrian, LLP

(57) ABSTRACT

Triple pinion gears each of which is comprised of integrally formed first to third pinion gears, and additional pinion gears rotatably supported by a rotatable carrier. The additional pinion gears mesh with a sun gear and associated ones of third pinion gears, and first and second pinion gears mesh with first and second ring gears, respectively. The rotational speeds of four rotary elements of the carrier, the sun gear, and the first and second ring gears satisfy a collinear relationship in which the rotational speeds thereof are aligned in a single straight line in a collinear chart. The sun gear and the carrier, positioned at opposite outer sides of the straight line in the collinear chart, respectively, are connected to first and second rotating electric machines, respectively, and the second and first ring gears, positioned adjacent to the two, respectively, are connected to left and right output shafts and, respectively.

6 Claims, 20 Drawing Sheets

(51) Int. Cl.
*F16H 48/06* (2006.01)
*F16H 48/30* (2012.01)

(52) U.S. Cl.
CPC .. *F16H 2048/104* (2013.01); *F16H 2048/108* (2013.01); *F16H 2048/364* (2013.01)

(56) References Cited

U.S. PATENT DOCUMENTS

| | | | |
|---|---|---|---|
| 8,585,525 B2 * | 11/2013 | Ushiroda | B60K 1/02 180/65.6 |
| 9,133,925 B2 * | 9/2015 | Honda | B60K 6/365 |
| 9,248,732 B2 * | 2/2016 | Honda | B60K 6/52 |
| 9,494,218 B2 * | 11/2016 | Honda | F16H 3/727 |
| 2007/0021262 A1 * | 1/2007 | Honda | B60K 23/04 475/204 |
| 2009/0038866 A1 * | 2/2009 | Abe | B60K 1/02 180/65.7 |
| 2010/0041502 A1 * | 2/2010 | Nagamatsu | B60K 6/365 475/5 |
| 2011/0281684 A1 | 11/2011 | Ushiroda et al. | |

FOREIGN PATENT DOCUMENTS

| | | |
|---|---|---|
| JP | 5153587 B2 | 2/2013 |
| WO | 2013/065636 A1 | 5/2013 |
| WO | 2013/146467 A1 | 10/2013 |

OTHER PUBLICATIONS

Written Opinion dated Apr. 8, 2014, issued in counterpart International Application No. PCT/JP2014/052210, w/English translation (6 pages).

* cited by examiner

POWER PLANT

TECHNICAL FIELD

This invention relates to a power plant for driving two driven parts for propelling a means of transportation.

BACKGROUND ART

Conventionally, as a power plant of this kind, there has been known one disclosed e.g. in PTL 1. In this power plant, a differential gear unit including first to fourth rotary elements is formed by combining first and second planetary gear units of a so-called single pinion type with each other. The rotational speeds of the first to fourth rotary elements satisfy a collinear relationship in which the rotational speeds are aligned in a single straight line in a collinear chart, in the mentioned order. Specifically, the first planetary gear unit includes a first sun gear, first pinion gears, a first carrier, and a first ring gear, and the second planetary gear unit includes a second sun gear, second pinion gears, a second carrier, and a second ring gear. The first sun gear and the second carrier are connected to each other via a hollow cylindrical first rotating shaft, and the first carrier and the second sun gear are connected to each other via a solid second rotating shaft. Further, the second rotating shaft is rotatably disposed within the first rotating shalt.

In the differential gear unit constructed as above, the first ring gear corresponds to the first rotary element, the first carrier and the second sun gear connected to each other correspond to the second rotary element, the first sun gear and the second carrier connected to each other correspond to the third rotary element, and the second ring gear corresponds to the fourth rotary element. Further, this conventional power plant is installed on a four-wheel vehicle, with the first rotary element connected to a first rotating electric machine, the second rotary element connected to a left drive wheel, the third rotary element connected to a right drive wheel, and the fourth rotary element connected to a second rotating electric machine. In the power plant, by controlling the first and second rotating electric machines, torque distributed to the left and right drive wheels is controlled.

Further, as the conventional power plant of the above-described kind, there has been known one disclosed e.g. in PTL 2. This conventional power plant is formed by combining first to third planetary gear units of the single: pinion type with each other, and includes first to fifth rotary elements that can transmit motive power therebetween. These first to fifth rotary elements are configured such that the rotational speeds thereof satisfy a collinear relationship, and in a collinear chart representing the collinear relationship, the rotational speeds of the first to fifth rotary elements are aligned in a single straight line, in the mentioned order. Specifically, the first planetary gear unit includes a first sun gear, first pinion gears, a first carrier, and a first ring gear, and the second planetary gear unit includes a second sun gear, second pinion gears, a second carrier, and a second ring gear. The third planetary gear unit includes a third sun gear, third pinion gears, a third carrier, and a third ring gear. The first carrier and the third ring gear are connected to each other via a hollow cylindrical first connecting portion, and the first ring gear and the third carrier are connected to each other via a cylindrical second connecting portion. Further, the third carrier and the second ring gear are connected to each other via a hollow cylindrical third connecting portion, and the second carrier and the third sun gear are connected to each other via a solid rotating shaft. Thus, the first to fifth rotary elements are formed.

Further, the power plant disclosed in PTL 2 is installed on a four-wheel vehicle, with the first rotary element connected to a first rotating electric machine, the second rotary element connected to a left drive wheel, the third rotary element connected to an engine, the fourth rotary element connected to a right drive wheel, and the fifth rotary element connected to a second rotating electric machine. By controlling the first and second rotating electric machines, torque distributed to the left and right drive wheels is controlled.

CITATION LIST

Patent Literature

[PTL 1] Publication of Japanese Patent No. 46377135 (FIG. 2, etc.)

[PTL 2] Publication of Japanese Patent No. 5153587 (FIG. 2, etc.)

SUMMARY OF INVENTION

Technical Problem

In the above-described power plant disclosed in PTL 1, to form the first to fourth rotary elements, the eight rotary elements formed by the first and second sun gears, the first and second pinion gears, the first and second carriers, and the first and second ring gears, and the first rotating shaft connecting the first sun gear and the second carrier to each other, and the second rotating shaft connecting the first carrier and the second sun gear to each other are required, i.e. ten component parts in total are required. Thus, the number of the elements forming the power plant is relatively large, which leads to an increased size, an increased weight, and increased manufacturing costs of the power plant.

In the above-described power plant disclosed in PTL 2, to form the first to fifth rotary elements, the twelve rotary elements formed by the first to third sun gears, the first to third pinion gears, the first to third carriers, and the first to third ring gears, and the first to third connecting portions and rotating shafts connecting the gears and the like to each other are required, i.e. sixteen component parts in total are required. Thus, similar to the case of PTL 1, the number of the elements forming the power plant is relatively large, which leads to an increased size, an increased weight, and increased manufacturing costs of the power plant.

The present invention has been made to provide a solution to the above-described problems, and an object thereof is to provide a power plant which is capable of achieving downsizing, weight reduction, and manufacturing cost reduction thereof.

Solution to Problem

To attain the above object, the invention according to claim 1 is a power plant for driving two driven parts (left and right output shafts SL, SR) for propelling a means of transportation (vehicle V in the embodiment (hereinafter, the same applies throughout this section)), comprising a first energy input/output unit (first rotating electric machine 11) that is capable of inputting and outputting rotational energy, a second energy input/output unit (second rotating electric machine 12) that is capable of inputting and outputting rotational energy, a differential gear unit GSF, wherein the differential gear unit GSF includes a rotatable carrier 31, a triple pinion gear 32 that is formed by a first pinion gear P1, a second pinion gear P2, and a third pinion gear P3 which are externally-toothed gears integrally formed with each other, and is rotatably supported by the carrier 31, a first gear (first ring gear R1) that is one of a first sun gear which is formed by an externally-toothed gear and is provided, in a manner associated with the first pinion gear P1, radially inward of the first pinion gear P1, and a first ring gear R1 which is formed by an internally-toothed gear and is provided, in a manner associated with the first pinion gear, radially outward of the first pinion gear, a second gear (second ring gear R2) that is one of a second sun gear which is formed by an externally-toothed gear and is provided, in a manner associated with the second pinion gear P2, radially inward of the second pinion gear P2, and a second ring gear R2 which is formed by an internally-toothed gear and is provided, in a manner associated with the second pinion gear P2, radially outward of the second pinion gear P2, a third gear (sun gear S) that is one of a third sun gear (sun gear S) which is formed by an externally-toothed gear and is provided, in a manner associated with the third pinion gear P3, radially inward of the third pinion gear P3, and a third ring gear which is formed by an internally-toothed gear and is provided, in a manner associated with the third pinion gear P3, radially outward of the third pinion gear P3, and an additional pinion gear 33 that is in mesh with at least one of the first to third pinion gears P1 to P3, and one of the first to third gears associated with the at least one, the additional pinion gear being rotatably supported by the carrier 31, wherein the first pinion gear P1 is in mesh with the first gear, when the additional pinion gear 33 is not in mesh with either of the first pinion gear P1 and the first gear, wherein the second pinion gear P2 is in mesh with the second gear, when the additional pinion gear 33 is not in mesh with either of the second pinion gear P2 and the second gear, wherein the third pinion gear P3 is in mesh with the third gear, when the additional pinion gear is not in mesh with either of the third pinion gear P3 and the third gear, wherein rotational speeds of four rotary elements formed by the carrier 31 and the first to third gears satisfy a collinear relationship in which the rotational speeds are aligned in a single straight line in a collinear chart, and wherein out of the four rotary elements, first and second outer rotary elements (sun gear S, carrier 31) that are positioned at opposite outer sides of the straight line in the collinear chart, respectively, are mechanically connected to the first and second energy input/output units, respectively, and first and second quasi-outer rotary elements (second ring gear R2, first ring gear R1) that are positioned adjacent to the first and second outer rotary elements, respectively, are mechanically connected to one and the other of the two driven parts, respectively (FIG. 18, FIG. 19).

With this configuration, the differential gear unit includes the rotatable carrier, the triple pinion gear that is formed by the first to third pinion gears integrally formed with each other, the first to third gears, and the additional pinion gear. The first gear is one of the first sun gear and the first ring gear that are provided in a manner associated with the first pinion gear, the second gear is one of the second sun gear and the second ring gear that are provided in a manner associated with the second pinion gear, and the third gear is one of the third sun gear and the third ring gear that are provided in a manner associated with the third pinion gear. The first to third sun gears are formed by externally-toothed gears, and the first to third ring gears are formed by internally-toothed gears. Further, the triple pinion gear and the additional pinion gear are rotatably supported by the carrier, and the additional pinion gear is in mesh with at least one of the first to third pinion gears, and one of the first to third gears associated with the at least one. Further, associated ones of gears of the first to third pinion gears and the first to third gears, with which the additional pinion gear is not in mesh, are in mesh with each other.

The four rotary elements are formed by the carrier and the first to third gears, and the rotational speeds of the four rotary elements are in the collinear relationship in which the rotational speeds are aligned in a single straight line in the collinear chart. Here, since the additional pinion gear is for changing a position or positions of one or two of the first to third gears with respect to the carrier in the collinear chart, two additional pinion gears at the maximum are enough. Specifically, with the above-described configuration, seven component parts at the maximum which are formed by the carrier, the triple pinion gear, the first to third gears, and the two additional pinion gears are sufficient for forming the four rotary elements, and six component parts at the minimum are sufficient for the same. As described above, differently from the above-described case of PTL 1, it is possible to dispense with the first and second rotating shafts for connecting various rotary elements to each other, and a differential gear unit equivalent to the differential gear unit of the power plant disclosed in PTL 1 can be formed by the six or seven component parts smaller in number than the number (10) of the component parts of the power plant disclosed in PTL 1. Therefore, it is possible to reduce the number of component parts of the whole power plant, thereby making it possible to attain downsizing, weight reduction, and manufacturing cost reduction of the power plant.

Further, out of the four rotary elements, the first and second outer rotary elements, which are positioned on opposite outer sides of the collinear chart respectively, are mechanically connected to the first and second energy input/output units respectively, and the first and second quasi-outer rotary elements that are positioned adjacent to the first and second outer rotary elements, respectively, are mechanically connected to the one and the other of the two driven parts, respectively. This makes it possible to transmit the rotational energy output from the first and second energy input/output units to the two driven parts via the differential gear unit, and properly drive the two driven parts. In this case, as described above, the rotational speeds of the four rotary elements are in the collinear relationship with each other, and hence by controlling input and output of rotational energy to and from the first and second energy input/output units, it is possible to properly control rotational energy (torque) distributed to the two driven parts.

The invention according to claim 2 is the power plant according to claim 1, wherein the differential gear unit GS further includes a fourth gear (sun gear S) that is one of the first to third sun gears and the first to third ring gears R1 to R3, other than the first to third gears, wherein the additional pinion gear 33 is in mesh with the at least one of the first to third pinion gears P1 to P3, and the first to fourth gears (first ring gear R1, second ring gear R2, third ring gear R3, sun gear S) associated with the at least one, wherein one of the first to third pinion gears P1 to P3 with which the fourth gear is associated, is in mesh with the fourth gear, when the additional pinion gear 33 is not in mesh with either of the one of the first to third pinion gears P1 to P3 and the fourth gear, wherein rotational speeds of five rotary elements formed by the carrier 31 and the first to fourth gears satisfy a collinear relationship in which the rotational speeds are aligned in a single straight line in a collinear chart, and wherein out of the five rotary elements, the first and second outer rotary elements (sun gear S, carrier 31) are mechanically connected to the first and second energy input/output units, respectively, and the first and second quasi-outer rotary elements (second ring gear R2, first ring gear R1) are mechanically connected to the one and the other of the two driven parts, respectively (FIG. 2, FIG. 4).

With this configuration, the differential gear unit further includes a fourth gear that is one of the first to third sun gears and the first to third ring gears described in the invention according to claim 1, other than the first to third gears, and the additional pinion gear is in mesh with the at least one of the first to third pinion gears, and the first to fourth gears associated with the at least one. Further, the one of the first to third pinion gears, with which the fourth gear is associated, is in mesh with the fourth gear, when the additional pinion gear is not in mesh with either of the one of the first to third pinion gears and the fourth gear.

Further, the five rotary elements are formed by the above-described carrier and first to fourth gears, and the rotational speeds of the five rotary elements are in the collinear relationship in which the rotational speeds are aligned in a single straight line in the collinear chart. Here, since the additional pinion gear is for changing position or positions of one to three of the first to fourth gears with respect to the carrier in the collinear chart, three additional pinion gears at the maximum are enough. Specifically, with the above-described configuration, nine component parts in total at the maximum, formed by the carrier, the triple pinion gear, the first to fourth gears, and the three additional pinion gears are sufficient for forming the five rotary elements, and seven component parts in total at the minimum are sufficient for the same. As described above, differently from the above-described case of PTL 2, it is possible to dispense with first to third connecting portions and rotating shafts for connecting various rotary elements to each other, and a differential gear unit equivalent to the differential gear unit of the power plant disclosed in PTL 2 can be formed by the seven or nine component parts smaller in number than the number (16) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, out of the five rotary elements, the first and second outer rotary elements, which are positioned on opposite outer sides of the collinear chart, respectively, are mechanically connected to the first and second energy input/output units, respectively, and the first and second quasi-outer rotary elements that are positioned adjacent to the first and second outer rotary elements, respectively, are mechanically connected to the one and the other of the two driven parts, respectively. As a consequence, similar to the invention according to claim 1, it is possible to properly control rotational energy (torque) distributed to the two driven parts.

The invention according to claim 3 is the power plant according to claim 2, further including an energy output unit (engine 3) that is capable of outputting rotational energy and is provided separately from the first and second energy input/output units, and wherein a central rotary element (third ring gear R3) which is a rotary element other than the first and second outer rotary elements and the first and second quasi-outer rotary elements of the five rotary elements is mechanically connected to the energy output unit (FIG. 2, FIGS. 1).

With this configuration, out of the five rotary elements, the central rotary element which is a rotary element other than the first and second outer rotary elements and the first and second quasi-outer rotary elements is mechanically connected to the energy output unit capable of outputting rotational energy, and this energy output unit is provided separately from the first and second energy input/output units. With this, not only the rotational energy from the first and second energy input/output units but also the rotational energy from the energy output unit is transmitted to the two driven parts, and hence it is possible to reduce torque demanded of the first and second energy input/output units. This makes it possible to downsize both of the energy input/output units.

The invention according to claim 4 is the power plant according to any one of claims 1 to 3, wherein the first and second quasi-outer rotary elements are one and another (second ring gear R2, first ring gear R1) of the carrier 31 and the first to third ring gears R1, R2, as one and another of the cattier and the first to third gears.

With this configuration, the first and second quasi-outer rotary elements connected to the one and the other of the two driven parts, respectively, are the one and another of the carrier and the first to third ring gears. This makes it possible to obtain the following advantageous. effects: When, differently from the present invention, the first sun gear as the above-described first gear is connected to the driven parts, relatively large torque is sometimes transmitted to the first sun gear. However, as shown in FIG. 20 a meshing radius rs of the first sun gear is relatively small, and torque transmitted from the first sun gear to the driven parts is represented by the product of the meshing radius rs and engagement reaction force fs in the tangential direction acting on the first sun gear, and hence in accordance with transmission of the large torque to the driven parts, a very large engagement reaction force fs acts on the first sun gear. For this reason, to withstand such engagement reaction force fs, it is required to set the tooth width of the first sun gear to a large value, which increases the size of the power plant. The same applies to a case where the second and third sun gears as the second and third gears are connected to the driven parts.

Further, as shown in FIG. 20, in a case where the first pinion gear is in mesh with the first sun gear, a centrifugal force gp acts on a bearing supporting the first pinion gear (hereinafter referred to the "first pinion bearing") along with rotation of the first pinion gear. Further, in accordance with transmission of large torque from the first sun gear to the driven parts, a relatively large engagement reaction force ps in the direction of normal line acts on the first pinion gear from the first sun gear. This engagement reaction force ps acts on the first pinion bearing in the same direction as the direction of the above-mentioned centrifugal force gp. Note that FIG. 20 shows an example in which three first pinion gears are provided. In the figure, only the centrifugal force gp and the engagement reaction force ps are illustrated for a first pinion gear located at the lower right of the figure, for convenience. As described above, a very large resultant force obtained by adding the centrifugal force gp caused by rotation of the first pinion gear and the large engagement reaction force ps from the first sun gear acts on the first pinion bearing, and hence to ensure sufficient durability of the first pinion bearing, it is inevitable to increase the size of the first pinion bearing, which also causes an increase in the size of the power plant. The same applies to a bearing supporting an additional pinion gear in a case where the first pinion gear is not brought into mesh with the first sun gear, but the additional pinion gear is provided which is brought into mesh with both the first sun gear and the first pinion gear. Further, the same also applies to a case where the second sun gear as the second gear and the third sun gear as the third gear are connected to the driven portions.

According to the present invention, as described above, not the first to third sun gears but the one and another of the carrier and the first to third ring gears are connected to the one and the other of the driven parts, respectively. FIG. 21 shows the relationship between engagement reaction forces from the respective gears in a case where the three first pinion gears are brought into mesh with the first ring gear and the first ring gear is connected to the driven parts. As shown in FIG. 21, since a meshing radius rr of the first ring gear is relatively large, and torque transmitted from the first ring gear to the driven parts is represented by the product of the meshing radius rr and an engagement reaction force FR acting on the first ring gear, the engagement reaction force FR acting on the first ring gear in accordance with the transmission of the torque to the driven parts becomes smaller than the case of the first sun gear described with reference to FIG. 20. Therefore, it is possible to set the tooth width of the first ring gear to a relatively small value, whereby it is possible to further downsize the power plant. The same advantageous effects can be obtained also in respective cases where the second and third ring gears are connected to the driven parts.

Furthermore, as shown in FIG. 21, a centrifugal force GP acts on the first pinion bearing along with rotation of the first pinion gear. Further an engagement reaction force PR from the first ring gear acts on the first pinion gear in accordance with transmission of torque from the first ring gear to the one rotating shaft. This engagement reaction force PR acts on the first pinion bearing in a direct ion opposite to the direction of the above-mentioned centrifugal force GP. As a consequence, since the centrifugal force GP and the engagement reaction force PR act on the first pinion bearing such that they are offset by each other, it is possible to downsize the first pinion bearing in comparison with the above-described case in which the first sun gear is connected to the driven part, which also makes it possible to downsize the power plant. Note that in FIG. 21, only the centrifugal force GP and the engagement reaction force PR are illustrated for a first pinion gear located on the right side, as viewed in the figure, for convenience. Further, the number of the first pinion gears is not limited to three but it can be set as desired.

Further, in a case where the first pinion gear is not brought into mesh with the first ring gear, but an additional pinion gear is provided which is brought into mesh with the first ring gear and the first pinion gear, it is possible to obtain the above-described advantageous effects on a bearing supporting the additional pinion gear. Further, in a case where the second or third ring gear is connected to the driven parts. When an additional pinion gear is provided which is brought into mesh with the second or third ring gear, it is possible to obtain the above-described advantageous effects on a bearing supporting the additional pinion gear. Further, when the additional pinion gear which is brought into mesh with the second or third ring gear is not provided, it is possible to obtain the above-described advantageous effects on bearings supporting the second and third pinion gears.

DESCRIPTION OF EMBODIMENTS

Figure 1:
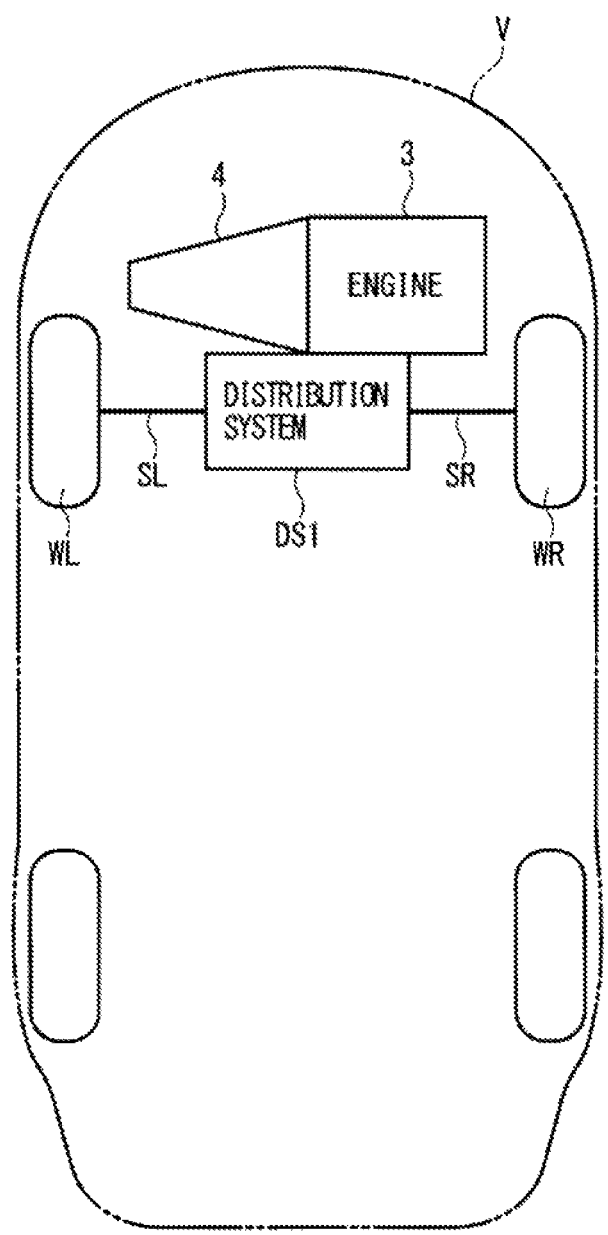
FIG. 1 A diagram schematically showing a power plant according to a first embodiment of the present invention together with a vehicle to which is applied the power plant.
Figure 2:
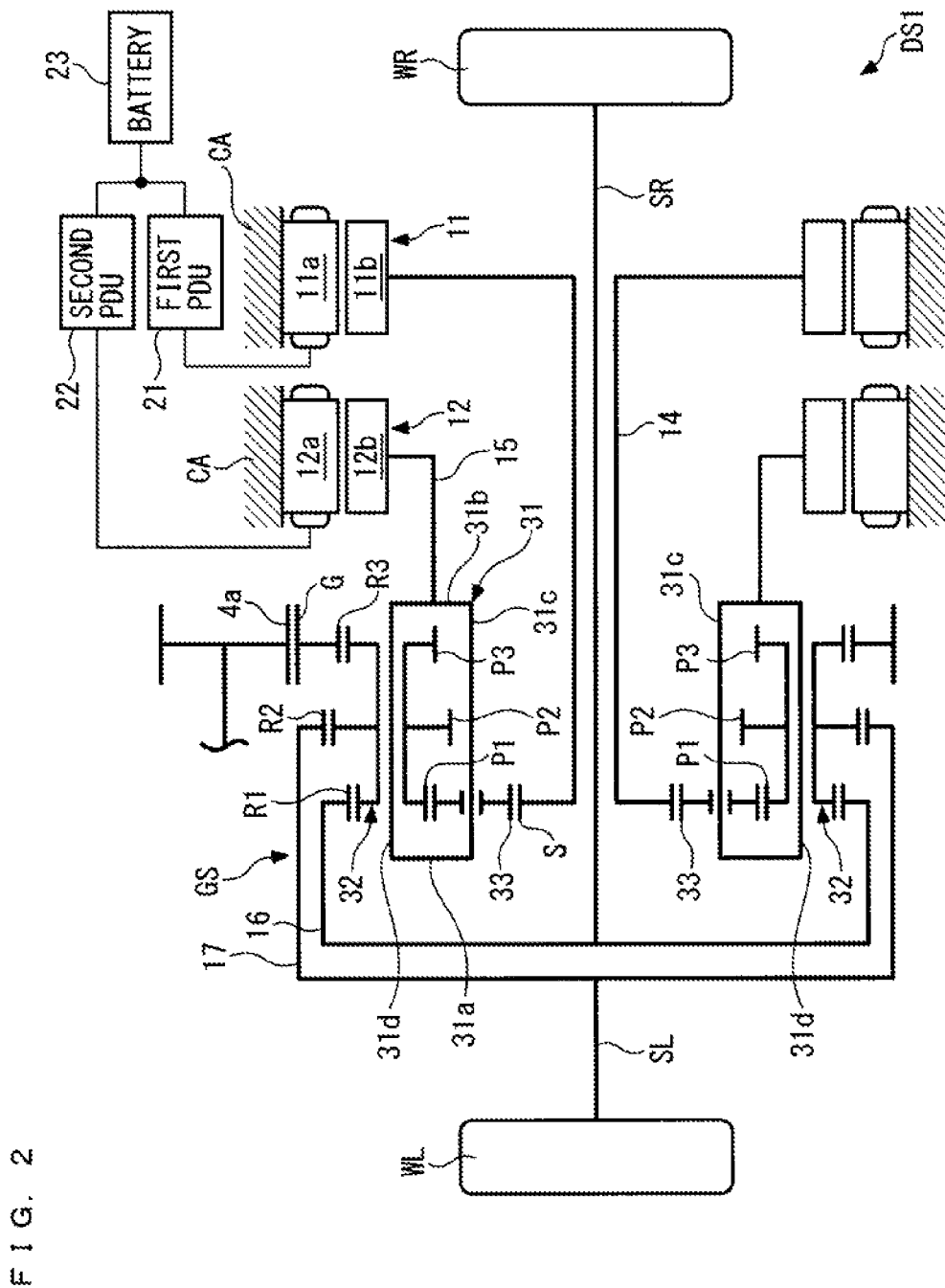
FIG. 2 A skeleton diagram of the power plant etc. shown in FIG. 1.

The invention will now be described in detail with reference to drawings showing preferred embodiments thereof. A power plant according to a first embodiment shown in FIGS. 1 and 2 is for driving left and right output shafts SL and SR of a four-wheel vehicle V, and are arranged in the front -raft of the vehicle V. These left and right output shafts SL and SR, which are rotatably supported by bearings (not shown), are arranged coaxially with each other, and are connected to left and right front wheels WL and WR, respectively.

The power plant is comprised of an internal combustion engine (hereinafter referred to as the "engine") 3 as a motive power source and a transmission 4 for changing the speed of motive power from the engine 3. The engine 3 is a gasoline engine, and a crankshaft (not shown) thereof is connected to an input shaft (not shown) of the transmission 4. The transmission 4 is a stepped automatic transmission, and changes the speed of motive power transmitted from the engine 3 to the above-mentioned input shaft, to output the motive power to a transmission output shaft thereof. A gear 4a (see FIG. 2), which is an externally-toothed gear, is integrally formed on the transmission output shaft. The operations of the engine 3 and the transmission 4 are controlled by an ECU 2, described hereinafter.

Further, the power plant includes a distribution system DS1 for controlling motive power distributed to the left and right output shafts SL and SR. The distribution system DS1 is comprised of a differential gear unit GS, a first rotating electric machine 11, and a second rotating electric machine 12. The differential gear unit GS is used for transmitting motive power between the engine 3, the first and second rotating electric machines 11 and 12, and the left and right output shafts SL and SR, and includes a sun gear S, a carrier 31, triple pinion gears 32 additional pinion gears 33, a first ring gear R1, a second ring gear R2 and a third ring gear R3. The differential gear unit GS is located between the left and right front wheels WL and WR. The sun gear S and the first to third ring gear R1 to R3 are arranged coaxially with the left and right output shafts SL and SR.

Further, the sun gear S is formed by an externally-toothed gear, and is provided, in a manner associated with first pinion gears P1, described hereinafter, radially inward of the first pinion gears P1. Furthermore, the sun gear S is coaxially connected to a first rotor 11b, described hereinafter, of the first rotating electric machine 11 via a hollow cylindrical first rotating shaft 14 rotatably supported by a bearing (not shown), and is rotatable in unison with the first rotor 11b. The right, output shaft SR is coaxially and relatively rotatably disposed radially inward of the first rotating shaft 14. The carrier 31 is comprised of a first root portion 31a and a second root portion 31b each having an annular plate shape, and three first support shafts 31c (only two of which are shown) and three second support shafts 31d (only two of which are shown), which are integrally formed with the root portions 31a and 31b. Further, the carrier 31 is rotatably supported by a bearing (not shown), and the sun gear S and the first rotating shaft 14 are relatively rotatably disposed radially inward of the carrier 31.

The first and second root portions 31a and 31b are arranged coaxially with the left and right output shafts SL and SR, and are opposed to each other in an axial direction of the left and right output shafts SL and SR. Further, the second root portion 31b is disposed on a side closer to the right front wheel WR than the first root portion 31a, and is coaxially connected to a second rotor 12b, described hereinafter, of the second rotating electric machine 12 via a hollow cylindrical second rotating shaft 15 rotatably supported by a bearing (not shown). This makes the carrier 31 rotatable in unison with the second rotor 12b. The first rotating shaft 14 is relatively rotatably disposed radially inward of the second rotation shaft 15. The first and second support shafts 31c and 31d are provided between the first and second root portions 31a and 31b, and extend in parallel with the left and right output shafts SL and SR. Further, the first support shafts 31c are each located at a radially inner end of the first root portion 31a, and the second support shafts 31d are each located at a radially outer end of the first root portion 31a. Furthermore, the three first support shafts 31c are located at equally-spaced intervals in a circumferential direction of the first root portion 31a. The same applies to the three second support shafts 31d.

The above-mentioned triple pinion gears 32 are each comprised of the first pinion gear P1, a second pinion gear P2, and a third pinion gear P3 integrally formed with each other. The first to third pinion gears P1 to P3 are formed by externally-toothed gears. The number of the triple pinion gears 32 is three (only two of which are shown) which is equal to the number of the above-mentioned second support shafts 31d, and each triple pinion gear 32 is rotatably supported on an associated one of the second support shafts 31d via a bearing (not shown). The first to third pinion gears P1 to P3 are arranged on the are axis parallel to the left and right output shafts SL and SR from the left front wheel WL side in the mentioned order. Note that the number of the triple pinion gears 32 and the number of the second support shafts 31d are not limited to three but they can be set as desired.

The above-mentioned first to third ring gears R1 to R3 are formed by internally-toothed gears, and are arranged from the left front wheel WL side in the mentioned order. The first ring gear R1 is provided, in a manner associated with the first pinion gears P1, radially outward of the first pinion gears P1, and is in mesh with the first pinion gears P1. Further, the first ring gear R1 is coaxially connected to the right output shaft SR via a hollow cylindrical third rotating shaft 16 and a flange, and is rotatable in unison with the right output shaft SR. The additional pinion gears 33 are formed by externally-toothed gears, and the number of the additional pinion gears 33 is three (only two of which are shown) which is equal to the number of the first support shafts 31c. Each additional pinion gear 33 is rotatably supported on an associated one of the first support shafts 31c via a bearing (not shown), and is in mesh with both the sun gear S and an associated one of the first pinion gears P1. Note that the number of the additional pinion gears 33 and the number of the first support shafts 31c are not limited to three but they can be set as desired.

The second ring gear R2 is provided, in a manner associated with the second pinion gears P2, radially inward of the second pinion gears P2, and is in mesh with the second pinion gears P2. Further, the second ring gear R2 is coaxially connected to the left output shaft SL via a hollow cylindrical fourth rotating shaft 17 rotatably supported by a bearing (not shown) and a flange, and is rotatable in unison with the left output shaft SL. The above-mentioned third rotating shaft 16 is relatively rotatably disposed radially inward of the fourth rotating shaft 17. The third ring gear R3 provided, in a manner associated with the third pinion gears P3, radially outward of the third pinion gears P3, and is in mesh with the third pinion gears P3. Further, a gear 5, which is an externally-toothed gear, is formed on an outer periphery of the third ring gear R3, and the gear G is in mesh with the above-mentioned gear 4a of the transmission output shaft.

Furthermore, numbers ZP1 to ZP3 of gear teeth of the first to third pinion gears P1 to P3, and numbers ZR1 to ZR3 of gear teeth of the first to third ring gears R1 to R3 are set such that the following equations (1) and (2) hold therebetween.

$$ZR1/ZP1>ZR3/ZP3>ZR2/ZP2 \tag{1}$$

$$ZP3/ZR3=(ZP1/ZP1+ZP2/ZR2)/2 \tag{2}$$

The above-mentioned first rotating electric machine 11 is an AC motor, and includes a first stator 11a formed e.g. by a plurality of iron cores and coils, and the first rotor 11b formed e.g. by a plurality of magnets. The first rotating electric machine 11 is disposed coaxially with the left and right output shafts SL and SR, and is located between the differential gear unit GS and the right front wheel WR. The first stator 11a is fixed to an immovable casing CA. The first rotor 11b is disposed in a manner opposed to the first stator 11a, and is rotatable in unison with the first sun gear S, as mentioned above, in the first rotating electric machine 11, when electric power is supplied to the first stator 11a, the supplied electric power is converted to motive power, and is output to the first rotor 11b. Further, when the motive power is input to the first rotor 11b, this motive power is converted to electric power (power generation), and is output to the first stator 11a.

Figure 3:
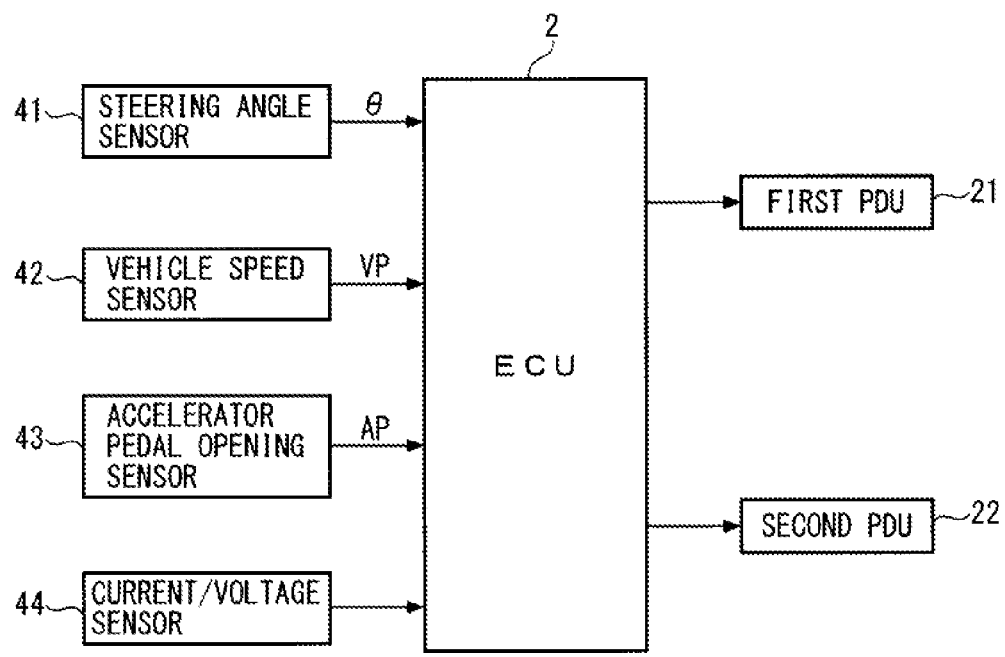
FIG. 3 A block diagram of an ECU etc. of the power plant shown in FIG. 1.

Further, the first stator 11a is electrically connected to a battery 23 capable of being charged and discharged, via a first power drive unit (hereinafter referred to as the "first PDU") 21, and is capable of supplying and receiving electric energy to and from the battery 23. The first PDU 21 is formed by an electric circuit comprised e.g. of an inverter. As shown in FIG. 3, the ECU 2 is electrically connected to the first PDU 21. The ECU 2 controls the first PDU 21 to thereby control electric power supplied to the first stator 11a, electric power generated by the first stator 11a, and the rotational speed of the first rotor 11b.

Similar to the first rotating electric machine 11, the second rotating electric machine 12 is an AC motor, and includes a second stator 12a and the second rotor 12b. Further, the second rotating electric machine 12 is disposed coaxially with the left and right output shafts SL and SR, and is located between the first rotating electric machine 11 and the differential gear unit GS. The second stator 12a and the second rotor 12b are constructed similar to the first stator his and the first rotor 11b, respectively. Further, the second rotor 12b is rotatable in unison with the carrier 31, as mentioned above. Furthermore, similar to the first rotating electric machine 11, the second rotating electric machine 12 is capable of converting electric power supplied to the second stator 12a to motive power and outputting the motive power to the second rotor 12b, and is capable of converting the motive power input to the second rotor 12b to electric power and outputting the electric power to the second stator 12a.

Further, the second stator 12a is electrically connected to the battery 23 via a second power drive unit (hereinafter referred to as the "second PDU") 22, and is capable of supplying and receiving electric energy to and from the battery 23. Similar to the first PDU 21, the second PDU 22 is formed by an electric circuit comprised e.g. of an inverter. The ECU 2 is electrically connected to the second PDU 22. The ECU 2 controls the second PDU 22 to thereby control electric power supplied to the second stator 12a, electric power generated by the second stator 12a, and the rotational speed of the second rotor 12b.

Hereinafter, converting electric power supplied to the first stator 11a (second stator 12a) to motive power and outputting the motive power from the first rotor 11b (second rotor 12b) is referred to as "powering", as deemed appropriate. Further, generating electric power by the first stator 11a second stator 12a) using motive power input to the first rotor 11b (second rotor 12b) to thereby convert the motive power to electric power is referred to as "regeneration" as deemed appropriate.

In the power plant constructed as above, since the differential gear unit GS is constructed as described above, the sun gear S, the second ring gear R2, the third ring gear R3, the first ring gear R1, and the carrier 31 can transmit motive power therebetween, and the rotational speeds thereof are in a collinear relationship. Here, the term "collinear relationship" refers to a relationship in which the rotational speeds thereof are aligned in a single straight line in a collinear chart. Further, when the sun gear S is rotated in a state in which the carrier 31 is fixed, all the first to third ring gears R1 to R3 rotate in the same direction as the direction of rotation of the sun gear S. In this case, from the relationship between the numbers of gear teeth of the gears, the relationship of "the rotational speed of the second ring gear R2>the rotational speed of the third ring gear R3>the rotational speed of the first ring gear R1" holds between the rotational speeds of the first to third ring gears R1 to R3. From the above, in a collinear chart indicating the relationship between the rotational speeds, the sun gear S, the second ring gear R2, the third ring gear R3, the first ring gear R1, and the carrier 31 are depicted in this order.

Further, since the sun gear S and the first rotor 11b are connected to each other via the first rotating shaft 14, the rotational speed of the sun gear S and that of the first rotor 11b are equal to each other. Further, since the second ring gear R2 is connected to the left output shaft SL via the fourth rotating shaft 17 and the flange, the rotational speed of the second ring gear R2 and that of the left output shaft SL are equal to each other. Further, since the third ring gear R3 is connected to the transmission output shaft of the transmission 4 via the gear G and the gear 4a, the rotational speed of the third ring gear R3 and that of the transmission output shaft are equal to each other provided that a change in speed by the gear G and the gear 4a is ignored. Further, the first ring gear R1 is connected to the right output shaft SR via the third rotating shaft 16 and the flange, and hence the rotational speed of the first ring gear R1 and that of the right output shaft SR are equal to each other. Furthermore, the carrier 31 is connected to the second rotor 12b via the second rotating shaft 15, and hence the rotational speed of the carrier 31 and that of the second rotor 12b are equal to each other.

Figure 4:
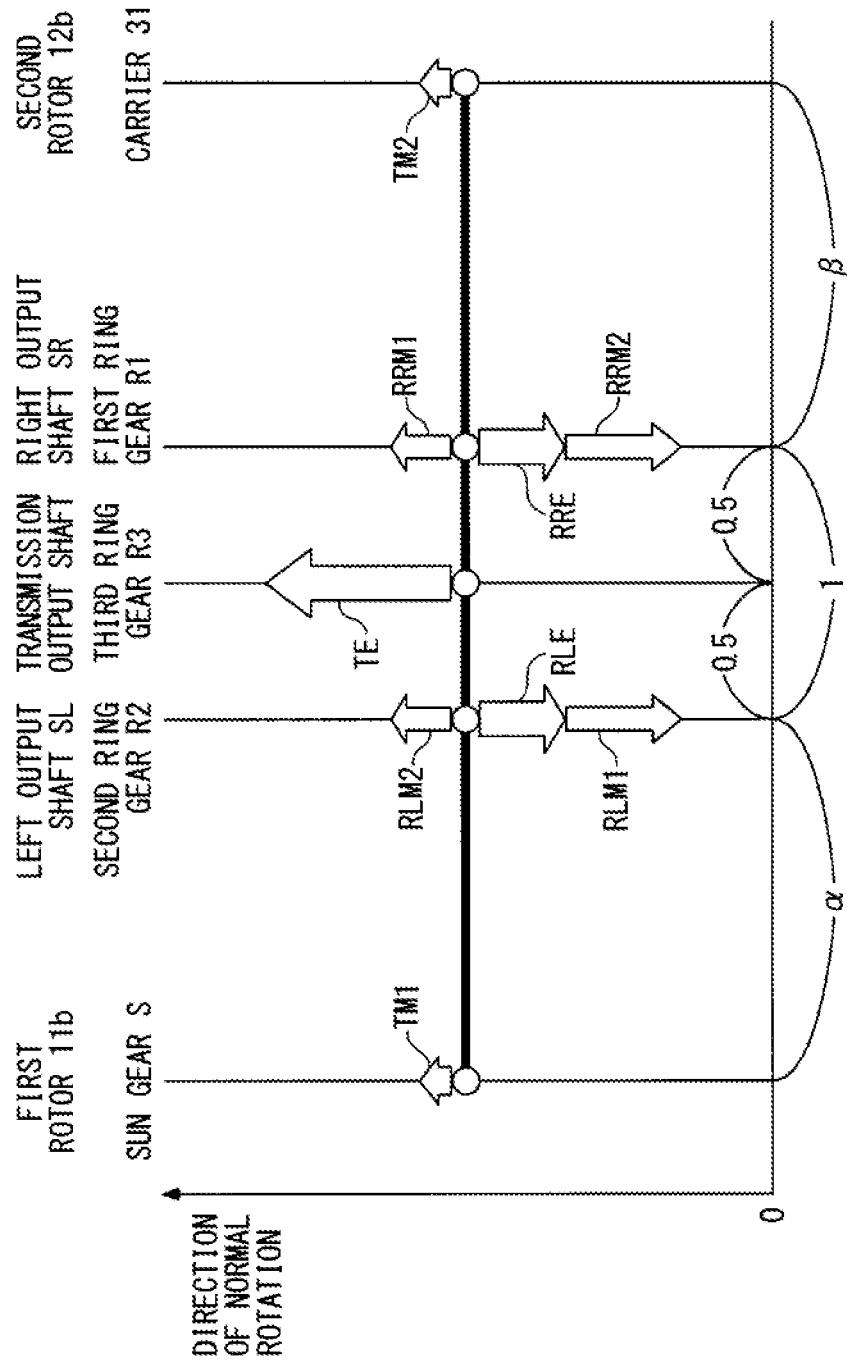
FIG. 4 A collinear chart showing a rotational speed relationship and a torque balance relationship between various types of rotary elements of the power plant shown in FIG. 1, as to a state of the vehicle during straight forward traveling and at the same time during other than decelerating traveling.

From the above, the relationship between the rotational speeds of various rotary elements of the power plant is expressed e.g. in a collinear chart shown in FIG. 4. In FIG. 4 and other collinear charts, referred to hereinafter, the distance from a horizontal line indicative of 0 to a white circle shown on each vertical line corresponds to the rotational speed of each of the rotary elements. As is apparent from FIG. 4, the left and right output shafts SL and SR can be differentially rotated with each other.

In FIGS. 4, α and β represent a first lever ratio and a second lever ratio (torque ratio, speed ratio) respectively, and are expressed by the following equations (3) and (4)

$$\alpha = ZR1\ (ZR2 \times ZP1 - ZS \times ZP2)/ZS\ (ZR1 \times ZP2 - ZR2 \times ZP1) \tag{3}$$

$$\beta = ZR2 \times ZP1/(ZR1 \times ZP2 - ZR2 \times ZP1) \tag{4}$$

wherein ZS represents the number of gear teeth of the sun gear S.

The numbers ZR1 and ZR2 of gear teeth of the first and second ring gears R1 and R2, the numbers ZP1 and ZP2 of gear teeth of the first and second pinion gears P1 and P2, and the number ZS of the gear teeth of the sun gear S are set such that the first and second lever ratios α and β become equal to each other and take relatively large values, not only on condition that the above-mentioned equations (1) and (2) hold but also on condition that one of the first and second rotors 11b and 12b does not perform reverse rotation within a range in which the left and right front wheels WL and WR can be differentially rotated with each other.

Further, as shown in FIG. 3, to the ECU 2, a detection signal indicative of a steering angle θ of a steering wheel (not shown) of the vehicle V is delivered from a steering angle sensor 41, a detection signal indicative of a vehicle speed VP of the vehicle V is delivered from a vehicle speed sensor 42, and a detection signal indicative of an operation amount of an accelerator pedal (not shown) of the vehicle V (hereinafter referred to as the "accelerator pedal opening") AP is delivered from an accelerator pedal opening sensor 43. Further, detection signals indicative of current and voltage values of electric current flowing into and out of the battery 23 are delivered from a current/voltage sensor 44 to the ECU 2. The ECU 2 calculates a state of charge of the battery 23 based on the detection signals from the current/voltage sensor 44.

The ECU 2 is implemented by a microcomputer comprised of an I/O interface, a CPU, a RAM, and a ROM. The ECU 2 controls the first and second rotating electric machines 11 and 12 based on the detection signals from the aforementioned sensors 41 to 44, according to control programs stored in the ROM. With this control, various operations of the distribution system DS1 are performed. Hereafter, a description will be given of the operations of the distribution system DS1 during straight forward traveling and during left or right turning of the vehicle V.

[During Straight Forward Traveling]

During straight and constant-speed traveling or straight and accelerating traveling of the vehicle V powering is performed by both the first and second rotating electric machines 11 and 12, and electric power supplied from the battery 23 to the first and second stators 11a and 12a is controlled. FIG. 4 shows a rotational speed relationship and a torque balance relationship between various types of rotary elements in this case.

In FIG. 4, TM1 and TM2 represent output torques generated by the first and second rotors 11b and 12b along with the powering by the first and second rotating electric machines 11 and 12 (hereinafter referred to as the "first motor output torque" and the "second motor output torque"), respectively. Further, RLM1 and RRM1 represent reaction force torques acting on the left output shaft SL and the right output shaft SR along with the powering by the first rotating electric machine 11, respectively, and RLM2 and RRM2 represent reaction force torques acting on the left output shaft SL and the right output shaft SR along with the powering by the second rotating electric machine 12, respectively. Furthermore, TE represents torque transmitted from the engine 3 to the third ring gear R3 via the transmission 4 (hereinafter referred to as the "post-speed-change engine torque"), and RLE and RRE represent reaction force torques which act on the left output shaft SL and the right output shaft SR along with transmission of the post-speed-change engine torque TE to the third ring gear R3, respectively.

Further, torque transmitted to the left output shaft SL (hereinafter referred to as the "left output shaft-transmitted torque") is expressed by RLE+RLM1−RLM2 (RRM1>RLM2), and torque transmitted to the right output shaft SR (hereinafter referred to as the "right output shaft-transmitted torque") is expressed by RRE+RRM2−RRM1 (RRM2>RRM1). The left and right output shafts SL and SR are driven in the direction of normal rotation together with the left and right front wheels WL and WR. In this case, in the collinear chart (FIG. 4), the distance from the third ring gear R3 to the left output shaft SL and the distance from the third ring gear R3 to the right output shaft SR are equal to each other, and hence a torque distribution ratio of torque distributed from the third ring gear R3 to the left and right output shafts SL and SR is 1:1, so that the torques distributed to the left and right output shafts SL and SR are equal to each other. Further, electric power supplied to the first and second stators 11a and 12a are controlled such that the left output shaft-transmitted torque and the right output shaft-transmitted torque become the same demanded torque. This demanded torque is calculated by searching a predetermined map (not shown) according to the detected accelerator pedal opening AP.

Further, RLM1-RLM2 of the above-mentioned left output shaft-transmitted torque is represented by TM1×(α+1)−TM2×β, and RRM2−RRM1 of the above-mentioned right output shaft-transmitted torque is represented by TM2×(β+1)−TM1×α. As is apparent from the above equations, the first lever ratio α represents a ratio of torque transmitted from the first rotating electric machine 11 to the left and right output shafts SL and SR via the differential gear unit GS, to the first motor output torque TM1. Further, the second lever ratio β represents a ratio of torque transmitted from the second rotating electric machine 12 to the left and right output shafts SL and SR via the differential gear unit GS, to the second motor output torque TM2. On the other hand, the first and second lever ratios α and β are set to the same value, as described above, so that only by controlling the first and second motor output torques TM1 and TM2 to the same magnitude, it is possible to accurately and easily control torque distributed from the first and second rotating electric machines 11 and 12 to the left and right output shafts SL and SR to the same magnitude.

Furthermore, an execution condition for executing the above-described powering by the first and second rotating electric machines 11 and 12 is e.g. a condition that the engine 3 is being assisted by the first and second rotating electric machines 11 and 12 (hereinafter referred to as "during the motor assist") or a condition that the vehicle V is being driven only by the first and second rotating electric machines 11 and 12 without using the engine 3 (hereinafter referred to as "during the EV traveling") and also a calculated state of charge of the battery 23 is higher than a lower limit value. In this case, the fact that the state of charge of the battery 23 is higher than the lower limit value indicates that the battery 23 is capable of being discharged. Note that although FIG. 4 shows the rotational speed relationship and the torque balance relationship between the various types of rotary elements during the motor assist, the engine 3 is at rest during the EV traveling, and hence the post-speed-change engine torque TE, and the reaction force torque RLE, and the reaction force torque RRE are not generated.

Figure 5:
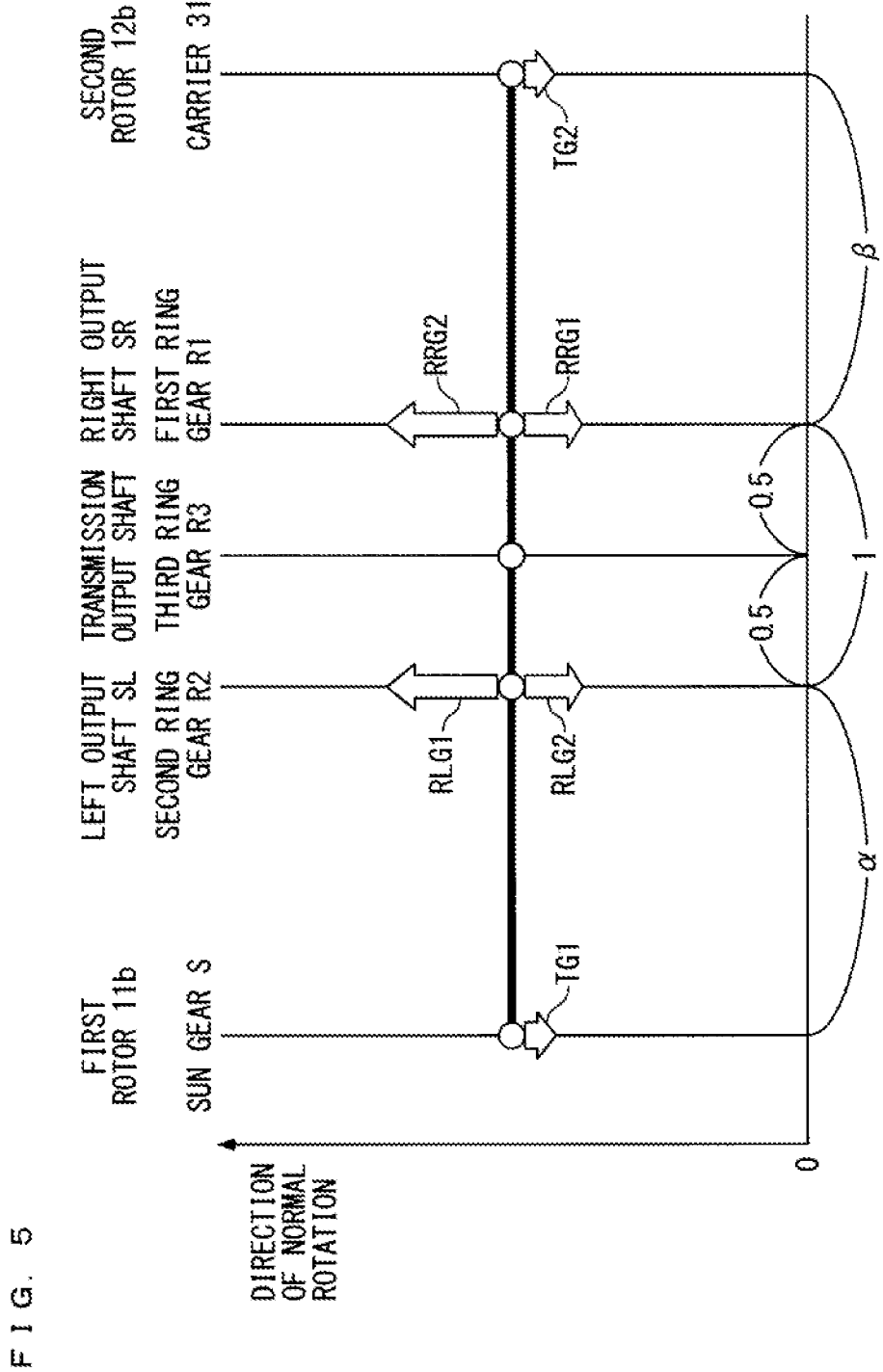
FIG. 5 A collinear chart showing a rotational speed relationship and a torque balance relationship between the various types of rotary elements of the power plant shown in FIG. 1, as to a state of the vehicle during straight forward traveling and at the same time during decelerating traveling.

Further, during straight forward traveling and also decelerating traveling of the vehicle V (during a fuel cut operation of the engine 3), regeneration is performed by both the first and second rotating electric machines 11 and 12 using inertia energy of the vehicle V, and regenerated electric power is charged into the battery 23 and is controlled. FIG. 5 shows a rotational speed relationship and a torque balance relationship between the various types of rotary elements in this case. In FIGS. 5, TG1 and TG2 represent braking torques generated by the first and second rotors 11b and 12b along with the regeneration by the first and second rotating electric machines 11 and 12 (hereinafter referred to as the "first motor braking torque" and the "second motor braking torque") respectively. Further, RLG1 and RRG1 represent reaction force torques acting on the left output shaft SL and the right output shaft SR along with the regeneration by the first rotating electric machine 11, and RLG2 and RRG2 represent reaction force torques acting on the left output shaft SL and the right output shaft SR along with the regeneration by the second rotating electric machine 12.

In this case, the left output shaft-transmitted torque is expressed by $-RLG1+RLG2$ ($RLG1>RLG2$), and the right output shaft-transmitted torque is expressed by $-RRG2+RRG1$ ($RRG2>RRG1$). The braking torque acts on the left and right output shafts SL and SR, whereby the vehicle V is decelerated. Further, the electric power regenerated by the first and second rotating electric machines 11 and 12 is controlled such that the braking torque acting on the left output shaft SL and the braking torque acting on the right output shaft SR are equal to each other.

Further, $-RLG1+RLG2$ of the above-mentioned left output shaft-transmitted torque is represented by $-TG1\times(\alpha+1)+TG2\times\beta$, and $-RRG2+RRG1$ of the above-mentioned right output shaft-transmitted torque is represented by $-TG2\times(\beta+1)+TG1\times\alpha$. As described above, the first and second lever ratios $\alpha$ and $\beta$ are set to the same value, whereby a torque ratio of torque transmitted from the first rotating electric machine 11 to the left and right output shafts SL and SR, and a torque ratio of torque transmitted from the second rotating electric machine 12 to the left and right output shafts SL and SR are set to the same value. Therefore, only by controlling the first and second motor braking torques TG1 and TG2 to the same magnitude, it is possible to accurately and easily control braking torque distributed from the first and second rotating electric machines 11 and 12 to the left and right output shafts SL and SR to the same magnitude.

Furthermore, an execution condition for executing the above-described regeneration by the first and second rotating electric machines 11 and 12 is e.g. a condition that the state of charge of the battery 23 is lower than an upper limit value. In this case, the fact that the state of charge of the battery 23 is lower than the upper limit value indicates that the battery 23 is capable of being charged.

[During Right Turning]

When the vehicle V turns to the right during forward traveling, to increase a clockwise yaw moment for causing the vehicle V to perform right turning (hereinafter referred to as the "right yaw moment"), torque distribution control for increasing the right yaw moment is performed. First torque distribution control to fourth torque distribution control are provided for the torque distribution control. Hereafter, a description will be sequentially given of the first torque distribution control to the fourth torque distribution control for increasing the right yaw moment. During the first torque distribution control, powering is performed by both the first and second rotating electric machines 11 and 12, and the electric power supplied to the first and second stators 11a and 12a is controlled such that the first motor output torque becomes larger than the second motor output torque TM2.

With this control, as is apparent from the above-described torque balance relationship shown in FIG. 4, the left output shaft-transmitted torque becomes larger than the right output shaft-transmitted torque, so that the right, yaw moment of the vehicle V is increased. In this case, the electric power supplied to the first and second stators 11a and 12a is controlled according to the detected steering angle θ, the vehicle speed VP, and the accelerator pedal opening AP. Note that an execution condition for executing the first torque distribution control for increasing the right yaw moment is e.g. a condition that it is during the motor assist (the engine 3 is being assisted by the first and second rotating electric machines 11 and 12) or a condition that it is during the EV traveling (the vehicle V is being driven only by the first and second rotating electric machines 11 and 12) and also the state of charge of the battery 23 is higher than the: lower limit value.

Next, a description will be given of the second torque distribution control for increasing the right yaw moment. During the second torque distribution control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the second motor braking torque TG2 becomes larger than the first motor braking torque TG1.

With this control, as is apparent from the above-described torque balance relationship shown in FIG. 5, the braking torque acting on the right, output shaft SR becomes larger than that acting on the left output shaft SL, so that the right yaw moment of the vehicle V is increased. In this case, the electric power regenerated by the first and second rotating electric machines 11 and 12 is controlled according to the steering angle θ, the vehicle speed VP, and so forth. Note that an execution condition for executing the second torque distribution control for increasing the right yaw moment is e.g. a condition that it is during deceleration traveling of the vehicle V, and also the state of charge of the battery 23 is lower than the upper limit value.

Figure 6:
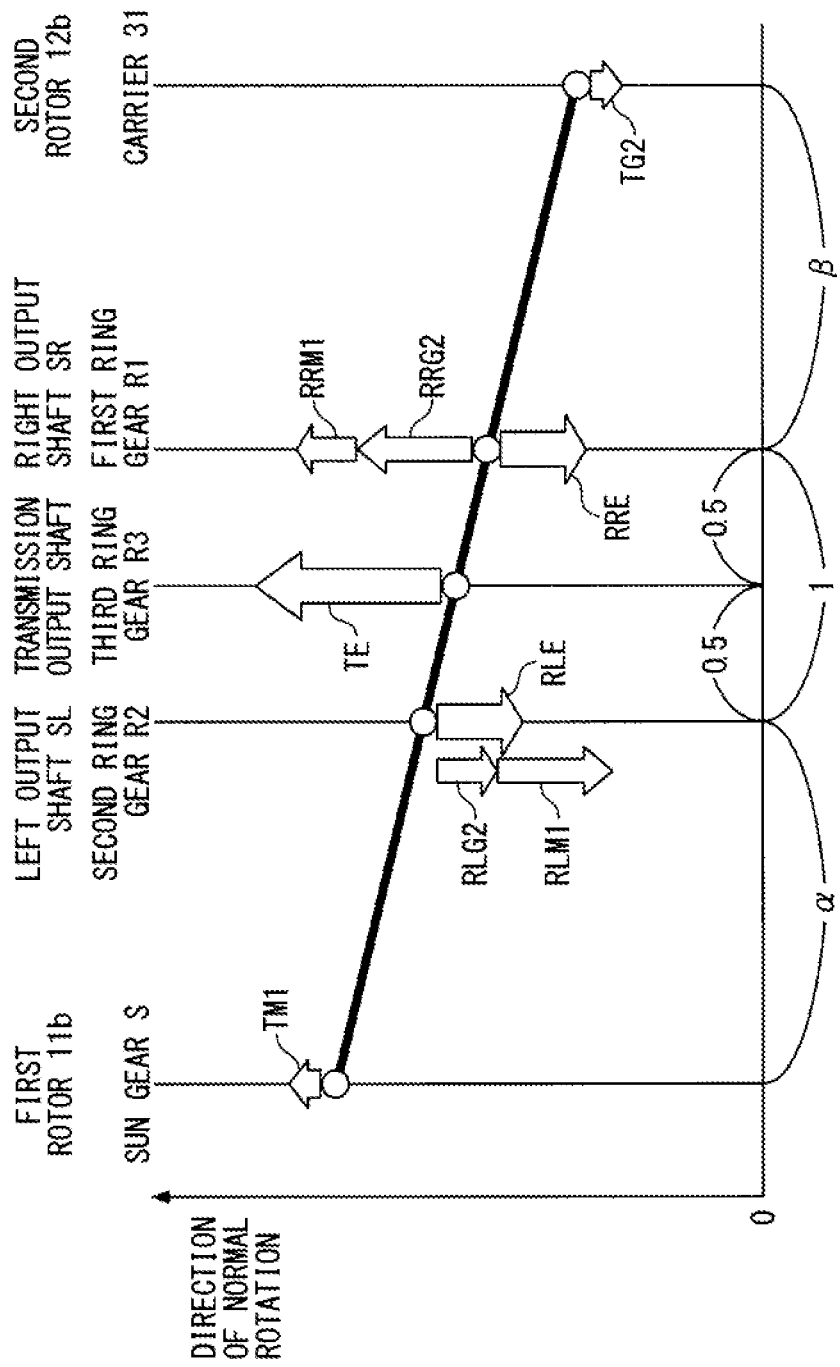
FIG. 6 A collinear chart showing a rotational speed relationship and a torque balance relationship between the various types of rotary elements of the power plant shown in FIG. 1, as to during third torque distribution control for increasing right yaw moment.

Next, a description will be given of the third torque distribution control for increasing the right yaw moment. During the third torque distribution control, powering is performed by the first rotating electric machine 11, and regeneration is performed by the second rotating electric machine 12. FIG. 6 shows a rotational speed relationship and a torque balance relationship between the various types of rotary elements in this case. As described above with reference to FIG. 4, in FIG. 6, TM1 represents the first motor output torque, and RLM1 and RRM1 represent the reaction force torques acting on the left output shaft SL and the right output shaft SR along with the powering by the first rotating electric machine 11, respectively. Further, TE represents the post-speed-change engine torque, and RLE and RRE represent the reaction force torques acting on the left output shaft SL and the right output shaft SR along with the transmission of the post-speed-change engine torque TE to the third ring gear R3, respectively. Furthermore, as described above with reference to FIG. 5, in FIG. 6, TG2 represents the second motor braking torque, and RLG2 and RRG2 represent the reaction force torques acting on the left output shaft SL and the right output shaft SR along with the regeneration by the second rotating electric machine 12, respectively.

In this case, the left output shaft-transmitted torque is expressed by $RLE+RLM1+RLG2$, and the right output shaft-transmitted torque is expressed by $RRE-(RRM1+RRG2)$. As described above, drive torque acts on the left output shaft SL, and the braking torque acts on the right output shaft SR, so that the right yaw moment of the vehicle V is increased. In this case as well, electric power supplied to the first stator 11a and electric power regenerated by the second rotating electric machine 12 are controlled according to the steering angle θ, the vehicle speed VP, and the accelerator pedal opening AP.

Further, RLM1+RLG2 of the above-mentioned left output shaft-transmitted torque is represented by TM1×(α+1)+TG2×β, and −(RRM2+RRM1) of the above-mentioned right output shaft-transmitted torque is represented by −(TG2×(β+1)+TM1×α). Since the first and second lever ratios α and β are set to the same value, it is possible to accurately and easily control torque distributed from the first and second rotating electric machines 11 and 12 to the left and right output shafts SL and SR via the first motor output torque TM1 and the second motor braking torque TG2.

Note that an execution condition for executing the third torque distribution control for increasing the right yaw moment is e.g. the following first increasing condition or second increasing condition:

The first increasing condition: The vehicle V is being driven by the engine 3, and also the state of charge of the battery 23 is not lower than an upper limit value.

The second increasing condition: The vehicle V is being driven by the engine 3, the state of charge of the battery 23 is lower than the upper limit value, and also braking torque demanded of the second rotating electric machine 12 is not smaller than a predetermined first upper limit torque.

In this case, when the first increasing condition is satisfied, i.e. when the state of charge of the battery 23 is not lower than the upper limit value, the battery 23 cannot be charged, and hence all the electric power regenerated by the second rotating electric machine 12 is supplied to the first stator 11a without being charged into the battery 23. On the other hand, when the second increasing condition is satisfied, part of the electric power regenerated by the second rotating electric machine 12 is charged into the battery 23, and the remainder is supplied to the first stat or 11a. In this case, the first motor output torque TM1 is controlled such that an insufficient amount of the second motor braking torque TG2 with respect to the demanded braking torque is compensated for.

Next, a description will be given of the fourth torque distribution control for increasing the right yaw moment. During the fourth torque distribution control, the zero torque control is performed on the first rotating electric machine 11, and regeneration is performed by the second rotating electric machine 12 to charge electric power regenerated by the second rotating electric machine 12 into the battery 23. The zero torque control prevents dragging losses from being caused by regeneration by the first rotating electric machine 11. In this case, only the second motor braking torque TG2 is generated, so that as is apparent from FIG. 6, the left output shaft-transmitted torque is represented by RLE+RLG2, and the right output shaft-transmitted torque is represented by RRE−RRG2. Thus, the drive torque acts on the left output shaft SL, and the braking torque acts on the right output shaft SR, so that the right yaw moment of the vehicle V is increased. In other words, part of the torque of the right output shaft SR is transmitted to the left output shaft SL using the second motor braking torque TG2 as a reaction force. In this case as well, the electric power regenerated by the second rotating electric machine 12 is controlled according to the steering angle θ, the vehicle speed VP, and the accelerator pedal opening AP.

Note that an execution condition for executing the fourth torque distribution control for increasing the right yaw moment is e.g. a condition that the vehicle V is being driven by the engine 3, the state of charge of the battery 23 is lower than the upper limit value, and also the braking torque demanded of the second rotating electric machine 12 is smaller than the above-mentioned first upper limit torque.

Note that to increase the right yaw moment, the zero torque control may be performed on the second rotating electric machine 12, and the powering may be performed by the first rotating electric machine 11. In this case, only the first motor output torque TM1 is generated, so that as is apparent from FIG. 6, the left output shaft-transmitted torque is represented by RLE+RLM1, and the right output shaft-transmitted torque is represented by RRE−RRM1. Thus, the drive torque acts on the left output shaft SL, and the braking torque acts on the right output shaft SR, so that the right yaw moment of the vehicle V is increased. In other words, part of the torque of the right output shaft SR is transmitted to the left output shaft SL using the first motor powering torque TM1 as a reaction force. In this case as well, the electric power supplied to the first stator 11a is controlled according to the steering angle θ, the vehicle speed VP, and the accelerator pedal opening AP.

During the right turning of the vehicle V, when the right yaw moment of the vehicle V is reduced, torque distribution control for reducing the right yaw moment is executed. First torque distribution control to fourth torque distribution control are provided for the torque distribution control for reducing the right yaw moment. Hereafter, a description will be sequentially given of the first torque distribution control to the fourth torque distribution control for reducing the right yaw moment. During the first torque distribution control, powering is performed by both the first and second rotating electric machines 11 and 12, and the electric power supplied to the first and second stators 11a and 12a is controlled such that the second motor output torque TM2 becomes larger than the first motor output torque TM1.

With this control, as is apparent from the above-described torque balance relationship shown in FIG. 4, the right output shaft-transmitted torque becomes larger than the left output shaft-transmitted torque, so that the right yaw moment of the vehicle V is reduced. In this case, the electric power supplied to the first and second stators 11a and 12a is controlled according to the steering angle θ, the vehicle speed VP, and the accelerator pedal opening AP. Note that an execution condition for executing the first torque distribution control for reducing the right yaw moment is e.g. a condition that it is during the motor assist or a condition that it is during the EV traveling and also the state of charge of the battery 23 is higher than the lower limit value.

Next, a description will be given of the second torque distribution control for reducing the right yaw moment. During the second torque distribution control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the first motor braking torque TG1 becomes larger than the second motor braking torque TG2.

With this control, as is apparent from the above-described torque balance relationship shown in FIG. 5, the braking torque acting on the left output shaft SL becomes larger than the braking torque acting on the right output shaft SR, so that the right yaw moment of the vehicle V is reduced. In this case, the electric power regenerated by the first and second rotating electric machines 11 and 12 is controlled according to the steering angle θ and the vehicle speed VP. Note that an execution condition for executing the second torque distribution control for reducing the right yaw moment is e.g. a condition that it is during deceleration traveling of the vehicle V, and also the state of charge of the battery 23 is lower than the upper limit value.

Figure 7:
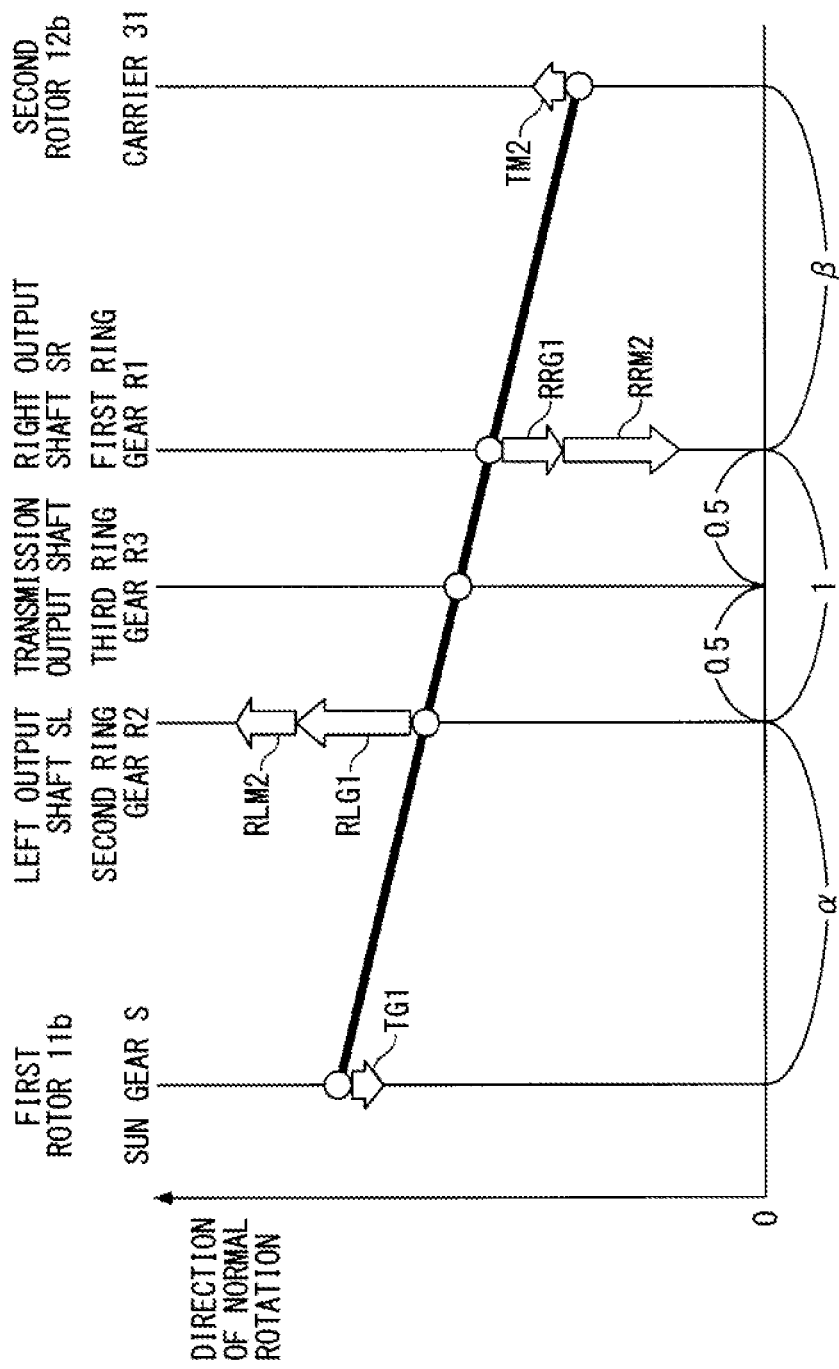
FIG. 7 A collinear chart showing a rotational speed relationship and a torque balance relationship between the various types of rotary elements of the power plant shown in FIG. 1, as to during third torque distribution control for reducing the right yaw moment.

Next, a description will be given of the third torque distribution control for reducing the right yaw moment. During the third torque distribution control, regeneration is performed by the first rotating electric machine 11, and powering is performed by the second rotating electric machine 12. FIG. 7 shows a rotational speed relationship and a torque balance relationship between the various types of rotary elements in this case. As described above with reference to FIG. 5, in FIG. 7, TG1 represents the first motor braking torque, and RLG1 and RRG1 represent the reaction force torques acting on the left output shaft SL and the right output shaft SR along with the regeneration by the first rotating electric machine 11, respectively. Further, as described above with reference to FIG. 4, in FIG. 7, TM2 represents the second motor output torque, and RLM2 and RRM2 represent the reaction force torques acting on the left output shaft SL and the right output shaft SR along with the powering by the second rotating electric machine 12, respectively.

In this case, the left output shaft-transmitted torque is expressed by −(RLG1+RLM2), and the right output shaft-transmitted torque is expressed by RRM2+RRG1. Thus, the braking torque acts on the left output shaft SL, and the drive torque acts on the right output shaft SR, so that the right yaw moment of the vehicle V is reduced. In this case as well, the electric power regenerated by the first rotating electric machine 11, and the electric power supplied to the second stator 12a are controlled according to the steering angle θ and the vehicle speed VP.

Further, −(RLG1+RLM2) of the above-mentioned left output shaft-transmitted torque is represented by −{TG1×(α+1)+TM2×β}, and RRM2+RR1 of the above-mentioned right output shaft-transmitted torque is represented by TM2×(β+1)+TG1×α. Since the first and second lever ratios α and β are set to the same value, it is possible to accurately and easily control torque distributed from the first and second rotating electric machines 11 and 12 to the left and right output shafts SL and SR via the first motor braking torque TG1 and the second motor output torque TM2.

Note that an execution condition for executing the third torque distribution control for reducing the right yaw moment is e.g. the following first reducing condition or second reducing condition:

The first reducing condition: It is during deceleration traveling of the vehicle V (during the fuel cut operation of the engine 3) and also the state of charge of the battery 23 is not lower than the upper limit value.

The second reducing condition: it is during deceleration traveling of the vehicle V, the state of charge of the battery 23 is lower than the upper limit value, and also braking torque demanded of the first rotating electric machine 11 is not lower than a predetermined second upper limit torque.

In this case, when the first reducing condition is satisfied, i.e. when the state of charge of the battery 23 not lower than the upper limit value, the battery 23 cannot be charged, and hence all the electric power regenerated by the first rotating electric machine 11 is supplied to the second stator 12a without being charged into the battery 23. On the other hand, when the second reducing condition is satisfied, part of the electric power regenerated by the first rotating electric machine 11 is charged into the battery 23, and the remainder is supplied to the second stator 12a. In this case, the second motor output torque TM2 is controlled such that an insufficient amount of the first motor braking torque TG1 with respect to the demanded braking torque is compensated for.

Next, a description will be given of the fourth torque distribution control for reducing the right yaw moment. During the fourth torque distribution control, the zero torque control is performed on the second rotating electric machine 12, and regeneration is performed by the first rotating electric machine 11. The electric power regenerated by the first rotating electric machine 11 is charged into the battery 23. In this case, only the first motor braking torque TG1 is generated, so that as is apparent from FIG. 7, the left output shaft-transmitted torque is represented by −RLG1, and the right output shaft-transmitted torque is represented by RRG1. Thus, the braking torque acts on the left output shaft SL, and the drive torque acts on the right output shaft SR, so that the right yaw moment of the vehicle V is reduced. In this case as well, the electric power regenerated by the first rotating electric machine 11 is controlled according to the steering angle θ and the vehicle speed VP.

Note that an execution condition for executing the fourth torque distribution control for reducing the right yaw moment is e.g. a condition that it is during deceleration traveling of the vehicle V, the state of charge of the battery 23 is lower than the upper limit value, and also the braking torque demanded of the first rotating electric machine 11 is smaller than the above-mentioned second upper limit torque.

Note that to reduce the right yaw moment, the zero torque control may be performed on the first rotating electric machine 11, and the powering may be performed by the second rotating electric machine 12. In this case, only the second motor output torque TM2 is generated, so that as is apparent from FIG. 7, the left output shaft-transmitted torque is represented by −RLM2, and the right output shaft-transmitted torque is represented by RRM2. Thus, the braking torque acts on the left output shaft SL, and the drive torque acts on the right output shaft SR, so that the right yaw moment of the vehicle V is reduced. In this case as well, the electric power supplied to the second stator 12a is controlled according to the steering angle θ, the vehicle speed VP, and the accelerator pedal opening AP.

Note that when the vehicle V turns to the left during forward traveling, to increase a counterclockwise yaw moment for causing the vehicle V to perform left turning (hereinafter referred to as the "left yaw moment"), first torque distribution control to fourth torque distribution control for increasing the left yaw moment during the left turning of the vehicle V are executed. To reduce the left yaw moment, first torque distribution control to fourth torque distribution control for reducing the left yaw moment during the left turning of the vehicle V are executed. The above first torque distribution control to fourth torque distribution control for increasing and reducing the left yaw moment during the left turning of the vehicle V are performed symmetrically to the above-described first torque distribution control to fourth torque distribution control for increasing and reducing the right yaw moment during the right turning of the vehicle V, respectively, and detailed description thereof is omitted.

Further, the correspondence between various elements of the first embodiment and various elements of the present invention is as follows: The vehicle V, and the left and right output shafts SL and SR of the first embodiment correspond to means of transportation, and two driven parts of the present invention, respectively. The engine 3, and the first and second rotating electric machines 11 and 12 of the first embodiment correspond to an energy output unit, and first and second energy input/output units of the present invention, respectively. Further, the sun gear S of the first embodiment corresponds to a fourth gear and a first outer rotary element of the present invention, and the carrier 31 of the first embodiment corresponds to a second outer rotary element of the present invention. Furthermore, the second ring gear R2 of the first embodiment corresponds to a second gear and a first quasi-outer rotary element of the present invention, the first ring gear R1 of the first embodiment corresponds to a first gear and a second quasi-outer rotary element of the present invention, and the third ring gear R3 of the first embodiment corresponds to a third gear and a central rotary element of the present invention.

As described above, according to the first embodiment, the differential gear unit GS is formed by the carrier 31, the triple pinion gear 32 comprised of the first to third pinion gears P1 to P3 integrally formed with each other, the sun gear S, the first to third ring gears R1 to R3, and the additional pinion gears 33 (FIG. 2). Further, the sun gear S, the second ring gear R2, the third ring gear R3, the first ring gear R1, and the carrier 31 form the five rotary elements, and the five rotary elements are in a collinear relationship in which they are aligned in a single straight line in the collinear chart in the mentioned order (FIGS. 4 to 7). Thus, a differential gear unit equivalent to the differential gear unit of the power plant disclosed in PTL 2 can be formed by the carrier 31, the triple pinion gear 32, the sun gear S, the first to third ring gears R1 to R3, and the additional pinion gear 33, whereby the power plant can be formed by the seven component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the sun gear S and the carrier 31, which are positioned on opposite outer sides of the collinear chart, respectively, are mechanically connected to the first and second rotating electric machines 11 and 12 (the first and second rotors 11b and 12b), respectively, and the second and first ring gears R2 and R1 that are positioned adjacent to the sun gear S and the carrier 31, respectively, are mechanically connected to the left and right output shafts SL and SR, respectively. This makes it possible to transmit rotational energy output from the first and second rotating electric machines 11 and 12 to the left and right output shafts SL and SR via the differential gear unit GS, and properly drive the two SL and SR. In this case, the rotational speeds of the five rotary elements (the sun gear S, the second ring gear R2, the third ring gear R3, the first ring gear R1, and the carrier 31) are in the collinear relationship with each other, and hence by controlling input and output of rotational energy to and from the first and second rotating electric machines 11 and 12, it is possible to properly control rotational energy (torque) distributed to the left and right output shafts SL and SR.

Furthermore, out of the five rotary elements, the third ring gear R3 located at a central portion of the collinear chart is mechanically connected to the engine 3 which is provided separately from the first and second rotating electric machines 11 and 12. With this, not only the rotational energy output from the first and second rotating electric machines 11 and 12 but also rotational energy from the engine 3 is transmitted to the left and right output shafts SL and SR, and hence it is possible to reduce torque demanded of the first and second rotating electric machines 11 and 12, whereby it is possible to downsize the two 11 and 12.

Figure 20:
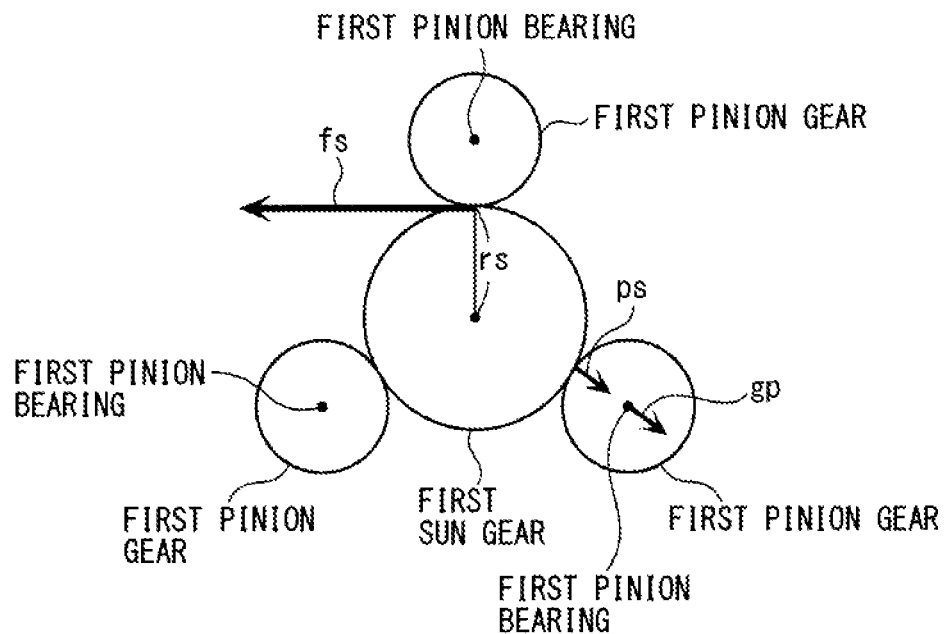
FIG. 20 A diagram useful in explaining advantageous effects provided by the present invention.
Figure 21:
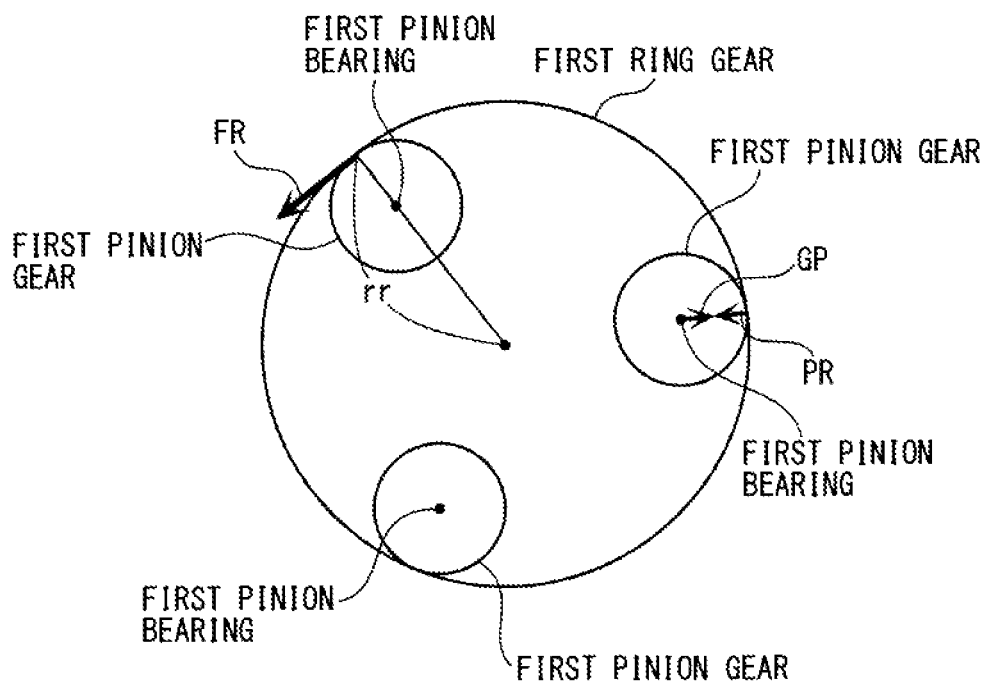
FIG. 21 A diagram different from FIG. 20, which is useful in explaining the advantageous effects provided by the present invention.

Further, not the sun gear S but the second and first ring gears R2 and R1 are mechanically connected to the left and right output shafts SL and SR, respectively. Therefore, as described with reference to FIGS. 20 and 21, it is possible to set the tooth widths of the first and second ring gears R1 and R2 to relatively small values, whereby it is possible to further downsize the power plant. For the same reason, it is possible to downsize the bearings supporting the first and second pinion gears P1 and P2, which also makes it possible to attain further downsizing of the power plant.

Note that although in the first embodiment, the sun gear S and the carrier 31 are connected to the first and second rotors 11b and 12h, respectively, and the second and first ring gears R2 and R1 are connected to the left and right output shafts SL and SR, respectively, inversely, the carrier and the sim gear may be connected to the first and second rotors, respectively, and the first and second ring gears may be connected to the left and right output shafts, respectively. Further, although in the first embodiment, the sun gear S is provided in a manner associated with the first pinion gear P1, and the additional pinion gear 33 is brought into mesh with the sun gear S and the first pinion gears P1, the sun gear S may be provided in a manner associated with the second or third pinion gears, and the additional pinion gear may be brought into mesh with one of the second and third pinion gears, with which the sun gear is associated, and the sun gear. In this case as well, the order of appearance of the sun gear, the second ring gear, the third ring, the first ring gear, and the carrier in a collinear chart indicating the relationship between the rotational speeds is the same as the order of appearance thereof shown in FIGS. 4 to 7, and the relationship of connections between the first rotor, the left output shaft, the transmission output shaft, the right output shaft, and the second rotor is also the same as the relationship of connections therebetween shown in FIGS. 4 to 7.

Figure 8:
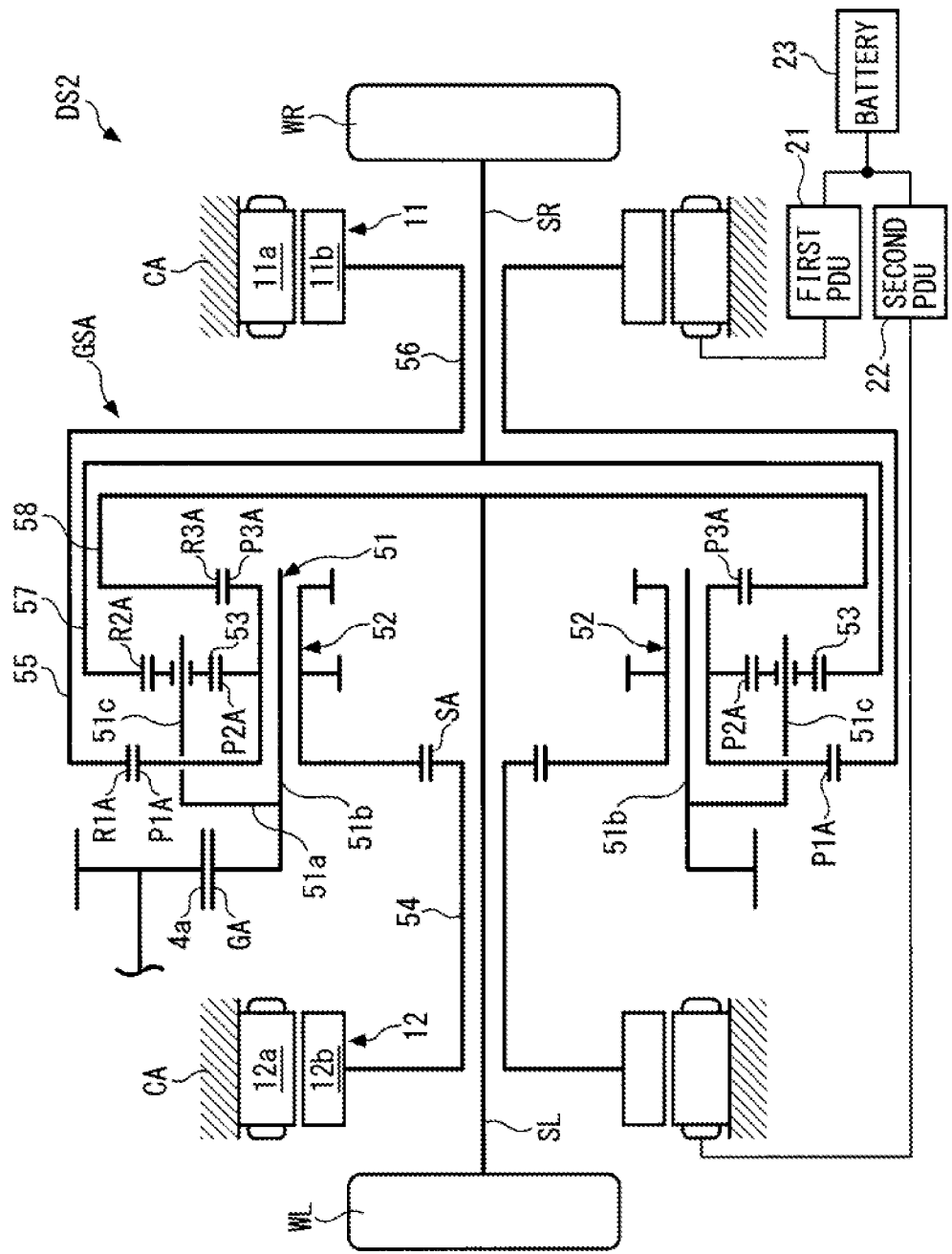
FIG. 8 A skeleton diagram of a power plant etc. according to a second embodiment of the present invention.
Figure 9:
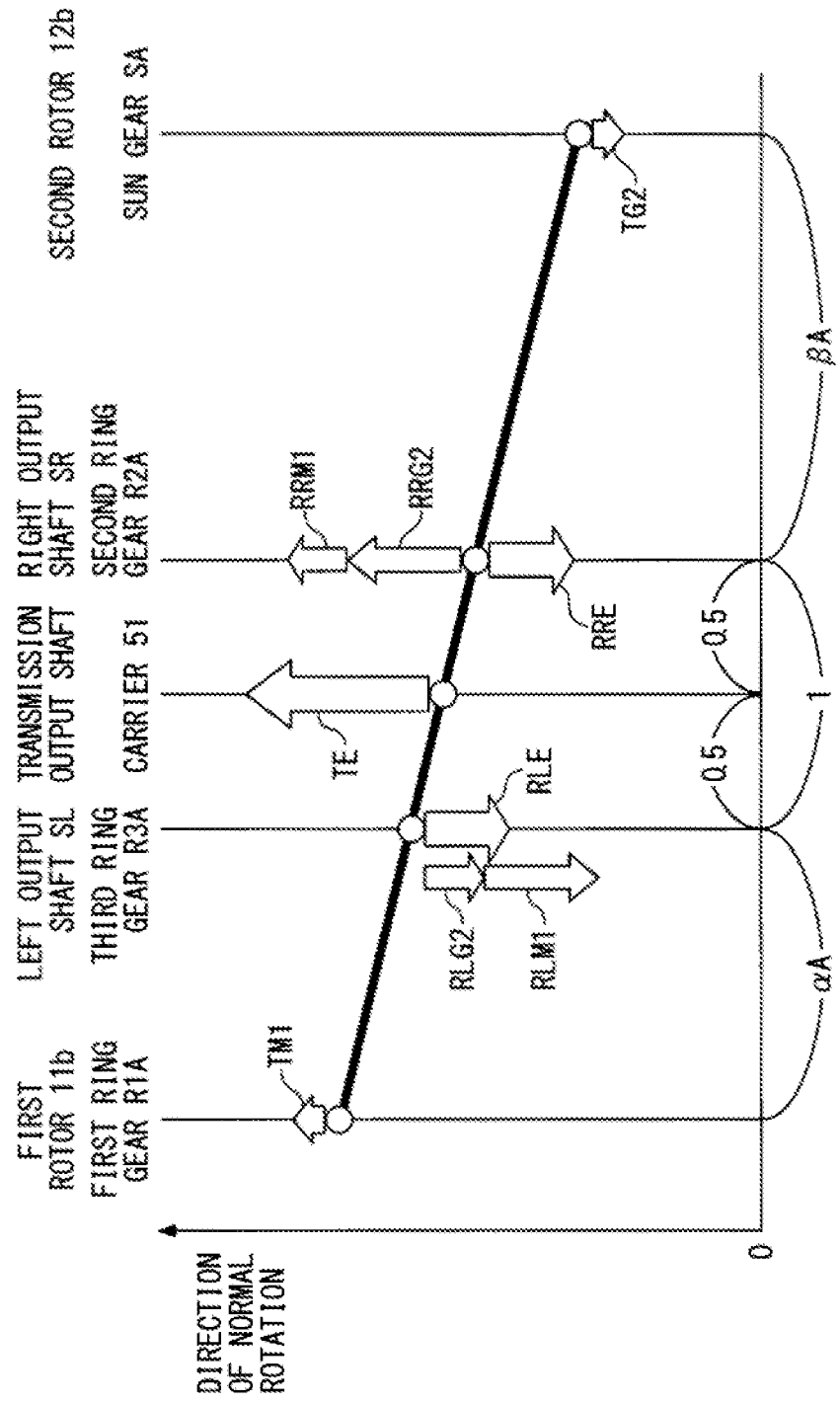
FIG. 9 A collinear chart showing a rotational speed relationship and a torque balance relationship between various types of rotary elements of the power plant shown in FIG. 8.

Next, a power plant according to a second embodiment of the present invention will be described with reference to FIGS. 8 and 9. Compared with the first embodiment, a distribution system DS2 of this power plant is mainly different in that additional pinion gears 53 are in mesh with not a sun gear SA and first pinion gears P1A but second pinion gears P2A and a second ring gear R2A. In FIGS. 8 and 9, the same component elements as those of the first embodiment are denoted by the same reference numerals. The following description is given mainly of different points of the power plant according to the second embodiment from the first embodiment.

As shown in FIG. 8, a differential gear unit GSA of the distribution system DS2 is formed by the sun gear SA, a carrier 51, triple pinion gears 52, the additional pinion gears 53, and first to third ring gears R1A to R3A. The first rotating electric machine 11 is disposed between the differential gear unit GSA and the right front wheel WR, and the second rotating electric machine 12 is disposed between the differential gear unit GSA and the left front wheel WL. The sun gear SA and the first to third ring gears R1A to R3A are arranged coaxially with the left and right output shafts SL and SR. Further, the sun gear SA is formed by an externally-toothed gear, and is provided, in a manner associated with the first pinion gears P1A, described hereinafter, radially inward of the first pinion gears P1A. The sun gear SA is in mesh with the first pinion gears P1A. Further, the sun gear SA is coaxially connected to the second rotor 12b via a hollow cylindrical first rotating shaft 54 rotatably supported by a bearing (not shown), and is rotatable in unison with the second rotor 12b. The left output shaft SL is coaxially and relatively rotatably disposed radially inward of the first rotating shaft 54.

The carrier 51 is comprised of a root portion 51a having an annular plate shape, and first support shafts 51b and second support shafts 51c, which are integrally formed with the root portion 51a, and is rotatably supported a bearing (not shown). The sun gear SA and the first rotating shaft 54 are relatively rotatably disposed radially inward of the carrier 51. Although the numbers of the first and second support shafts 51b and 51c, the number of the triple pinion gears 52, and the number of the additional pinion gears 53 are three (only two of each are shown), respectively, it is to be understood that this is not limitative.

The above-mentioned root portion 51a is arranged coaxially with the left and right output shafts SL and SR. Further, a gear GA, which is an externally-toothed gear, is integrally formed on the root portion 51a. The gear GA is in mesh with the above-mentioned gear 4a of the transmission output shaft. The first and second support shafts extend from the root portion 51a toward the right front wheel WR in parallel with the left and right output shafts SL and SR. Further, the first support shafts 51b are each located at a radially inner end of the root portion 51a, and the second support shafts 51c are each located at a radially outer end of the root portion 51a. Furthermore, the three first support shafts 51b are located at equally-spaced intervals in a circumferential direction of the root portion 51a. The same applies to the three second support shafts 51c.

Similar to the first embodiment, each of the above-mentioned triple pinion gears 52 is comprised of the first pinion pear P1A, the second pinion gear P2A, and a third pinion gear P3A, which are externally-toothed gears integrally formed with each other, and is rotatably supported on an associated one of the first support shafts 51b via a bearing (not shown). The positional relationship between the first to third pinion dears P1A to P3A is the same as that between the first to third pinion gears P1 to P3 of the first embodiment.

The first to third ring gears R1A to R3A are formed by the same internally-toothed gears as those forming the first to third ring gears R1 to R3 of the first embodiment, and are provided, in a manner associated with the first to third pinion gears P1A to P3A, radially inward of the first to third pinion gears P1A to P3A, respectively. Further, the first ring gear R1A, which is in mesh with the first pinion gears P1A, is coaxially connected to the first rotor 11b via a hollow cylindrical second rotating shaft 55 rotatably supported by a bearing (not shown), a flange, and a hollow cylindrical third rotating shaft 56, and is rotatable in unison with the first rotor 11b. A fourth rotating shaft 57, described hereinafter, is relatively rotatably disposed radially inward of the second rotating shaft 55, and the right output shaft SR is relatively rotatably disposed radially inward of the third rotating shaft 56.

The second ring gear R2A is coaxially connected to the right output shaft SR via the fourth rotating shalt 57, which is hollow and is rotatably supported by a bearing (not shown), and a flange, and rotatable in unison with the right output shaft SR. A fifth rotating shaft 58, described hereinafter, is relatively rotatably disposed radially inward of the fourth rotating shaft 57. Each additional pinion gear 53, which is formed by an externally-toothed gear, is rotatably supported on an associated one of the second support shafts 51c via a bearing (not shown), and is in mesh with both an associated one of the second pinion gears P2A and the second ring gear R2A. The third ring gear R3A, which is in mesh with the third pinion gears P3A, is coaxially connected to the left output shaft SL via the fifth rotating shaft 58, which is hollow and is rotatably supported by a bearing not shown), and a flange, and is rotatable in unison with the left output shaft SL.

Further, numbers ZP1A to ZP3A of gear teeth of the first to third pinion gears P1A to P3A, and numbers ZR1A to ZR3A of gear teeth of the first to third ring gears R1A to R3A are set such that the following equations (5) and (6) hold therebetween.

$$ZR3A/ZP3A > ZR1A/ZP1A \quad (5)$$

$$ZP2A/ZR2A = ZP3A/ZR3A \quad (6)$$

In the power plant constructed as above, since the differential gear unit GSA is constructed as described above, the sun gear SA, the second ring gear R2A, the carrier 51, the third ring gear R3A, and the first ring gear R1A can transmit motive power therebetween, and the rotational speeds thereof are in a collinear relationship. Further, when the sun gear SA is rotated in a state in which the carrier 51 is fixed, the second ring gear R2A rotates in the same direction as the direction of rotation of the sun gear SA, and the first and third ring gears R1A and R3A rotate in a direction opposite to the direction of the rotation of the sun gear SA. In this case, from the relationship between the numbers of gear teeth of the gears, the rotational speed of the sun gear SA becomes higher than the rotational speed of the second ring gear R2A, and the rotational speed of the third ring gear R3A becomes higher than the rotational speed of the first ring gear R1A. From the above, in a collinear chart indicating the relationship between the rotational speeds, the sun gear SA, the second ring gear R2A, the carrier 51, the third ring gear R3A, and the first ring gear R1A are depicted in this order.

Further, since the sun gear SA and the second rotor 12b are connected to each other via the first rotating shaft 54, the rotational speed of the sun gear SA and that of the second rotor 12b are equal to each other. Further, since the second ring gear R2A is connected to the right output shaft SR is the fourth rotating shaft 57 and the flange, the rotational speed of the second ring gear R2A and that of the right output shaft SR are equal to each other. Further, since the carrier 51 is connected to the transmission output shaft of the transmission 4 via the gear GA and the gear 4a, the rotational speed of the carrier 51 and that of the transmission output shaft are equal to each other provided that a change in speed by the gear GA and the gear 4a is ignored. Furthermore, the third ring gear R3A is connected to the left output shaft SL via the fifth rotating shaft 58 and the flange, and hence the rotational speed of the third ring gear R3A and that of the left output shaft SL are equal to each other. Further, the first ring gear R1A is connected to the first rotor 11b via the second rotating shaft 55, the flange, and the third rotating shaft 56, and hence the rotational speed of the first ring gear R1A and the rotational speed of the first rotor 11b are equal to each other.

From the above, a rotational speed relationship between various types of rotary elements of the power plant is expressed e.g. in a collinear chart shown in FIG. 9. As is apparent from FIG. 9, the left and right output shafts SL and SR can be differentially rotated with each other. Further, in FIGS. 9, $\alpha A$ and $\beta A$ represent a first lever ratio and a second lever ratio (torque ratio, speed ratio) respectively, and are expressed by the following equations. (7) and (8):

$$\alpha A = ZR2A(ZR3A \times ZP1A - ZR1A \times ZP3A)/ZR1A(ZR2A \times ZP3A + ZR3A \times ZP2A) \quad (7)$$

$$\beta A = ZR3A(ZR2A \times ZP1A - ZSA \times ZP2A)/ZSA(ZR2A \times ZP3A + ZR3A \times ZP2A) \quad (8)$$

wherein ESA represents the number of gear teeth of the sun gear SA.

The numbers ZR1A to ZR3A of gear teeth of the first to third ring gears R1A to R3A, the numbers ZP1A to ZP3A of gear teeth of the first to third pinion gears P1A to P3A, and the number ZSA of the gear teeth of the sun gear SA are set such that the first and second lever ratios αA and βA take relatively large values not only on condition that the above-mentioned equations (5) and (6) hold but also on condition that one of the first and second rotors 11b and 12b does not perform reverse rotation within a range in which the left and right front wheels WL and WR can be differentially rotated with each other.

Further, as is apparent from a comparison between FIG. 9 and FIGS. 4 to 7, the distribution system DS2 performs operation in the same manner as the distribution system DS1 according to the first embodiment. Detailed description thereof is omitted.

Further, the correspondence between various elements of the second embodiment and the various elements of the present invention is as follows: The first ring gear R1A of the second embodiment corresponds to the first gear and the first outer rotary element of the present invention, and the sun gear SA of the second embodiment corresponds to the fourth gear and the second outer rotary element of the present invention. Further, the third ring gear R3A of the second embodiment corresponds to the third gear and the first quasi-outer rotary element of the present invention, the second ring gear R2A of the second embodiment corresponds to the second gear and the second quasi-outer rotary element of the present invention, and the carrier 51 of the second embodiment corresponds to the central rotary element of the present invention. The other corresponding relations are the same as in the first embodiment.

As described above, according to the second embodiment, the differential gear unit GSA is formed by the carrier 51, the triple pinion gear 52 comprised of the first to third pinion gears P1A to P3A integrally formed with each other, the sun gear SA, the first to third ring gears R1A to R3A, and the additional pinion gear 53 (FIG. 8). Further, the first ring gear R1A, the third ring gear R3A, the carrier 51, the second ring gear R2A, and the sun gear SA form the five rotary elements, and the five rotary elements are in a collinear relationship in which they are aligned in a single straight line in the collinear chart in the mentioned order (FIG. 9). Thus, a differential gear unit equivalent to the differential gear unit of the power plant disclosed in PTL 2 can be formed by the carrier 51, the triple pinion gear 52, the sun gear SA, the first to third ring gears R1A to R3A, and the additional pinion gear 53, whereby similar to the first embodiment, the power plant can be formed by the seven component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the first ring gear R1A and the sun gear SA, which are positioned on opposite outer sides of the collinear chart, respectively, are mechanically connected to the first and second rotating electric machines 11 and 12 (the first and second rotors 11b and 12b), respectively, and the third and second ring gears R3A and R2A that are positioned adjacent to the first ring gear R1A and the sun gear SA, respectively, are mechanically connected to the left and right output shafts SL and SR. As a consequence, similar to the first embodiment, it is possible to transmit rotational energy output from the first and second rotating electric machines 11 and 12 to the left and right output shafts SL and SR via the differential gear unit GSA, and properly drive the two SL and SR, and by controlling input and output of rotational energy to and from the first and second rotating electric machines 11 and 12, it is possible to properly control rotational energy (torque) distributed to the left and right output shafts SL and SR.

Further, out of the five rotary elements, the carrier 51 located at a central portion of the collinear chart is mechanically connected to the engine 3, and hence similar to the first embodiment, it is possible to reduce torque demanded of the first and second rotating electric machines 11 and 12, whereby it is possible to downsize the two 11 and 12. Further, not the sun gear SA but the third and second ring gears R3A and R2A are mechanically connected to the left and right output shafts SL and SR, respectively. Therefore, similar to the first embodiment, it is possible to set the tooth widths of the second and third ring gears R2A and R3A to relatively small values, whereby it is possible to further downsize the power plant. For the same reason, it is possible to downsize the bearings supporting the additional pinion gear 53 and the third pinion gear P3A, which also makes it possible to attain further downsizing of the power plant.

Note that although in the second embodiment, the first ring gear R1A and the sun gear SA are connected to the first and second rotors 11b and 12b, respectively, and the third and second ring gears R3A and R2A are connected to the left and right output shafts SL and SR, respectively, inversely, the sun gear and the first ring gear may be connected to the first and second rotors, respectively, and the second and third ring gears may be connected to the left and right output shafts, respectively. Further, although in the second embodiment, the additional pinion gear 53 is brought into mesh with both the second pinion gears P2A and the second ring gear R2A, the additional pinion gear 53 may brought into mesh with both the first pinion gear and the first ring gear, or both the third pinion gear and the third ring gear. In this case, the second ring gear is brought into mesh with the second pinion gear. Furthermore, although in the second embodiment, the sun gear SA is brought into mesh with the first pinion gear P1A, the sun gear SA may be brought into mesh with the second or third pinion gear.

Further, in any of the above-described variations, out of the five rotary elements of the sun gear, the first to third ring gears, and the carrier, the first and second outer rotary elements, which are positioned on opposite outer sides of the collinear chart indicating the relationship between the rotational speeds, respectively, are connected to the first and second rotors, respectively, and the first and second quasi-outer rotary elements that are positioned adjacent to the first and second outer rotary elements, respectively, are connected to the left and right output shafts, respectively. Furthermore, out of the five rotary elements, the central rotary element located at the central portion of the collinear chart is connected to the engine. Further, in the above-described variations, to cause the relationship of connections between the first and second rotors, and so forth to hold, it is sometimes required to set the relationship between the numbers of gear teeth of the gears to a relationship different from the relationship expressed by the above-mentioned equations (5) and (6).

Further, although in the second embodiment, in a collinear chart indicating the relationship between the rotational speeds, the distances from the carrier 51 to the second and third ring gears R2A and R3A are equal to each other, they may be made different from each other. In this case, the above-mentioned equation (6) is not required to hold between the respective numbers of gear teeth of the second and third pinion gears and the respective numbers of gear teeth of the second and third ring gears, and this increases the degree of freedom of setting of the numbers of gear teeth, and hence it possible to set the numbers of gear teeth of the gears such that the above-described first and second lever ratios become equal to each other.

Figure 10:
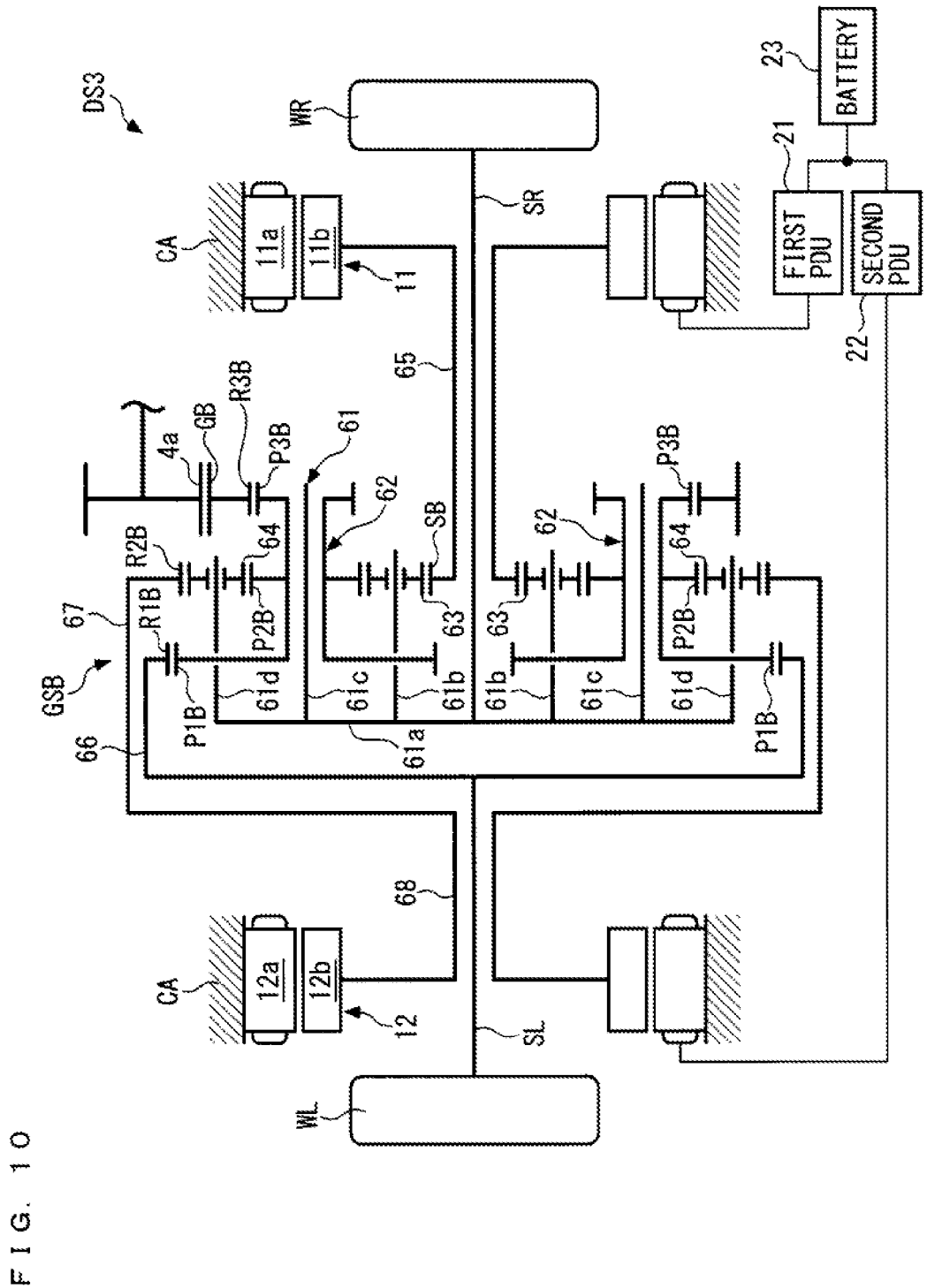
FIG. 10 A skeleton diagram of a power plant etc. according to a third embodiment of the present invention.
Figure 11:
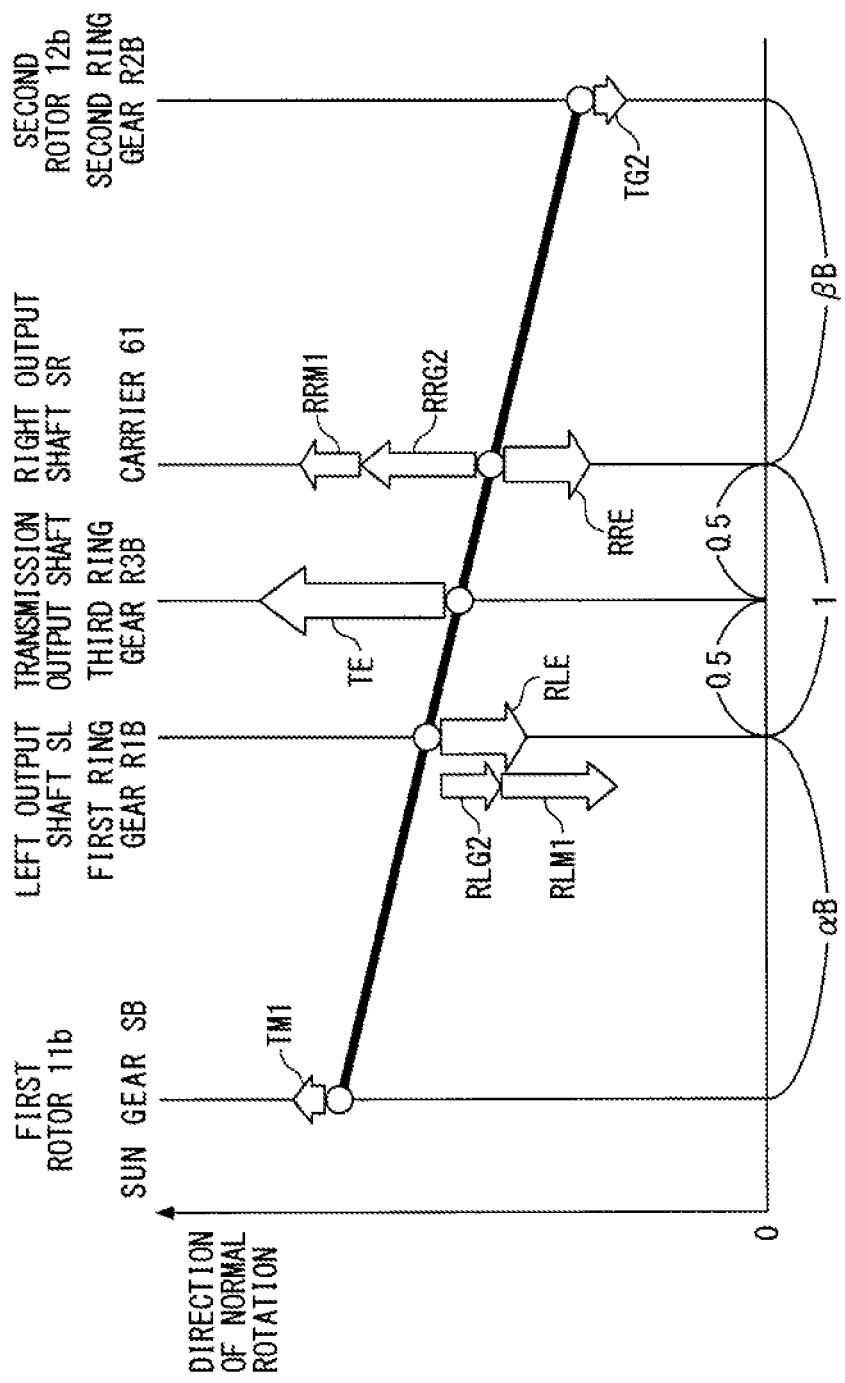
FIG. 11 A collinear chart showing a rotational speed relationship and a torque balance relationship between various types of rotary elements of the power plant shown in FIG. 10.

Next, a power plant according to a third embodiment of the present invention will be described with reference to FIGS. 10 and 11. Compared with the first embodiment, a distribution system DS3 of this power plant is mainly different in that it includes first and second additional pinion gears 63 and 64 in place of the additional pinion gears 33. In FIGS. 10 and 11, the same component elements as those of the first embodiment are denoted by the same reference numerals. The following description is given mainly of different points of the power plant according to the third embodiment from the first and second embodiments.

As shown in FIG. 10, a differential gear unit GSB of the distribution system DS3 is formed by a sun gear SB, a carrier 61, triple pinion gears 62, the first and second additional pinion gears 63 and 64, and first to third ring gears R1B to R3B. The positional relationship between the differential gear unit GSB, the left and right front wheels WL and WR, and the first and second rotating electric machines 11 and 12 is the same as in the second embodiment, and the sun gear SB and the first to third ring gears R1B to R3B are arranged coaxially with the left and right output shafts SL and SR. Further, the sun gear SB is formed by an externally-toothed gear, and is provided, in a manner associated with second pinion gears P2B, described hereinafter, radially inward of the second pinion gears P2B. Furthermore, the sun gear SB is coaxially connected to the first rotor 11b via a hollow cylindrical first rotating shaft 65 rotatably supported by a bearing (not shown), and is rotatable in unison with the first rotor 11b. The right output shaft SR is coaxially and relatively rotatably disposed radially inward of the first rotating shaft 65.

The carrier 61 is comprised of a root portion 61a having a disk shape, and first support shafts 61b, second support shafts 61c, and third support shafts 61d, which are integrally formed with the root portion 61a, and is rotatably supported by a bearing (not shown). The sun gear SB and the first rotating shaft 65 are relatively rotatably disposed radially inward of the carrier 61. Although the numbers of the first to third support 61b, 61c, and 61d, the number of the triple pinion gears 62, and the numbers of the first and second additional pinion gears 63 and 64 are three (only two of each are shown), respectively, it is to be understood that this is not limitative.

The above-mentioned root portion 61a is coaxially attached to the right output shaft SR, whereby the carrier 61 is rotatable in unison with the right output shaft SR. The first to third support shafts 61b, 61c, and 61d extend from the root portion 61a toward the right front wheel WR in parallel with the left and right output shafts SL and SR, and are radially arranged from inside in this order. Further, the three first support shafts 61b are located at equally-spaced intervals in a circumferential direction of the root portion 61a. The same applies to the three second and three third support shafts 61c and 61d.

Similar to the first embodiment, each of the above-mentioned triple pinion gears 62 is comprised of a first pinion gear P1B, the second pinion gear P2B, and a third pinion gear P3B, which are externally-toothed gears integrally formed with each other, and is rotatably supported on an associated one of the second support shafts 61c via a bearing (not shown). The positional relationship between the first to third pinion gears P1B to P3B is the same as that between the first to third pinion gears P1 to P3 of the first embodiment.

The first to third ring gears R1B to R3B are formed by the same internally-toothed gears as those forming the first to third ring gears R1 to R3 of the first embodiment, and are provided, in a manner associated with the first to third pinion gears P1B to P3B, radially outward of the first to third pinion gears P1B to P3B, respectively. Further, the first ring gear R1B, which is in mesh with the first pinion gear P1B, is coaxially connected to the left output shaft SL via a hollow cylindrical second rotating shaft 66 rotatably supported by a bearing (not shown) and a flange, and is rotatable in unison with the left output shaft SL. The second ring gear R2B is coaxially connected to the second rotor 12b via a hollow cylindrical third rotating shaft 67 rotatably supported by a bearing (not shown), a flange, and a hollow cylindrical fourth rotating shaft 68, and is rotatable in unison with the second rotor 12b. The above-mentioned second rotating shaft 66 is relatively rotatably disposed radially inward of the third rotating shaft 67, and the left output shaft SL is relatively rotatably disposed radially inward of the fourth rotating shaft 68. The third ring gear R3B is in mesh with the third pinion gear P3B, and a gear GB, which is an externally-toothed gear, is formed on an outer periphery of the third ring gear R3B. The gear GB is in mesh with the gear 4a of the transmission output shaft.

Each first additional pinion gear 63, which is formed by an externally-toothed gear, is rotatably supported on an associated one of the first support shafts 61b by a bearing (not shown), and is in mesh with both the sun gear SB and an associated one of the second pinion gears P2B. Each second additional pinion gear 54, which is formed by an externally-toothed gear, is rotatably supported on an associated one of the third support shafts 61d via a bearing (not shown), and is in mesh with both an associated one of the second pinion gears P2B and the second ring gear R2B. Further, numbers ZP1B to ZP3B of gear teeth of the first to third pinion gears P1B to P3B, and numbers ZR1B to ZR3B of gear teeth of the first to third ring gears R1B to R3B are set such that the following equations (9) and (10) hold therebetween.

$$ZR3B/ZP3B > ZR1B/ZP1B > ZR2B/ZP2B \quad (9)$$

$$ZP1B/ZR1B = 2 \times ZP3B/ZR3B \quad (10)$$

In the power plant constructed as above, since the differential gear unit GSB is constructed as described above, the sun gear SB, the first ring gear R1B, the third ring gear R3B, the carrier 61, and the second ring gear R2B can transmit motive power therebetween, and the rotational speeds thereof are in a collinear relationship. Further, when the sun gear SB is rotated in a state in which the carrier 61 is fixed, the first and third ring gears R1B and R3B rotate in the same direction as the direction of rotation of the sun gear SB, and the second ring gear R2B rotates in a direction opposite to the direction of the rotation of the sun gear SB. In this case, from the relationship between the numbers of gear teeth of the gears, the relationship of "the rotational speed of the sun dear SE>the rotational speed of the first ring gear R1B>the rotational speed of the third ring gear R3B" holds between the rotational sped of the sun gear SB, and the rotational speeds of the rat and third ring gears R1B and P3B. From the above, in a collinear chart indicating the relationship between the rotational speeds, the sun gear SB, the first ring gear R1B, the third ring gear R3B, the carrier 61, and the second ring gear R2B are depicted in this order.

Further, since the sun gear SB and the first rotor 11b are connected to each other via the first rotating shaft 65, the rotational speed of the sun gear SB and that of the first rotor 11b are equal to each other. Furthermore, since the first ring gear R1B is connected to the left output shaft SL via the second rotating shaft 66 and the flange, the rotational speed of the first ring gear R1B and that of the left output shaft SL are equal to each other. Further, since the third ring gear R3B is connected to the transmission output shaft of the transmission 4 via the gear GB and the gear 4a, the rotational speed of the third ring gear R3B and that of the transmission output shaft are equal to each other provided that a change in speed by the gear GB and the gear 4a is ignored. Furthermore, the carrier 61 is directly connected to the right output shaft SR, and hence the rotational speed of the carrier 61 and that of the right output shaft SR are equal to each other. Further, the second ring gear R2B is connected to the second rotor 12b via the third rotating shaft 67, the flange, and the fourth rotating shaft 68, and hence the rotational speed of the second ring gear R2B and the rotational speed of the second rotor 12b are equal to each other.

From the above, a rotational speed relationship between various types of rotary elements of the power plant is expressed e.g. in a collinear chart shown FIG. 11. As is apparent from FIG. 11 the left and output shafts SL and SR can be differentially rotated with each other. Further, in FIG. 11, αB and βB represent a first lever ratio and a second lever ratio (torque ratio, speed ratio) respectively, and are expressed by the following equations (11) and (12):

$$\alpha B = ZR1B \times ZP2B/(ZSB \times ZP1B) - 1 \qquad (11)$$

$$\beta B = ZR1B \times ZP2B/(ZR2B \times ZP1B) \qquad (12)$$

wherein ZSB represents the number of gear teeth of the sun gear SB.

The numbers ZR1B and ZR2B of gear teeth of the first and second ring gears R1B and R2B, the numbers ZP1B and ZP2B of gear teeth of the first and second pinion gears P1B and P2B, and the number ZSB of the gear teeth of the sun gear SB are set such that the first and second lever ratios α B and βB become equal to each other and take relatively large values not only on condition that the above-mentioned equations (9) and (10) hold, but also on condition that one of the first and second rotors 11b and 12b does not perform reverse rotation within a range in which the left and right front wheels WL and WR can be differentially rotated with each other.

Further, as is apparent from a comparison between FIG. 11 and FIGS. 4 to 7, the distribution system DS3 performs operation in the same manner as the distribution-system DS1 according to the first embodiment. Detailed description thereof is omitted.

Further, the correspondence between various elements of the third embodiment and the various elements of the present invention is follows: The sun gear SB of the third embodiment corresponds to the fourth gear and the first outer rotary element of the present invention, the second ring gear R2B of the third embodiment corresponds to the second gear and the second outer rotary element of the present invention, and the first and second additional pinion gears 63 and 64 of the third embodiment correspond to the additional pinion gear of the present invention. Further, the first ring gear R1B of the third embodiment corresponds to the first gear and the first quasi-outer rotary element of the present invention, the carrier 61 of the third embodiment corresponds to the second quasi-outer rotary element of the present invention, and the third ring gear R3B of the third embodiment corresponds to the third gear and the central rotary element of the present invention. The other corresponding relations are the same as in the first embodiment.

As described above, according to the third embodiment, the differential gear unit GSB is formed by the carrier 61, the triple pinion gear 62 comprised of the first to third pinion gears P1B to P3B integrally formed with each other, the sun gear SB, the first to third ring gears R1B to R3B, and the first and second additional pinion gears 63 and 64 (FIG. 10). Further, the sun gear SB, the first ring gear R1B, the third ring gear R3B, the carrier 61, and the second ring gear R2B form the five rotary elements, and the five rotary elements are in a collinear relationship in which they are aligned in a single straight line in the collinear chart in the mentioned order (FIG. 11). Thus, a differential gear unit equivalent to the differential gear unit of the power plant disclosed in PTL 2 can be formed by the carrier 61, the triple pinion gear 62, the sun gear SB, the first to third ring gears R1B to R3B, and the first and second additional pinion gears 63 and 64, whereby the power plant can be formed by the eight component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the sun gear SB and the second ring gear R2B, which are positioned on opposite outer sides of the collinear chart, respectively, are mechanically connected to the first and second rotating electric machines 11 and 12 (the first and second rotors 11b and 12b), respectively, and the first ring gear R1B and the carrier 61, which are positioned adjacent to the sun gear SE and the second ring gear R2B, respectively, are mechanically connected to the left and right output shafts SL and SR, respectively. As a consequence, similar to the first and second embodiments, it is possible to transmit rotational energy output from the first and second rotating electric machines 11 and 12 to the left and right output shafts SL and SR via the differential gear unit GSB, and properly drive the two SL and SR, and by controlling input and output of rotational energy to and from the first and second rotating electric machines 11 and 12, it is possible to properly control rotational energy (torque) distributed to the left and right output shafts SL and SR.

Further, out of the five rotary elements, the third ring gear R3B located at a central portion of the collinear chart is mechanically connected to the engine 3, and hence similar to the first and second embodiments, it is possible to reduce tongue demanded of the first and second rotating electric machines 11 and 12, whereby it is possible to downsize the two 11 and 12. Further, not the sun gear SB but the first ring gear R1B and the carrier 61 are mechanically connected to the left and right output shafts SL and SR, respectively. Therefore, similar to the first and second embodiments, it is possible to set the tooth width of the first ring gear R1B to a relatively small value, whereby it is possible to further downsize the power plant. For the same reason, it is possible to downsize the bearings supporting the first pinion gears P1B, which also makes it possible to attain further downsizing of the power plant.

Note that although in the third embodiment, the sun gear SE and the second ring gear R2B are connected to the first and second rotors 11b and 12b, respectively, and the first ring gear R1B and the carrier 61 are connected to the left and right output shafts SL and SR, respectively, inversely, the second ring gear and the sun gear may be connected to the first and second rotors, respectively, and the carrier and the first ring gear may be connected to the left and right output shafts, respectively. Further, although in the third embodiment, the sun gear SB is provided in a manner associated with the second pinion gear P2B, and the first additional pinion gear 63 is brought into mesh with the sun gear SB, and the second pinion gear P2B the sun gear may be provided in a manner associated with the first or third pinion gear, and the first additional pinion gear may be brought into mesh with one of the first and third pinion gears, with which the sun gear is associated, and the sun gear.

Furthermore, although in the third embodiment, the second additional pinion gear 64 is brought into mesh with both the second pinion gear P2B and the second ring gear R2B, the second additional pinion gear 64 may be brought into mesh with both the first pinion gear and the first ring gear or the third pinion gear and the third ring gear. In this case, the second ring gear is brought into mesh with the second pinion gear. Further, in any of the above-described variations, out of the five rotary elements of the sun gear, the first to third ring gears, and the carrier, the first and second outer rotary elements, which are positioned on opposite outer sides of the collinear chart indicating the relationship between the rotational speeds, respectively, are connected to the first and second rotors, respectively, and the first and second quasi-outer rotary elements that are positioned adjacent to the first and second outer rotary elements, respectively, are connected to the left and right output shafts, respectively. Furthermore, out of the five rotary elements, the central rotary element located at the central portion of the collinear chart is connected to the engine. Further, in the above-described variations, to cause the relationship of connections between the first and second rotors, and so forth to hold, it is sometimes required to set the relationship between the numbers of gear teeth of the gears to a relationship different from the relationship expressed by the above-mentioned equations (9) and (10).

Figure 12:
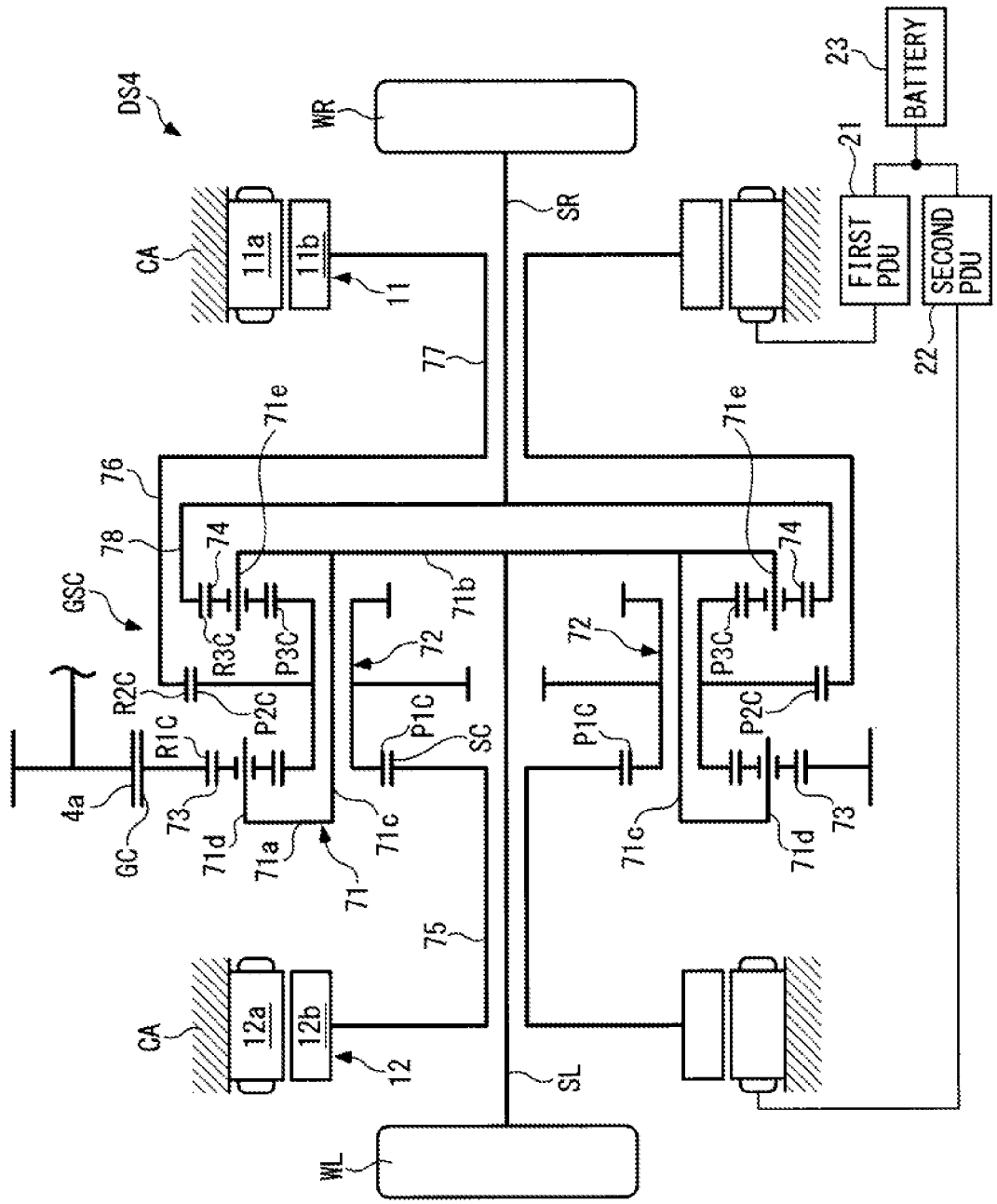
FIG. 12 A skeleton diagram of a power plant etc. according to a fourth embodiment of the present invention.
Figure 13:
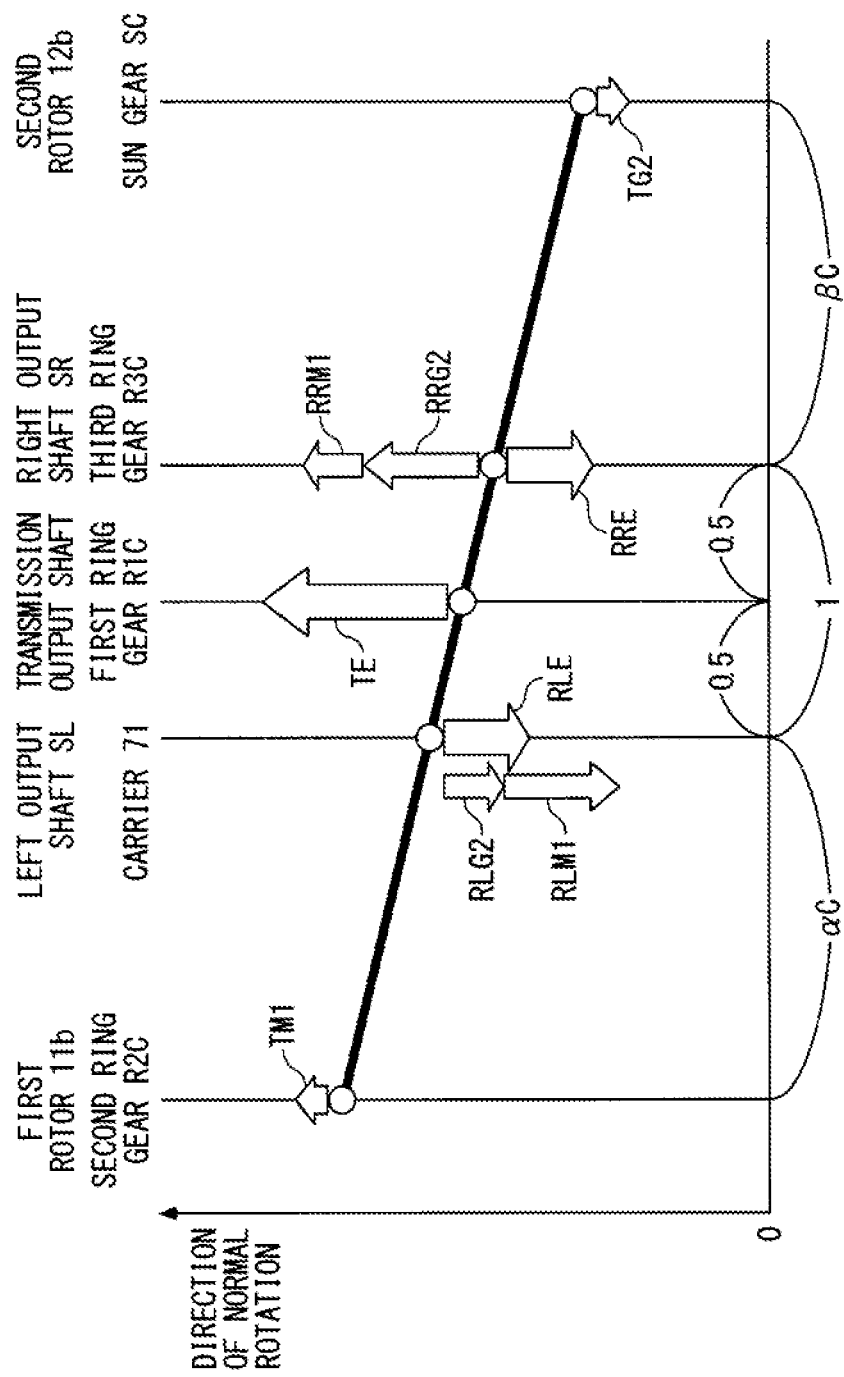
FIG. 13 A collinear chart showing a rotational speed relationship and a torque balance relationship between various types of rotary elements of the power plant shown in FIG. 12.

Next, a power plant according to a fourth embodiment of the present invention will be described with reference to FIGS. 12 and 13. Compared with the first embodiment, a distribution system DS4 of this power plant is mainly different in that it includes first and second additional pinion gears 73 and 74 in place of the above-described additional pinion gears 33. In FIGS. 12 and 13, the same component elements as those of the first embodiment are denoted by the same reference numerals. The following description is given mainly of different points of the power plant according to the fourth embodiment from the first to third embodiments.

As shown in FIG. 12, a differential gear unit GSC of the distribution system DS4 is formed by a sun gear SC, a carrier 71, triple pinion gears 72, the first and second additional pinion gears 73 and 74, and first to third ring gears R1C to R3C. The positional relationship between the differential gear unit GSC, the left and right front wheels WL and WR, and the first and second rotating electric machines 11 and 12 is the same as in the second embodiment, and the sun gear SC and the first to third ring gears R1C to R3C are arranged coaxially with the left and right output shafts SL and SR. Further, the sun gear SC, which is formed by an externally-toothed gear, is provided, in a manner associated with first pinion gears P1C, described hereinafter, radially inward of the first pinion gears P1C, and is in mesh with the first pinion gears P1C. Furthermore, the sun gear SC is coaxially connected to the second rotor 12b via a hollow cylindrical first rotating shaft 75 rotatably supported by a bearing (not shown), and is rotatable in unison with the second rotor 12b. The left output shaft SL is coaxially and relatively rotatably disposed radially inward of the first rotating shaft 75.

The carrier 71 is comprised of a first root portion 71a having an annular plate shape, a second root portion 71b having a disk shape, first support shafts 71c integrally formed with the two root portions 71a and 71b, second support shafts 71d integrally formed with the first root portion 71a, and third support shafts 71e integrally formed with the second root portion 71b, and is rotatably supported by a bearing (not shown). The sun gear SC and the first rotating shaft 75 are relatively rotatably disposed radially inward of the carrier 71. Although the numbers of the first to third support shafts 71c to 71e, the number of the triple pinion gears 72, the numbers of the first and second additional pinion gears 73 and 74 are three (only two of each are shown), respectively, it is to be understood that this is not limitative.

The above-mentioned first and second root portions 71a and 71b are arranged coaxially with the left and right output shafts SL and SR, and are opposed to each other in the axial direction of the left and right output shafts SL and SR. Further, the second root portion 71b is disposed on a side closer to the right front wheel WR than the first root portion 71a, and attached to the left output shaft SL. This makes the carrier 71 rotatable in unison with the left output shaft SL. The first to third support shafts, 71c, 71d, and 71e are provided between the first and second root portions 71a and 71b, and extend in parallel with the left and right output shafts SL and SR. Further, the first support shafts 71c are each located at a radially inner end of the first root portion 71a, and also at a radially central portion of the second root portion 71b. The second support shafts 71d are each located at the radially outer end of the first root portion 71a, and extend toward the second root portion 71b. The third support shafts 71e are each located at a radially outer end of the second root portion 71b, and extend toward the first root portion 71a. Further, the three first support shafts 71c are located at equally-spaced intervals in a circumferential direction of the first and second root portions 71a and 71b. The same applies to the three second and three third support shafts 71d and 71e.

Similar to the first embodiment, each of the above-mentioned triple pinion gears 72 is comprised of the first pinion gear P1C, a second pinion gear P2C, and a third pinion gear P3C which are externally-toothed gears integrally formed with each other, and is rotatably supported on an associated one of the first support shafts 71c via a bearing (not shown). The positional relationship between the first to third pinion gears P1C to P3C is the same as that between the first to third pinion gears P1 to P3 of the first embodiment.

The first to third ring gears R1C to R3C are formed by the same internally-toothed gears as those forming the first to third ring gears R1 to R3 of the first embodiment, and are provided, in a manner associated with the first to third pinion gears P1C to P3C, radially outward of the first to third pinion gears P1C to P3C, respectively. Further, a gear GC, which is an externally-toothed gear, is formed on an outer periphery of the first ring gear R1C. The gear GC is in mesh with the gear 4a of the transmission output shaft. Each first additional pinion gear 73, which is formed by an externally-toothed gear, is rotatably supported on an associated one of the second support shafts 71*d* via a bearing (not shown), and is in mesh with both an associated one of the first pinion gears P1C and the first ring gear R1C. The second ring gear R2C is in mesh with the second pinion gears P2C, and is coaxially connected to the first rotor 11*b* via a hollow cylindrical second rotating shaft 76 rotatably supported by a bearing (not shown), a flange, and a hollow cylindrical third rotating shaft 77. The second ring gear R2C is rotatable in unison with the first rotor 11*b*. A fourth rotating shaft 78, described hereinafter, is relatively rotatably disposed radially inward of the second rotating shaft 76, and the right output shaft SR is relatively rotatably disposed radially inward of the third rotating shaft 77.

The third ring gear R3C is coaxially connected to the right output shaft SR via the cylindrical fourth rotating shaft 78, which is hollow and is rotatably supported by a bearing (not shown), and a flange, and is rotatable in unison with the right output shaft SR. Each second additional pinion gear 74, which is formed by an externally-toothed gear, is rotatably supported on an associated one of the third support shafts 71*e* via a bearing (not shown), and is in mesh with both an associated one of the third pinion gears P3C and the third ring gear R3C. Further, numbers ZP1C to ZP3C of gear teeth of the first to third pinion gears P1C to P3C, and numbers ZR1C to ZR3C of gear teeth of the first to third ring gears R1C to R3C are set such that the following equations (13) and (14) hold therebetween.

$$ZR1C/ZP1C > ZR3C/ZP3C > ZR2C/ZP2C \tag{13}$$

$$2 \times ZP1C/ZR1C = ZP3C/ZR3C \tag{14}$$

In the power plant constructed as above, since the differential gear unit GSC is constructed as described above, the sun gear SC, the third ring gear R3C, the first ring gear R1C, the carrier 71, and the second ring gear R2C can transmit motive power therebetween, and the rotational speeds thereof are in a collinear relationship. Further, when the sun gear SC is rotated in a state in which the carrier 71 is fixed, the first and third ring gears R1C and R3C rotate in the same direction as the direction of rotation of the sun gear SC, and the second ring gear R2C rotates in a direction opposite to the direction of the rotation of the sun gear SC. In this case, from the relationship between the numbers of gear teeth of the gears, the relationship of "the rotational speed of the sun gear SC>the rotational speed of the third ring gear R3C>the rotational speed of the first ring gear R1C" holds between the rotational speed of the sun gear SC, and the rotational speeds of the first and third ring gears R1C and R3C. From the above, in a collinear chart indicating the relationship between the rotational speeds, the sun gear SC, the third ring gear R3C, the first ring gear R1C, the carrier 71, and the second ring gear R2C are depicted in this order.

Further, since the sun gear SC and the second rotor 12*b* are connected to each other via the first rotating shaft 75, the rotational speed of the sun gear SC and that of the second rotor 12*b* are equal to each other. Furthermore, since the third ring gear R3C is connected to the right output shaft SR via the fourth rotating shaft 78 and the flange, the rotational speed of the third ring gear R3C and that of the right output shaft SR are equal to each other. Further, since the first ring gear R1C is connected to the transmission output shaft of the transmission 4 via the gear GC and the gear 4*a*, the rotational speed of the first ring gear R1C and that of the transmission output shaft are equal to each other provided that a change in speed by the gear GC and the gear 4*a* is ignored. Furthermore, the carrier 71 is directly connected to the left output shaft SL, and hence the rotational seed of the carrier 71 and that of the left output shaft SL are equal to each other. Further, the second ring gear R2C is connected to the first rotor 11*b* via the second rotating shaft 76, the flange, and the third rotating shaft 77, and hence the rotational speed of the second ring gear R2C and the rotational speed of the first rotor 11*b* are equal to each other.

From the above, a rotational speed relationship between various types of rotary elements of the power plant is expressed e.g. in a collinear chart shown in FIG. 13. As is apparent from FIG. 13, the left and right output shafts SL and SR can be differentially rotated with each other.

Further, in FIG. 13, $\alpha C$ and $\beta C$ represent a first lever ratio and a second lever ratio (torque ratio, speed ratio) respectively, and are expressed by the following equations (15) and (16):

$$\alpha C = ZR3C \times ZP2C/(ZR2C \times ZP3C) \tag{15}$$

$$\beta C = ZR3C \times ZP1C/(ZSC \times ZP3C) - 1 \tag{16}$$

wherein ESC represents the number of gear teeth of the sun gear SC.

The numbers ZR2C and ZR3C of gear teeth of the second and third ring gears R2C and R3C, the numbers ZP1C to ZP3C of gear teeth of the first to third pinion gears P1C to P3C, and the number ZSC of the gear teeth of the sun gear SC are set such that the first and second lever ratios $\alpha C$ and $\beta C$ become equal to each other and take relatively large values not only on condition that the above-mentioned equations (13) and (14) hold, but also on condition that one of the first and second rotors 11*b* and 12*b* does not perform reverse rotation within a range in which the left and right front wheels WL and WR can be differentially rotated with each other.

Further, as is apparent from a comparison between FIG. 13 and FIGS. 4 to 7, the distribution system DS4 performs operation in the same manner as the distribution system DS1 according to the first embodiment. Detailed description thereof is omitted.

Further, the correspondence between various elements of the fourth embodiment and the various elements of the present invention is as follows: The second ring gear R2C of the fourth embodiment corresponds to the second gear and the first outer rotary element of the present invention, the sun gear SC of the fourth embodiment corresponds to the fourth gear and the second outer rotary element of the present invention, and the first and second additional pinion gears 73 and 74 of the fourth embodiment correspond to the additional pinion gear of the present invention. Further, the carrier 71 of the fourth embodiment corresponds to the first quasi-outer rotary element of the present invention, the third ring gear R3C of the fourth embodiment corresponds to the third gear and the second quasi-outer rotary element of the present invention, and the first ring gear R1C of the fourth embodiment corresponds to the first gear and the central rotary element of the present invention. The other corresponding relations are the same as in the first embodiment.

As described above, according to the fourth embodiment, the differential gear unit GSC is formed by the carrier 71, the triple pinion gear 72 comprised of the first to third pinion gears P1C to P3C integrally formed with each other, the sun gear SC, the first to third ring gears R1C to R3C, and the first and second additional pinion gears 73 and 74 (FIG. 12). Further, the second ring gear R2C, the carrier 71, the first ring gear R1C, the third ring gear R3C, and the sun gear SC form the five rotary elements, and the five rotary elements are in a collinear relationship in which they are aligned in a single straight line in the collinear chart in the mentioned order (FIG. 13). Thus, a differential gear unit equivalent to the differential gear unit of the power plant disclosed in PTL 2 can be formed by the carrier 71, the triple pinion gear 72, the sun gear SC, the first to third ring gears R1C to R3C, and the first and second additional pinion gears 73 and 74, whereby similar to the third embodiment, the power plant can be formed by the eight, component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the second ring gear R2C and the sun gear SC, which are positioned on opposite outer sides of the collinear chart, respectively, are mechanically connected to the first and second rotating electric machines 11 and 12 (the first and second rotors 11b and 12b), respectively, and the carrier 71 and the third ring gear R3C, which are positioned adjacent to the second ring gear R2C and the sun gear SC, respectively, are mechanically connected to the left and right output shafts SL and SR, respectively. As a consequence, similar to the first to third embodiments, it is possible to transmit rotational energy output from the first and second rotating electric machines 11 and 12 to the left and right output shafts SL and SR via the differential gear unit GSC, and properly drive the two SL and SR, and by controlling input and output of rotational energy to and from the first and second rotating electric machines 11 and 12, it is possible to properly control rotational energy (torque) distributed to the left and right output shafts SL and SR.

Further, out of the five rotary elements, the first ring gear R1C located at a central portion of the collinear chart is mechanically connected to the engine 3, and hence similar to the first to third embodiments, it is possible to reduce torque demanded of the first and second rotating electric machines 11 and 12, whereby it is possible to downsize the two 11 and 12. Further, not the sun gear SC but the carrier 71 and the third ring gear R3C are mechanically connected to the left and right output shafts SL and SR, respectively. Therefore, similar to the first to third embodiments, it is possible to set the tooth width of the third ring gear R3C to a relatively small value, whereby it is possible to further downsize the power plant. For the same reason, it is possible to downsize the bearings supporting the second additional pinion gears 74, which also makes it possible to attain further downsizing of the power plant.

Note that although in the fourth embodiment, the second ring gear R2C and the sun gear SC are connected to the first and second rotors 11b and 12b, respectively, and the carrier 71 ad the third ring gear R3C are connected to the left and right output shafts SL and SR, respectively, inversely, the sun gear and the second ring gear may be connected to the first and second rotors, respectively, and the third ring gear and the carrier may be connected to the left and right output shafts, respectively. Further, although in the fourth embodiment, the sun gear SC is brought into mesh with the first pinion gear P1C, the sun gear SC may brought into mesh with the second or third pinion gear. Further, although in the fourth embodiment, the first additional pinion gear 73 is brought into mesh with both the first pinion gears P1C and the first ring gear R1C, and the second additional pinion gear 74 is brought into mesh with both the third pinion gear P3C and the third ring gear R3C, one of the first and second additional pinion gears may be brought into mesh with both the second pinion gear and the second ring gear. In this case, when the first additional pinion gear is brought into mesh with both the second pinion gear and the second ring gear, the first ring gear is brought into mesh with the first pinion gear. Further, when the second additional pinion gear is brought into mesh with both the second pinion gear and the second ring gear, the third ring gear is brought into mesh with the third pinion gear.

Further, in any of the above-described variations, out of the five rotary elements of the sun gear, the first to third ring gears, and the carrier, the first and second outer rotary elements, which are positioned on opposite outer sides of the collinear chart indicating the relationship between the rotational speeds, respectively, are connected to the first and second rotors, respectively, and the first and second quasi-outer rotary elements that are positioned adjacent to the first and second outer rotary elements, respectively, are connected to the left and right output shafts, respectively. Furthermore, out of the five rotary elements, the central rotary element located at the central portion of the collinear chart is connected to the engine. Further, in the above-described variations, to cause the relationship of connections between the first and second rotors, and so forth to hold, it is sometimes required to set the relationship between the numbers of gear teeth of the gears to a relationship different from the relationship expressed by the above-mentioned equations (13) and (14).

Figure 14:
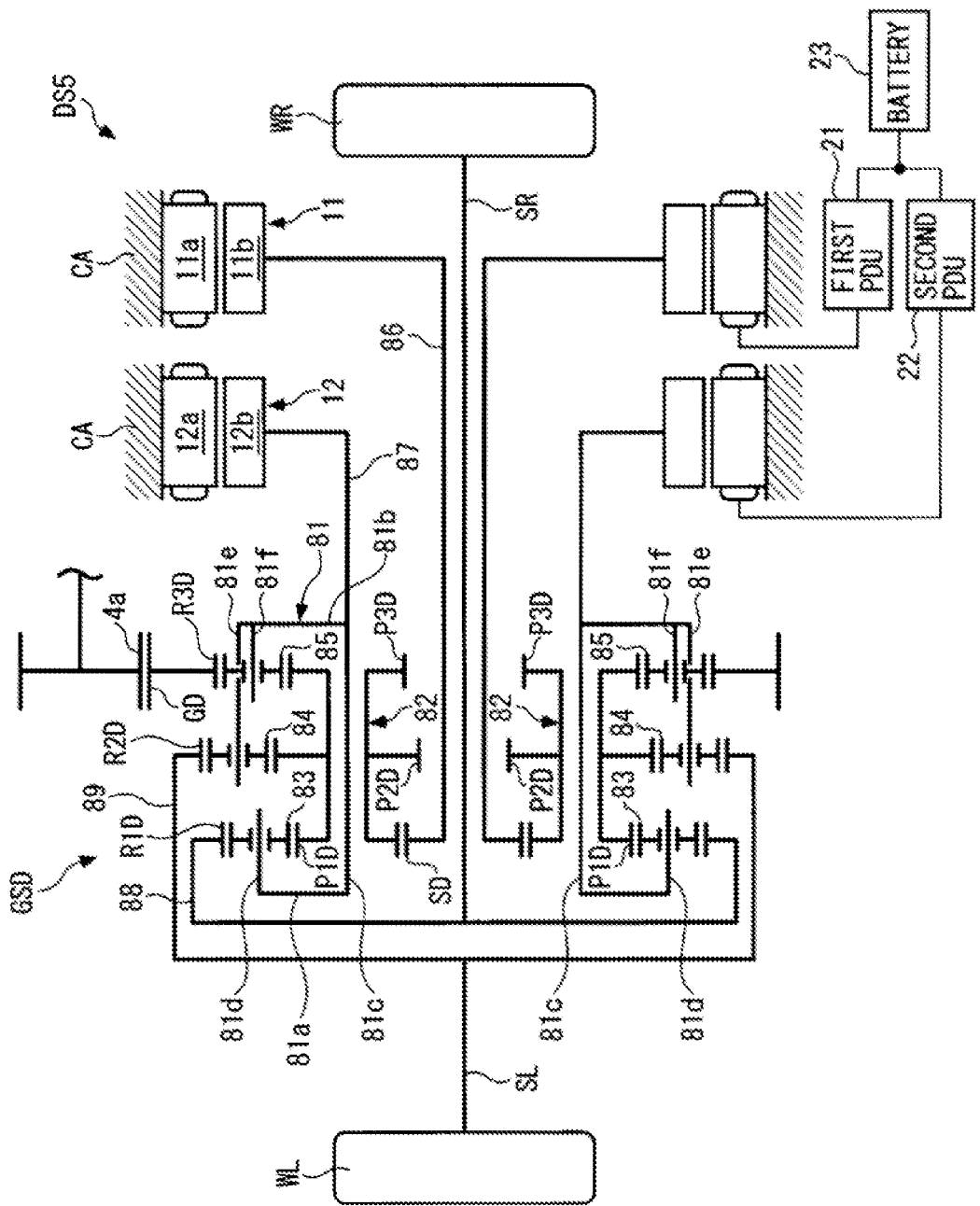
FIG. 14 A skeleton diagram of a power plant etc. according to a fifth embodiment of the present invention.
Figure 15:
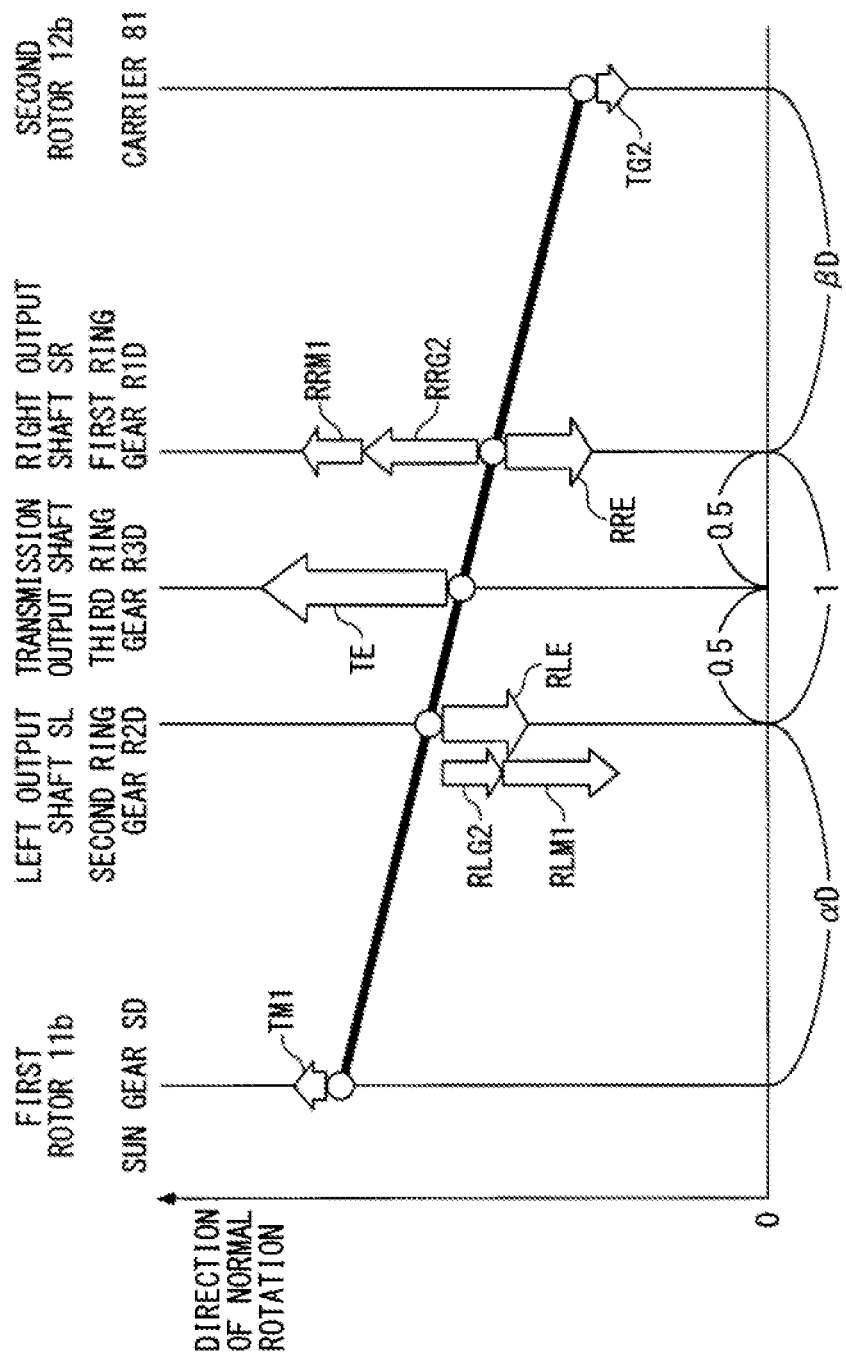
FIG. 15 A collinear chart showing a rotational speed relationship and a torque balance relationship between various types of rotary elements of the power plant shown in FIG. 14.

Next, a power plant according to a fifth embodiment of the present invention will be described with reference to FIGS. 14 and 15. Compared with the fourth embodiment, a distribution system DS5 of this power plant is mainly different in that it further includes third additional pinion gears 85. In FIGS. 14 and 15, the same component elements as those of the first embodiment are denoted by the same reference numerals. The following description is given mainly of different points of the power plant according to the fifth embodiment from the first to third embodiments.

As shown in FIG. 14, a differential gear unit GSD of the distribution system DS5 is formed by a sun gear SD, a carrier 81, triple pinion gears 82, first to third additional pinion gears 83 to 85, and first to third ring gears R1D to R3D. The positional relationship between the differential gear unit GSD, the left and right front wheels WL and WR, and the first and second rotating electric machines 11 and 12 is the same as in the first embodiment, and the sun gear SD and the first to third ring gears R1D to R3D are arranged coaxially with the left and right output shafts SL and SR. Further, the sun gear SD, which is formed by an externally-toothed gear, is provided, in a manner associated with first pinion gears described hereinafter, radially inward of the first pinion gears P1D, and is in mesh with the first pinion gears P1D. Furthermore, the sun gear SD is coaxially connected to the first rotor 11b via a hollow cylindrical first rotating shaft 86 rotatably supported by a bearing (not shown), and is rotatable in unison with the first rotor 11b. The right output shaft SR is coaxially and relatively rotatably disposed radially inward of the first rotating shaft 86.

The above-mentioned carrier 81 is comprised of first and second root portions 81a and 81b each having an annular plate shape, first support shafts 81c integrally formed with the two root portions 81a and 81b, second support shafts 81d integrally formed with the first root portion 81a and third support shafts 81e and fourth support shafts 81f integrally formed with the second root portion 81b, and is rotatably supported by a bearing (not shown). The sun gear SD and the first rotating shaft 86 are relatively rotatably disposed radially inward of the carrier 81. Although the numbers of the first to fourth support shafts 81c to 81f, the number of the triple pinion gears 82, and the numbers of the first to third additional pinion gears 83 to 85 are three (only two of each are shown), respectively, it is to be understood that this is not limitative.

The above-mentioned first and second root portions 81*a* and 81*b* are arranged coaxially with the left and right output shafts SL and SR, and are opposed to each other in the axial direction of the left and right output shafts SL and SR. Further, the second root portion 81*b* is disposed on a side closer to the right front wheel WR than the first root portion 81*a*, and is coaxially connected to the second rotor 12*b* via a hollow cylindrical second rotating shaft 87 rotatably supported by a bearing (not shown). This makes the carrier 81 rotatable in unison with the second rotor 12*b*. The first rotating shaft 86 is coaxially and relatively rotatably disposed radially inward of the second rotating shaft 87. The first to fourth support shafts 81*c* to 81*f* are provided between the first and second root portions 81*a* and 81*b*, and extend in parallel with the left and right output shafts SL and SR.

The first support shafts 81*c* are each located at radially inner ends of the first and second root portions 81*a* and 81*b*. The second support shafts 81*d* are each located at a radially outer end of the first root portion 81*a*, and extend toward the second root portion 81*b*. Further, the third support shafts 81*e* are each located at a radially outer end of the second root portion 81*b*, and the fourth support shafts 81*f* are each located at a portion of the second root portion 81*b*, radially inward of a portion of the second root portion 81*b* to which an associated one of the third support shafts 81*e* is connected. Both the support shafts 81*e* and 81*f* extend toward the first root portion 81*a*. Further, the three first support shafts 81*c* are located at equally-spaced intervals in a circumferential direction of the first and second root portions 81*a* and 81*b*. The same applies to each three of the second to fourth support shafts 81*d* to 81*f*. Further, the third and fourth support shafts 81*e* and 81*f* are located at positions different from each other in the circumferential direction of the second root portion 81*b*.

Similar to the first embodiment, each of the above-mentioned triple pinion gears 82 is comprised of the first pinion gear P1D, a second pinion gear P2D, and a third pinion gear P3D, which are externally-toothed gears integrally formed with each other, and is rotatably supported on an associated one of the first support shafts 81*c* via a bearing (not shown). The positional relationship between the first to third pinion gears P1D to P3D is the same as that between the first to third pinion gears P1 to P3 of the first embodiment.

The first to third ring gears R1D to R3D are formed by the same internally-toothed gears as those forming the first to third ring gears R1 to R3 of the first embodiment, and are provided, in a manner associated with the first to third pinion gears P1D to P3D, radially outward of the first to third pinion gears P1D to P3D, respectively. Further, the first ring gear R1D is coaxially connected to the right output shaft SR via a hollow cylindrical third rotating shaft 88 rotatably supported by a bearing (not shown) and a flange, and is rotatable in unison with the right output shaft SR. The first to third additional pinion gears 83 to 85 are formed by externally-toothed gears. Further, each first additional pinion gear 83 is rotatably supported on an associated one of the second support shafts 81*d* via a bearing (not shown), and is in mesh with both an associated one of the first pinion gears P1D and the first ring gear R1D.

The second ring gear R2D is coaxially connected to the left output shaft SL via a hollow cylindrical fourth rotating shaft 89 rotatably supported via a bearing (not shown) and a flange, and is rotatable in unison with the left output shaft SL. The above-mentioned third rotating shaft 88 is relatively rotatably disposed radially inward of the fourth rotating shaft 89. Each second additional pinion gear 84 is rotatably supported on an associated one of the third support shafts 81*e* via a bearing (not shown), and is in mesh with both an associated one of the second pinion gears P2D and the second ring gear R2D. A gear GD, which is an externally-toothed gear, is formed on an outer periphery of the third ring gear R3D. The gear GD is in mesh with the gear 4*a* of the transmission output shaft. Each third additional pinion gear 85 is rotatably supported on an associated one of the fourth support shafts 81*f* via a bearing (not shown), and is in mesh with both an associated one of the third pinion gears P3D and the third ring gear R3D.

Further, numbers ZP1D to ZP3D of gear teeth of the first to third pinion gears P1D to P3D, and numbers ZR1D to ZR3D of gear teeth of the first to third ring gears R1D to R3D are set such that the following equations (17) and (18) hold therebetween, similar to the first embodiment.

$$ZR1D/ZP1D > ZR3D/ZP3D > ZR2D/ZP2D \tag{17}$$

$$ZP3D/ZR3D = (ZP1D/ZR1D + ZP2D/ZR2D)/2 \tag{18}$$

In the power plant constructed as above, since the differential gear unit GSD is constructed as described above, the sun gear SD, the second ring gear R2D, the third ring gear R3D, the first ring gear R1D, and the carrier 81 can transmit motive power therebetween, and the rotational speeds thereof are a collinear relationship. Further, when the sun gear SD is rotated in a state in which the carrier 81 is fixed, the first to third ring gears R1D to R3D rotate in the same direction as the direction of rotation of the sun gear SD. In this case, from the relationship between the numbers of gear teeth of the gears, the relationship of "the rotational speed of the sun gear SD>the rotational speed of the second ring gear R2D>the rotational speed of the third ring gear R3D>the rotational speed of the first ring gear R1D" holds between the rotational speed of the sun gear SD, and the rotational speeds of the first to third ring gears R1D to R3D. From the above, in a collinear chart indicating the relationship between the rotational speeds, the sun gear SD, the second ring gear R2D, the third ring gear R3D, the first ring gear R1D, and the carrier 81 are depicted in this order.

Further, since the sun gear SD and the first rotor 11*b* are connected to each other via the first rotating shaft 86, the rotational speed of the sun gear SD and that of the first rotor 11*b* are equal to each other. Furthermore, since the second ring gear R2D is connected to the left output shaft SL via the fourth rotating shaft 89 and the flange, the rotational speed of the second ring gear R2D and that of the left output shaft SL are equal to each other. Further, since the third ring gear R3D is connected to the transmission output shaft of the transmission 4 via the gear GD and the gear 4*a*, the rotational speed of the third ring gear R3D and that of the transmission output shaft are equal to each other provided that a change in speed by the gear GD and the gear 4*a* is ignored. Furthermore, the first ring gear R1D is connected to the right output shaft SR via the third rotating shaft 88 and the flange, and hence the rotational speed of the first ring gear R1D and the rotational speed of the right output shaft SR are equal to each other. Further, the carrier 81 is connected to the second rotor 12*b* via the second rotating shaft 87, and hence the rotational speed of the carrier 81 and that of the second rotor 12*b* are equal to each other.

From the above, a rotational speed relationship between various types of rotary elements of the power plant is expressed e.g. in a collinear chart shown in FIG. 15. As is apparent from FIG. 15, the left and right output shafts SL and SR can be differentially rotated with each other. Further, in FIGS. 15, αD and βD represent a first lever ratio and a second lever ratio (torque ratio, speed ratio) respectively, and are expressed by the following equations (19) and (20):

$$\alpha D = ZR1D \ (ZR2D \times ZP1D - ZSD \times ZP2D)/ZSD \ (ZR1D \times ZP2D - ZR2D \times ZP1D) \quad (19)$$

$$\beta D = ZR2D \times ZP1D \ /(ZR1D \times ZP2D - ZR2D \times ZP1D) \quad (20)$$

wherein ZSD represents the number of gear teeth of the sun gear SD.

The numbers ZR1D and ZR2D of gear teeth of the first and second ring gears R1D and R2D, the numbers ZP1D and ZP2D of gear teeth of the first and second pinion gears P1D and P2D, and the number ZSD of the gear teeth of the sun gear SD are set such that the first and second lever ratios αD and βD become equal to each other and take relatively large values not only on condition that the above-mentioned equations (17) and (18) hold, but also on condition that one of the first and second rotors 11b and 12b does not perform reverse rotation within a range in which the left and right front wheels WL and WP can be differentially rotated with each other.

Further, as is apparent from a comparison between FIG. 15 and FIGS. 4 to 7, the distribution system DS5 performs operation in the same manner as the distribution system DS1 according to the first embodiment. Detailed description thereof is omitted.

Further, the correspondence between various elements of the fifth embodiment and the various elements of the present invention is as follows: The sun gear SD of the fifth embodiment corresponds to the fourth gear and the first outer rotary element of the present invention, the carrier 81 of the fifth embodiment corresponds to the second outer rotary element of the present invention, and the first to third additional pinion gears 83 to 85 of the fifth embodiment correspond to the additional pinion gear of the present invention. Further, the second ring gear R1D of the fifth embodiment corresponds to the second gear and the first quasi-outer rotary element of the present invention, the first ring gear R1D of the fifth embodiment corresponds to the first gear and the second quasi-outer rotary element of the present invention, and the third ring gear R3D of the fifth embodiment corresponds to the third gear and the central rotary element of the present invention. The other corresponding relations are the same as in the first embodiment.

As described above, according to the fifth embodiment, the differential gear unit GSD is formed by the carrier 81, the triple pinion gear 82 comprised of the first to third pinion gears P1D to P3D integrally formed with each other, the sun gear SD, the first to third ring gears R1D to R3D, and the first to third additional pinion gears 83 to 85 (FIG. 14). Further, the sun gear SD, the second ring gear R2D, the third ring gear R3D, the first ring gear R1D, and the carrier 81 form the five rotary elements, and the five rotary elements are in a collinear relationship in which they are aligned in a single straight line in the collinear chart in the mentioned order (FIG. 15). Thus, a differential gear unit equivalent to the differential gear unit of the power plant disclosed in PTL 2 can be formed by the carrier 81, the triple pinion gear 82, the sun gear SD, the first to third ring gears R1D to R3D, and the first to third additional pinion gears 83 to 85, whereby the power plant can be formed by the nine component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the sun gear SD and the carrier 81, which are positioned on opposite outer sides of the collinear chart, respectively, are mechanically connected to the first and second rotating electric machines 11 and 12 (the first and second rotors 11b and 12b), respectively, and the second and first ring gears R2D and R1D that are positioned adjacent to the sun gear SD and the carrier 81, respectively, are mechanically connected to the left and right output shafts SL and SR, respectively. With this, similar to the first to fourth embodiments, it is possible to transmit rotational energy output from the first and second rotating electric machines 11 and 12 to the left and right output shafts SL and SR via the differential gear unit GSD, and properly drive the two SL and SR, and by controlling input and output of rotational energy to and from the first and second rotating electric machines 11 and 12, it is possible to properly control rotational energy (torque) distributed to the left and right output shafts SL and SR.

Further, out of the five rotary elements, the third ring gear R3D located at a central portion of the collinear chart is mechanically connected to the engine 3, and hence similar to the first to fourth embodiments, it is possible to reduce torque demanded of the first and second rotating electric machines 11 and 12, whereby it is possible to downsize the two 11 and 12. Further, not the sun gear SD but the second and first ring gears R2D and R1D are mechanically connected to the left and right output shafts SL and SR, respectively. Therefore, similar to the first to fourth embodiments, it is possible to set the tooth widths of the first and second ring gears R1D and R2D to relatively small values, whereby it is possible further downsize the power plant. For the same reason, it is possible to downsize the bearings supporting the first and second additional pinion gears 83 and 84, which also makes it possible to attain further downsizing of the power plant.

Note that although in the fifth embodiment, the sun gear SD and the carrier 81 are connect to the first and second rotors 11b and 12b, respectively and the second and first ring gears R2D and R1D are connected to the left and right output shafts SL and SR, respectively, inversely, the carrier and the sun gear may be connected to the first and second rotors, respectively, and the first and second ring gears may be connected to the left and right output shafts, respectively. Further, although in the fifth embodiment, the sun gear SD is brought into mesh with the first pinion gear P1D, the sun gear SD may be brought into mesh with the second or third pinion gear. In this case as well, the order of appearance of the sun gear, the second ring gear, the third ring gear, the first ring gear, and the carrier in a collinear chart indicating the relationship between the rotational speeds is the same as the order of appearance thereof shown in FIG. 15, and the relationship of connections between the first rotor, the left output shaft, the transmission output shaft, the right output shaft, and the second rotor is also the same as the relationship of connections therebetween shown in FIG. 15.

Figure 16:
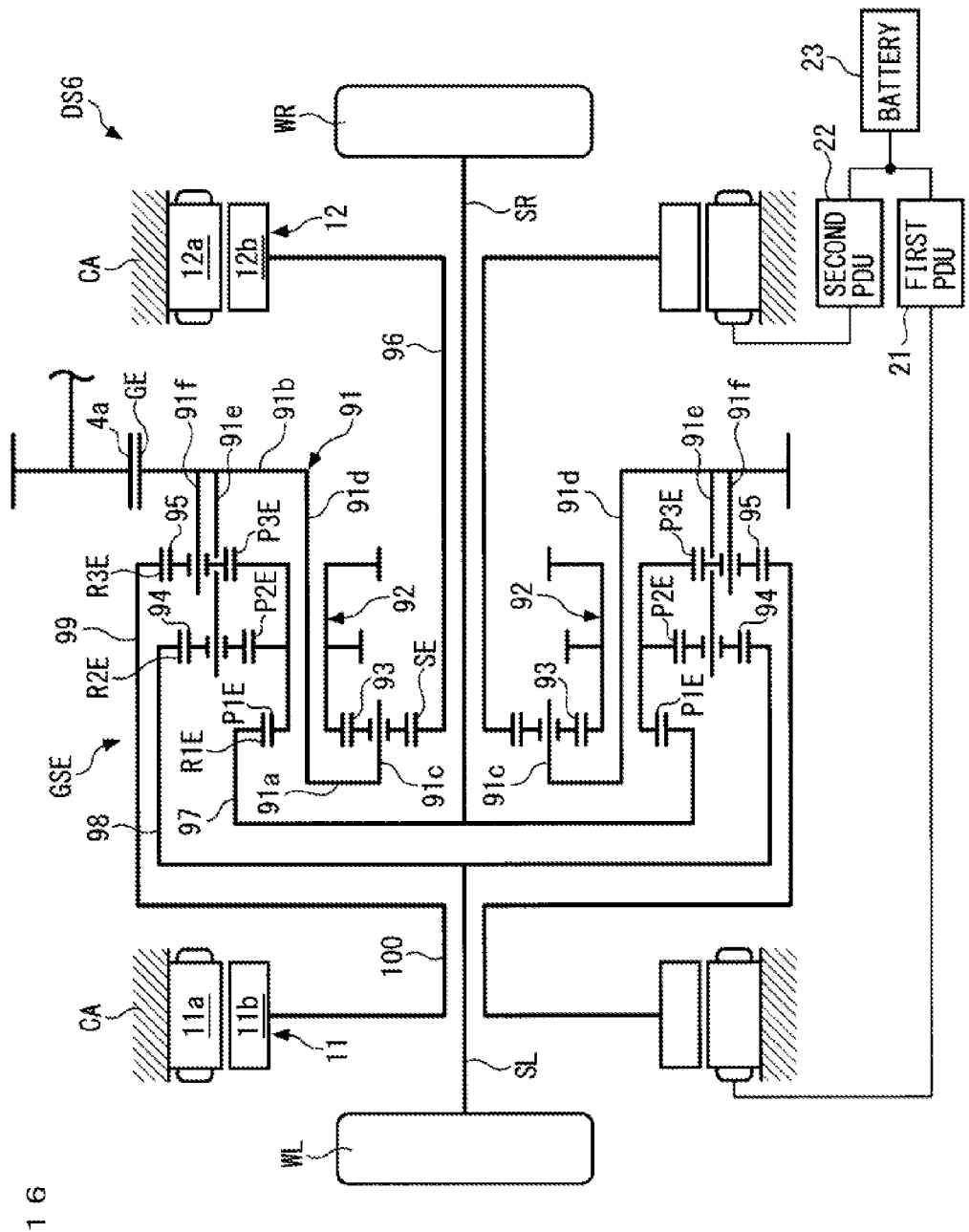
FIG. 16 A skeleton diagram of a power plant etc. according to a sixth embodiment of the present invention.
Figure 17:
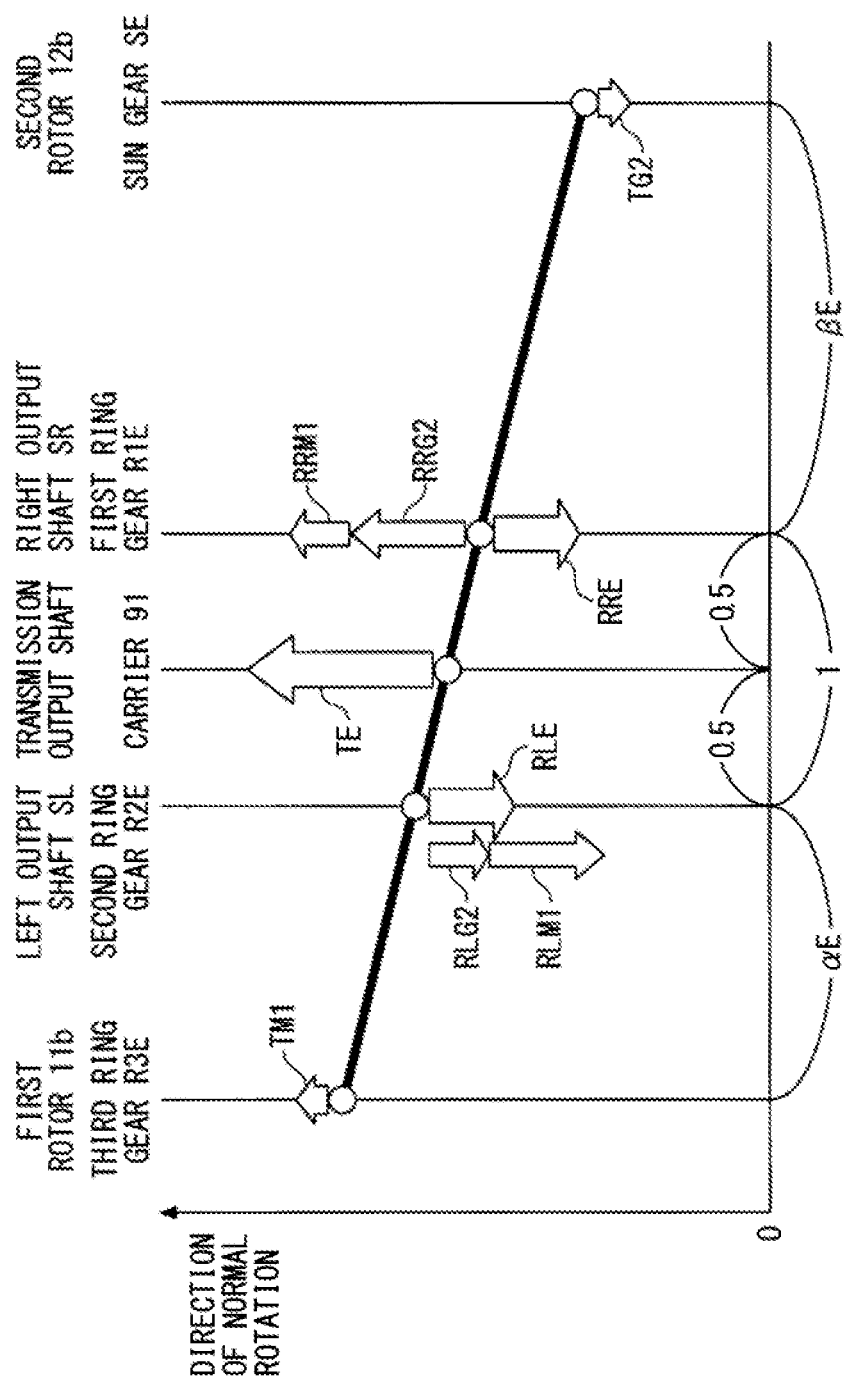
FIG. 17 A collinear chart showing a rotational speed relationship and a torque balance relationship between various types of rotary elements of the power plant shown in FIG. 16.

Next, a power plant according to a sixth embodiment of the present invention will be described with reference to FIGS. 15 and 17. Compared with the fifth embodiment, a distribution system DS6 of this power plant is mainly different in that first additional pinion gears are not in mesh with both first pinion gears and a first ring gear R1E but in mesh with both a sun gear SE and the first pinion pears P1E. In FIGS. 16 and 17, the same component elements as those of the first embodiment are denoted by the same reference numerals. The following description is given mainly of different points of the power plant according to the sixth embodiment from the first to fifth embodiments.

As shown in FIG. 16, a differential gear unit GSE of the distribution system DS6 is formed by the sun gear SE, a carrier 91, triple pinion gears 92, first to third additional pinion gears 93 to 95, and first to third ring gears R1E to R3E. The first rotating electric machine 11 is disposed between the differential gear unit GSE and the left front wheel WL, and the second rotating electric machine 12 is disposed between the differential gear unit GSE and the right front wheel WR. The sun gear SE and the first to third ring gears R1E to R3E are arranged coaxially with the left and right output shafts SL and SR. Further, the sun gear SE is formed by an externally-toothed gear, and is provided, in a manner associated with the first pinion gears P1E, described hereinafter, radially inward of the first pinion gears P1E. Furthermore, the sun gear SE is coaxially connected to the second rotor 12b via a hollow cylindrical first rotating shaft 96 rotatably supported by a bearing (not shown), and is rotatable in unison with the second rotor 12b. The right output shaft SR is coaxially and relatively rotatably disposed radially inward of the first rotating shaft 96.

The above-mentioned carrier 91 is comprised of first and second root portions 91a and 91b each having an annular plate shape, first support shafts 91c integrally formed with the first root portion 91a, second support shafts 91d integrally formed with the first and second root portions 91a and 91b, and third support shafts 91e and fourth support shafts 91f integrally formed with the second root portion 91b, and is rotatably supported by a bearing (not shown). The sun gear SE and the first rotating shalt 96 are relatively rotatably disposed radially inward of the carrier 91. Although the numbers of the first to fourth support shafts 91c to 91f, the number of the triple pinion gears 92, and the numbers of the first to third additional pinion gears 93 to 95 are three (only two of which are shown), respectively, it is to be understood that this is not limitative. Further, the first and second root portions 91a and 91b are arranged coaxially with the left and right output shafts SL and SR, and the second root portion 91b is disposed on a side closer to the right front wheel WR than the first root portion 91a. Furthermore, a gear GE, which is an externally-toothed gear, is integrally formed on a radially outer end of the second root portion 91b. The gear GE is in mesh with the gear 4a of the transmission output shaft.

Further, the first to fourth support shafts 91c to 91f extend in parallel with the left and right output shafts SL and SR. The first support shafts 91c are each located at a radially inner end of the first root portion 91a, and extend toward the second root portion 91b. The second support shafts 91d are each located at a radially outer end of the first root portion 91a and also at a radially inner end of the second root portion 91b, and extend between the first and second root portions 91a and 91b. The third support shafts 91e are each located at a radially central portion of the second root portion 91b, and the fourth support shafts 91f are each located at a portion of the second root portion 91b, radially outward of a portion of the second root portion 91b to which an associated one of the third support shafts 91e is connected. Both of the support shafts 91e and 91f extend toward the first root portion 91a. Furthermore, the three first support shafts 91c are located at equally-spaced intervals in a circumferential direction of the first and second root portions 91a and 91b. The same applies to each three of the second to fourth support shafts 91d to 91f. Further, the third and fourth support shafts 91e and 91f are located at positions different from each other in the circumferential direction of the second root portion 91b.

Similar to the first embodiment, each of the above-mentioned triple pinion gears 92 is comprised of the first pinion gear P1E a second pinion gear P2E, and a third pinion gear P3E which are externally-toothed gears integrally formed with each other, and is rotatably supported on an associated one of the second support shafts 91d via a bearing (not shown). The positional relationship between the first to third pinion gears P1E to P3E is the same as that between the first to third pinion gears P1 to P3 of the first embodiment.

The first to third ring gears R1E to R3E are formed by the same internally-toothed gears as those forming the first to third ring gears R1 to R3 of the first embodiment, and are provided, in a manner associated with the first to third pinion gears P1E to P3E, radially outward of the first to third pinion gears P1E to P3E, respectively. Further, the first ring gear R1E, which is in mesh with the first pinion gear P1E, is coaxially connected to the right output shaft SR via a hollow cylindrical second rotating shaft 97 rotatably supported by a bearing (not shown) and a flange, and is rotatable in unison with the right output shaft SR. The first to third additional pinion gears 93 to 95 are formed by externally-toothed gears. Further, each first additional pinion gear 93 is rotatably supported on an associated one of the first support shafts 91c by a bearing (not shown), and is in mesh with both the sun gear SE and an associated one of the first pinion gears P1E.

The second ring gear R2E is coaxially connected to the left output shaft SL via a hollow cylindrical third rotating shaft 98 rotatably supported by a bearing (not shown) and a flange, and is rotatable in unison with the left output shaft SL. The above-mentioned second rotating shaft 97 is relatively rotatably disposed radially inward of the third rotating shaft 98. Each second additional pinion gear 94 is rotatably supported on an associated one of the third support shafts 91e via a bearing (not shown), and is in mesh with both an associated one of the second pinion gears P2E and the second ring gear R2E. The third ring gear R3E is coaxially connected to the first rotor 11b via a hollow cylindrical fourth rotating shaft 99 rotatably Supported by a bearing (not shown), a flange, and a hollow cylindrical fifth rotating shaft 100, and is rotatable in unison with the first rotor 11b. The above-mentioned third rotating shaft 98 is relatively rotatably disposed radially inward of the fourth rotating shaft 99, and the left output shaft SL is relatively rotatably disposed radially inward of the fifth rotating shaft 100.

Each third additional pinion gear 95 is rotatably supported on an associated one of the fourth support shafts 91f via a bearing (not shown), and is in mesh with both an associated one of the third pinion gears P3E and the third ring gear R3E. Further, numbers ZP1E to ZP3E of gear teeth of the first to third pinion gears P1E to P3E, and numbers ZR1E to ZR3E of gear teeth of the first to third ring gears R1E to R3E are set such that the following equations (21) and (22) hold therebetween, similar to the first embodiment.

$$ZR2E/ZP2E > ZR3E/ZP3E \quad (21)$$

$$ZP1E/ZR1E = ZP2E/ZR2E \quad (22)$$

In the power plant constructed as above, since the differential gear unit GSE is constructed as described above, the sun gear SE, the first ring gear R1E the carrier 91, the second ring gear R2E, and the third ring gear R3E can transmit motive power therebetween, and the rotational speeds thereof are in a collinear relationship. Further, when the sun gear SE is rotated in a state in which the carrier 91 is fixed, the first ring gear R1E rotates in the same direction as the direction of rotation of the sun gear SE, and the second and third ring gears R2E and R3E rotate in a direction opposite to the direction of the rotation of the sun gear SE. In this case, from the relationship between the numbers of gear teeth of the gears, the rotational speed of the sun gear SE becomes higher than the rotational speed of the first ring gear R1E, and the rotational speed of the second ring gear R2E becomes higher than the rotational speed of the third ring gear R3E. From the above, in a collinear chart indicating the relationship between the rotational speeds, the sun gear SE, the first ring gear R1E, the carrier 91, the second ring gear R2E, and the third ring gear R3E are depicted in this order.

Further, since the sun gear SE and the second rotor 12b are connected to each other via the first rotating shaft 96, the rotational speed of the sun gear SE and that of the second rotor 12b are equal to each other. Further, since the first ring gear R1E is connected to the right output shaft SR via the second rotating shaft 97 and the flange, the rotational speed of the first ring gear R1E and that of the right output shaft SR are equal to each other. Further, since the carrier 91 is connected to the transmission output shaft of the transmission 4 via the gear GE and the gear 4a, the rotational speed of the carrier 91 and that of the transmission output shaft are equal to each other provided that a change in speed by the gear GE and the gear 4a is ignored. Furthermore, the second ring gear R2E is connected to the left output shaft SL via the third rotating shaft 98 and the flange, and hence the rotational speed of the second ring gear R2E and that of the left output shaft SL are equal to each other. Further, the third ring gear R3E is connected to the first rotor 11b via the fourth rotating shaft 99 the flange, and the fifth rotating shaft 100 and hence the rotational speed of the third ring gear R3E and the rotational speed of the first rotor 11b are equal to each other.

From the above, a rotational speed relationship between various types of rotary elements of the power plant is expressed e.g. in a collinear chart shown in FIG. 17. As is apparent from FIG. 17, the left and right output shafts SL and SR can be differentially rotated with each other. Further, in FIGS. 17, αE and βE represent a first lever ratio and a second lever ratio (torque ratio, speed ratio) respectively, and are expressed by the following equations (23) and (24):

$$\alpha E = ZR1E\ (ZR2E \times ZP3E - ZR3E \times ZP2E)/ZR3E\ (ZR1E \times ZP2E + ZR2E \times ZP1E) \quad (23)$$

$$\beta E = ZR2E \times ZP1E\ (ZR1E - ZSE)/ZSE\ (ZR1E \times ZP2E + ZR2E \times ZP1E) \quad (24)$$

wherein ZSE represents the number of gear teeth of the sun gear SE.

The numbers ZR1E to ZR3E of gear teeth of the first to third ring gears R1E to R3E, the numbers ZP1E to ZP3E of gear teeth of the first to third pinion gears P1E to P3E, and the number ZSE of the gear teeth of the sun gear SE are set such that the first and second lever ratios αE and βE take relatively large values not only on condition that the above-mentioned equations (21) and (22) hold, but also on condition that one of the first and second rotors 11b and 12b does not perform reverse rotation within a range in which the left and right front wheels WL and WR can be differentially rotated with each other.

Further, as is apparent from a comparison between FIG. 17 and FIGS. 4 to 7, the distribution system DS6 performs operation in the same manner as the distribution system DS1 according to the first embodiment. Detailed description thereof is omitted.

Further, the correspondence between various elements of the sixth embodiment and the various elements of the present invention is as follows: The third ring gear R3E of the sixth embodiment corresponds to the third gear and the first outer rotary element of the present invention, the sun gear SE of the sixth embodiment corresponds to the fourth gear and the second outer rotary element of the present invention, and the first to third additional pinion gears 93 to 95 of the sixth embodiment correspond to the additional pinion gear of the present invention. Further, the second ring gear R2E of the sixth embodiment corresponds to the second gear and the first quasi-outer rotary element of the present invention, the first ring gear R1E of the sixth embodiment corresponds to the first gear and the second quasi-outer rotary element of the present invention, and the carrier 91 of the sixth embodiment corresponds to the central rotary element of the present invention. The other corresponding relations are the same as in the first embodiment.

As described above, according to the sixth embodiment, the differential gear unit GSE is formed by the carrier 91, the triple pinion gear 92 comprised of the first to third pinion gears P1E to P3E integrally formed with each other, the sun gear SE, the first to third ring gears R1E to R3E, and the first to third additional pinion gears 93 to 95 (FIG. 16). Further, the third ring gear R3E, the second ring gear R2E, the carrier 91, the first ring gear P1E, and the sun gear SE form the five rotary elements, and the five rotary elements are in a collinear relationship in which they are aligned in a single straight line in the collinear chart in the mentioned order (FIG. 17) As described hereinabove, a differential gear unit equivalent to the differential gear unit of the power plant disclosed in PTL 2 can be formed by the carrier 91, the triple pinion gear 92, the sun gear SE, the first to third ring gears R1E to R3E, and the first to third additional pinion gears 93 to 95, whereby the power plant can be formed by the nine component parts in total which is smaller in number than the number (sixteen) of the component parts of the power plant disclosed in PTL 2. Therefore, it is possible to reduce the number of component parts of the whole power plant, thereby making it possible to attain downsizing, weight reduction, and manufacturing cost reduction of the power plant.

Further, the third ring gear R3E and the sun gear SE, which are positioned on opposite outer sides of the collinear chart, respectively, are mechanically connected to the first and second rotating electric machines 11 and 12 (the first and second rotors 11b and 12b), respectively, and the second ring gear R2E and the first ring gear R1E that are positioned adjacent to the third ring gear R3E and the sun gear SE, respectively, are mechanically connected to the left and right output shafts SL and SR, respectively. With this, similar to the first to fifth embodiments, it is possible to transmit rotational energy output from the first and second rotating electric machines 11 and 12 to the left and right output shafts SL and SR via the differential gear unit GSE, and properly drive the two SL and SR, and by controlling input and output of rotational energy to and from the first and second rotating electric machines 11 and 12, it is possible to properly control rotational energy (torque) distributed to the left and right output shafts SL and SR.

Further, out of the five rotary elements, the carrier 91 located at a central portion of the collinear chart is mechanically connected to the engine 3, and hence similar to the first to fifth embodiments, it is possible to reduce torque demanded of the first and second rotating electric machines 11 and 12, whereby it is possible to downsize the two 11 and 12. Further, not the sun gear SE but the second and first ring gears R2E and R1E are mechanically connected to the left and right output shafts SL and SR, respectively. Therefore, similar to the first to fifth embodiments, it is possible to set the tooth widths of the first and second ring gears R1E and R2E to relatively small values, whereby it is possible to further downsize the power plant. For the same reason, it is possible to downsize the bearings supporting the second and third additional pinion gears 94 and 95, which also makes it possible to attain further downsizing of the power plant.

Note that although in the sixth embodiment, the third ring gear R3E and the sun gear SE are connected to the first and second rotors 11b and 12b, respectively, and the second and first ring gears R2E and R1E are connected to the left and right output shafts SL and SR, respectively, inversely, the sun gear and the third ring gear may be connected to the first and second rotors, respectively, and the first and second ring gears may be connected to the left and right output shafts, respectively. Further, although in the sixth embodiment, the sun gear SE is provided in a manner associated with the first pinion gears P1E, and the first additional pinion gear 93 is brought into mesh with the sun gear SE and the first pinion gears P1E, the sun gear may be provided in a manner associated with the second or third pinion gear, and the first additional pinion gear may be brought into mesh with one of the second and third pinion gears, with which the sun gear is associated, and the sun gear.

Further, although in the sixth embodiment, the second additional pinion gear 94 is brought into mesh with both the second pinion gear P2E and the second ring gear R2E, and the third additional pinion gear 95 is brought into mesh with both the third pinion gear P3E and the third ring gear R3E, one of the second and third additional pinion gears may be brought into mesh with both the first pinion gear and the first ring gear. In this case, when the second additional pinion gear is brought into mesh with both the first pinion gear and the first ring gear, the second ring gear is brought into mesh with the second pinion gear. Further, when the third additional pinion gear is brought into mesh with both the first pinion gear and the first ring gear, the third ring gear is brought into mesh with the third pinion gear.

Further, in any of the above-described variations, out of the five rotary elements of the sun gear, the first to third ring gears, and the carrier, the first and second outer rotary elements, which are positioned on opposite outer sides of the collinear chart indicating the relationship between the rotational speeds, respectively, are connected to the first and second rotors, respectively, and the first and second quasi-outer rotary elements that are positioned adjacent to the first and second outer rotary elements, respectively, are connected to the left and right output shafts, respectively. Furthermore, the central rotary element located at the central portion of the collinear chart is connected to the engine. Further, in the above-described variations, to cause the relationship of connections between the first and second rotors, and so forth to hold, it is sometimes required to set the relationship between the numbers of the gear teeth of the gears to a relationship different from the relationship expressed by the above-mentioned equations (21) and (22).

Further, although in the sixth embodiment, in a collinear chart indicating the relationship between the rotational speeds, the distances from the carrier 91 to the second and first ring gears R2E and R1E are equal to each other, they may be made different from each other. In this case, the above-mentioned equation (22) is not required to hold between the numbers of gear teeth of the first and second pinion gears and the numbers of gear teeth of the first and second ring gears, and therefore, the degree of freedom of setting thereof is increased, which makes it possible to set the numbers of gear teeth of the gears such that the above-described first and second lever ratios become equal to each other.

Further, although in the first to sixth embodiments, the first to third gears of the present invention are formed by the first to third ring gears R1 to R3, R1A to R3A, R1B to R3B, R1C to R3C, R1D to R3D and R1E to R3E, respectively, and the fourth gear is formed by the sun gears S, SA, SB, SC, SD, and SE, respectively, the first to fourth gears may be formed as follows: At least one of the first to third gears may be formed by at least one of the first to third sun gears associated with the first to third pinion gears, and the fourth gear may be formed by one of the first to third sun gears and the first to third ring gears, other than the first to third gears. In this case, although the number of the additional pinion gears can be set as desired, it is preferable to set it to a number equal to or smaller than three so as to obtain the above-described advantageous effects (downsizing and so forth of the power plant) provided by the present invention.

Figure 18:
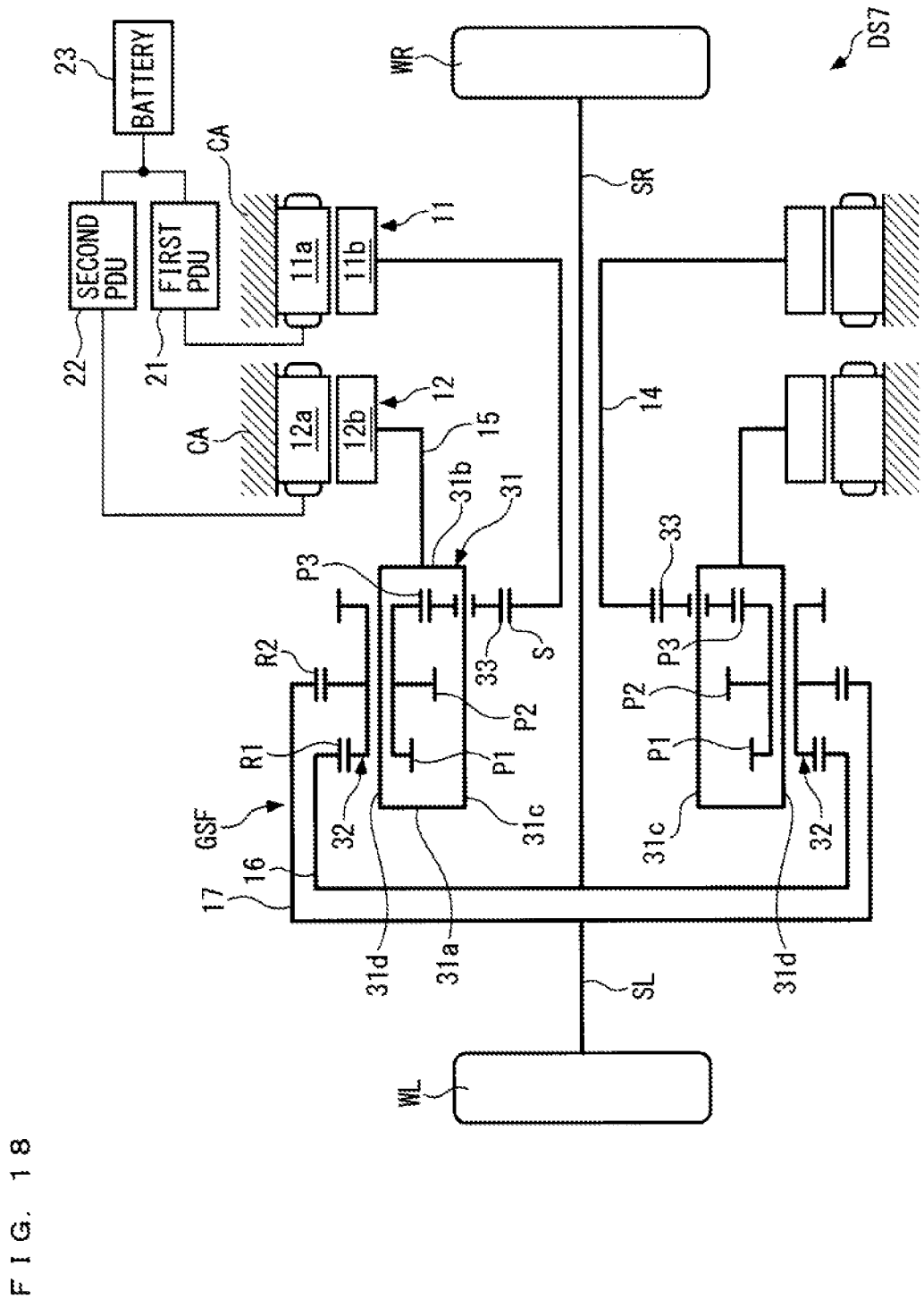
FIG. 18 A skeleton diagram, of a power plant etc. according to a seventh embodiment of the present invention.
Figure 19:
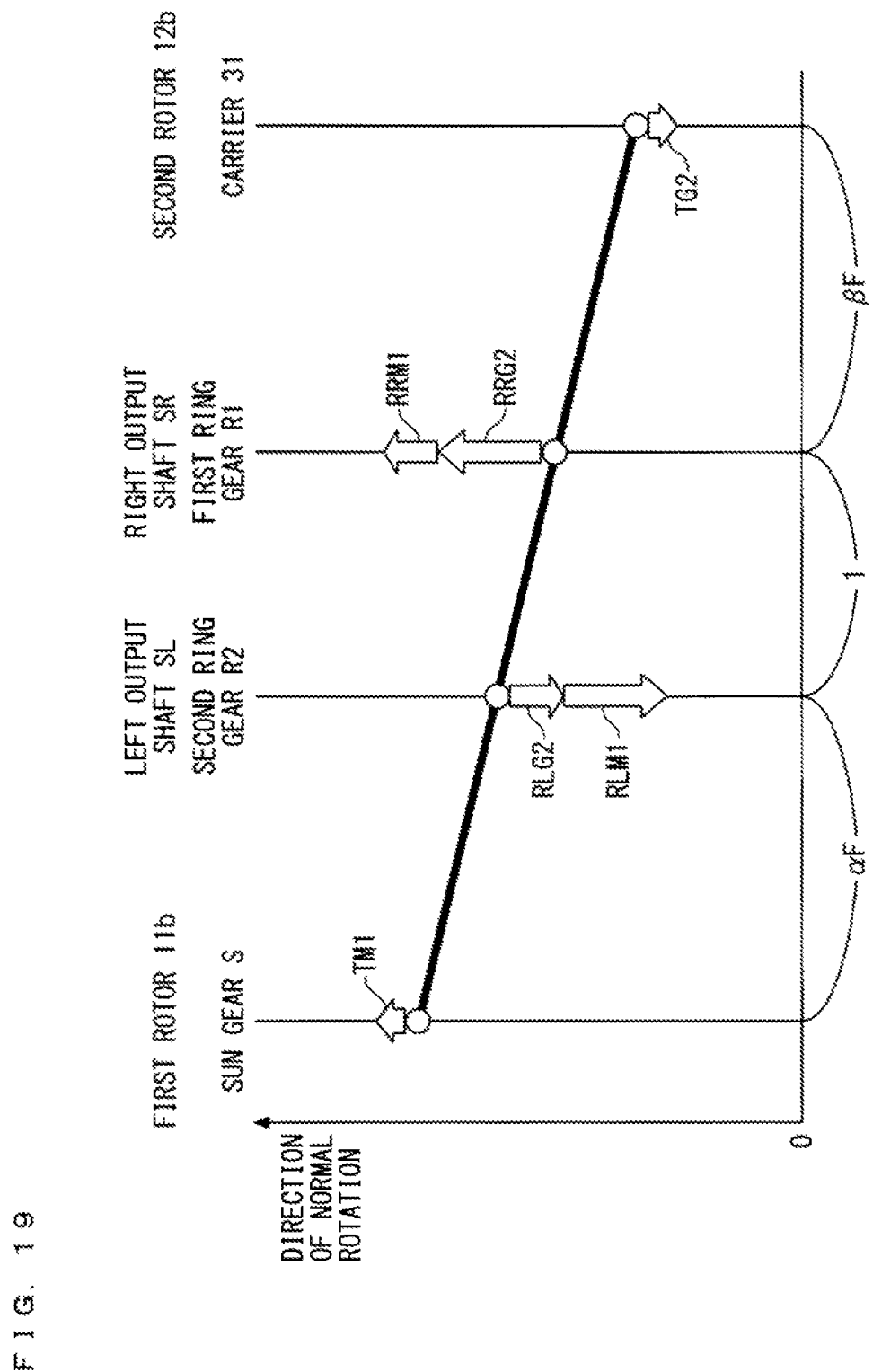
FIG. 19 A collinear chart showing a rotational speed relationship and a torque balance relationship between various types of rotary elements of the power plant shown in FIG. 18.

Next, a power plant according to a seventh embodiment of the present invention will be described with reference to FIGS. 18 and 19. Compared with the first embodiment, this power plant is mainly different in that the engine and the transmission (neither of which is shown) are connected not to the left and right front wheels WL and WR but to left and right rear wheels of the vehicle, via a distribution system DS7. In FIGS. 18 and 19, the same component elements as those of the first embodiment are denoted by the same reference numerals. The following description is given mainly of different points of the power plant according to the seventh embodiment from the first to sixth embodiments.

As shown in FIG. 18, differently from the differential gear unit GS according to the first embodiment, a differential gear unit GSF of the distribution system DS7 does not include the third ring gear R3, the sun gear S is provided, in a manner associated with not the first pinion gears P1 but the third pinion gears P3, radially inward of the third pinion gears P3, and the additional pinion gears 33 are in mesh with not the first pinion gears P1 but both the third pinion gears P3 and the sun gear S.

Further, the numbers ZP1 and ZP2 of gear teeth of the first and second pinion gears P1 and P2, and the numbers ZR1 and ZP2 of gear teeth of the first and second ring gears R1 and R2 are set such that the following equation (25) holds therebetween.

$$ZR1/ZP1>ZR2/ZP2 \tag{25}$$

In the power plant constructed as above, since the differential gear unit GSF is constructed as described above, the sun gear S, the second ring gear R2, the first ring gear R1, and the carrier 31 can transmit motive power therebetween, and the rotational speeds thereof are in a collinear relationship. Further, When the sun gear S is rotated in a state in which the carrier 31 is fixed, the first and second ring gears R1 and R2 rotate in the same direction as the direction of rotation of the sun gear S. In this case, from the relationship between the numbers of gear teeth of the gears, the relationship of "the rotational speed of the sun gear S>the rotational speed of the second ring gear R1>the rotational speed of the first ring gear R2" holds between the rotational speeds of the sun gear S and the first and second ring gears R1 and R2. From the above, in a collinear chart indicating the relationship between the rotational speeds, the sun gear S, the second ring gear R2, the first ring gear R1, and the carrier 31 are depicted in this order.

Further, the relationship of connections between the sun gear S, the second ring gear R2, the first ring gear R1, and the carrier 31, and the first rotor 11b, the left and right output shafts SL and SR and the second rotor 12b is the same as the relationship of connections therebetween according to the first embodiment. From the above, a rotational speed relationship between various types of rotary elements of the power plant is expressed e.g. in a collinear chart shown in FIG. 19. As is apparent from FIG. 19, the left and right output shafts SL and SR can be differentially rotated with each other.

Further, in FIG. 19, αF and βF represent a first lever ratio and a second lever ratio (torque ratio, speed ratio) respectively, and are expressed by the following equations (26) and (27):

$$\alpha F = ZR1\ (ZR2 \times ZP3 - ZS \times ZP2)/ZS\ (ZR1 \times ZP2 - ZR2 \times ZP1) \quad (26)$$

$$\beta F = ZR2 \times ZP1/(ZR1 \times ZP2 - ZR2 \times ZP1) \quad (27)$$

The numbers ZR1 and ZR2 of gear teeth of the first and second ring gears R1 and R2, the numbers ZP1 to ZP3 of gear teeth of the first to third pinion gears P1 to P3, and the number ZS of the gear teeth of the sun gear S are set such that the first and second lever ratios αF and βF become equal to each other and take relatively large values not only on condition that the above-mentioned equation (25) holds, but also on condition that one of the first and second rotors 11b and 12b does not perform reverse rotation within a range in which the left and right front wheels WL and WR can be differentially rotated with each other.

Further, as is apparent from a comparison between FIG. 19 and FIGS. 4 to 7, the distribution system DS7 performs operation in the same manner as the distribution system DS1 according to the first embodiment. Detailed description thereof is omitted.

Further, the correspondence between various elements of the seventh embodiment and the various elements of the present invention is as follows: The sun gear S of the seventh embodiment corresponds to the third gear and the first outer rotary element of the present invention, and the carrier 31 of the seventh embodiment corresponds to the second outer rotary element of the present invention. Further, the second ring gear R2 of the seventh embodiment corresponds to the second gear and the first quasi-outer rotary element of the present invention, and the first ring gear R1 of the seventh embodiment corresponds to the first gear and the second quasi-outer rotary element of the present invention.

As described above, according to the seventh embodiment, the differential gear unit GSF is formed by the carrier 31, the triple pinion gear 32 comprised of the first to third pinion gears P1 to P3 integrally formed with each other, the sun gear S, the first and second ring gears R1 and R2, and the additional pinion gear 33 (FIG. 18). Further, the sun gear S, the second ring gear R2, the first ring gear R1, and the carrier 31 form the four rotary elements, and these four rotary elements are in a collinear relationship in which they are aligned in a single straight line in the collinear chart in the mentioned order (FIG. 19). As described hereinabove, a differential gear unit equivalent to the differential gear unit of the power plant disclosed in PTL 1 can be formed by the carrier 31, the triple pinion gear 32, the sun gear S, the first and second ring gears R1 and R2, and the additional pinion gear 33, whereby the power plant can be formed by the six component parts in total which is smaller in number than the number (ten) of the component parts of the power plant disclosed in PTL 1. Therefore, it is possible to reduce the number of component parts of the whole power plant, thereby making it possible to attain downsizing, weight reduction, and manufacturing cost reduction of the power plant.

Further, the sun gear S and the carrier 31, which are positioned on opposite outer sides of the collinear chart, respectively, are mechanically connected to the first and second rotating electric machines 11 and 12 (the first and second rotors 11b and 12b) respectively, and the second and first ring gears R2 and R1 that are positioned adjacent to the sun gear S and the carrier 31, respectively, are mechanically connected to the left and right output shafts SL and SR, respectively. With this, similar to the first embodiment, it is possible to transmit rotational energy output from the first and second rotating electric machines 11 and 12 to the left and right output shafts SL and SR via the differential gear unit GSF, and properly drive the two SL and SR, and by controlling input and output of rotational energy to and from the first and second rotating electric machines 11 and 12, it is possible to properly control rotational energy (torque) distributed to the left and right output shafts SL and SR.

Further, similar to the first embodiment, not the sun gear S but the second and first ring gears R2 and R1 are mechanically connected to the left and right output shafts SL and SR, respectively. Therefore, it is possible to set the tooth widths of the first and second ring gears R1 and R2 to relatively small values, whereby it is possible to further downsize the power plant. For the same reason, it is possible to downsize the bearings supporting the first and second pinion gears P1 and P2, which also makes it possible to attain further downsizing of the power plant.

Further, differently from the seventh embodiment, in a case where a double pinion gear comprised of first and second pinion gears integrally formed with each other is used in place of the triple pinion gear 32, an additional pinion gear is brought into mesh with one of the first and second pinion gears. (hereinafter referred to as the "one pinion gear"), and the four rotary elements are formed by the carrier, the sun gear, and the first and second ring gears, there occurs the following inconvenience: To bring the gears into mesh with each other, it is required to dispose the sun gear, the additional pinion gear, the one pinion gear, and one of the first and second ring gears (hereinafter referred to as the "one ring gear") with which the one pinion gear is brought into mesh, such that they are radially aligned on the same plane. Therefore, there is some degree of limitation on setting of the tooth numbers of the sun gear and the one ring gear. Further, in the collinear chart, the distance from the carrier to the one ring gear is determined by a gear ratio between the one pinion gear and the one ring gear, and the distance from the carrier to the sun gear is determined by a gear ratio between the one pinion gear and the sun gear. As described above, the number of gear teeth of the one pinion gear has effect on the position of the sun gear and the position of the one ring gear with respect to the carrier in the collinear chart. From the above, in the case where the double pinion gear is used, the degree of freedom of setting of the positional relationship between the sun gear and the one ring gear with respect to the carrier in the collinear chart is lowered. Such an inconvenience similarly occurs also when one of the first and second ring gears is formed as a sun gear, and the four rotary elements are formed by two sun gears, a carrier, and one ring gear, in the case where the double pinion gear is used.

On the other hand, according to the seventh embodiment, the first to third pinion gears P1 to P3 of the triple pinion gear 32 are in mesh with the first ring gear R1, the second ring gear R2, and the additional pinion gears 33, respectively. As a consequence, in the collinear chart, the distance from the carrier 31 to the first ring gear R1 is determined by a gear ratio between the first pinion gear P1 and the first ring gear R1, the distance from the carrier 31 to the second ring gear R2 is determined by a gear ratio between the second pinion gear P2 and the second ring gear R2, and the distance from the carrier 31 to the sun gear S is determined by a gear ratio between the third pinion gear P3 and the sun gear S. As described above, differently from the above-described case where the double pinion gear is used, the numbers of gear teeth of the first to third pinion gears P1 to P3 have effect only the positions of the first ring gear R1, the second ring gear R2, and the sun gear S with respect to the carrier 31 in the collinear chart, but do not have effect on the positions of two of the three gears R1, R2, and S. Therefore, in the collinear chart, it is possible to increase the degree of freedom of setting of the positional relationship between the sun gear S and the first and second ring gears R1 and R2 with respect to the carrier 31.

Note that although in the seventh embodiment, the sun gear S and the carrier 31 are connected to the first and second rotors 11b and 12b, respectively, and the second and first ring gears R2 and R1 are connected to the left and right output shafts SL and SR, respectively, inversely, the carrier and the sun gear may be connected to the first and second rotors, respectively, and the first and second ring gears may be connected to the left and right output shafts, respectively. Further, although in the seventh embodiment, the sun gear S is provided in a manner associated with the third pinion gear P3, and the additional pinion gear 33 is brought into mesh with the sun gear S and the third pinion gear P3, the sun gear may be provided in a manner associated with the first or second pinion gear, and the additional pinion gear may be brought into mesh with one of the first and second pinion gears, with which the sun gear is associated, and the sun gear.

Furthermore, although in the seventh embodiment, the number of the additional pinion gear 33 is one, it may be two or more. However, to obtain the advantageous effects provided by the present invention, the number is preferable to be two or less. In a case where two additional pinion gears are provided, the other additional pinion gear is brought into mesh with both of the first pinion gear and the first ring gear, or alternatively both of the second pinion gear and the second ring gear. Further, although in the seventh embodiment, the first and second gears of the present invention are formed by the first and second ring gears R1 and R2, respectively, at least one of the first and second gears may be formed by at least one of the first and second sun gears, associated with the at least one of the first and second gears. Furthermore, although in the seventh embodiment, the third gear of the present invention is formed by the sun gear S, it may be formed by the third ring gear associated with the third pinion gear. Although in any of the above-described variations, the number of additional pinion gears can be set as desired, the number is preferably two or less in order to obtain the advantageous effects provided by the present invention.

Note that the present invention is by no means limited to the above-described first to seventh embodiments (hereinafter, collectively referred to as the "embodiments"), but can be practiced in various forms. For example, although in the embodiments, the two driven parts of the present invention are the left and right output shafts SL and SR connected to the respective left and right front wheels WL and WR to which the engine 3 and the transmission 4 are connected, the two driven parts may be left and right output shafts connected to the respective left and right rear wheels of the vehicle, to which the engine 3 and the transmission 4 are not connected, or front and rear output shafts connected to the front wheels and the rear wheels of the vehicle, respectively. Further, although in the embodiments, the first and second energy input/output units of the present invention are the first and second rotating electric machines 11 and 12, they may be replaced by any other suitable device, such as a hydraulic motor, which can input and output rotational energy. Furthermore, although in the embodiments, AC motors are used as the first and second rotating electric machines 11 and 12, any other suitable device, such as a DC motor, may be used which can perform energy conversion between rotational energy and electric energy.

Further, although in the embodiments, the battery 23 is shared by the first and second rotating electric machines 11 and 12, batteries may be provided separately. Furthermore, although in the embodiments, electric power regenerated by the first and second rotating electric machines 11 and 12 is charged into the battery 23, the electric power may be charged into a capacitor. Alternatively, any other rotating electric machine than the first and second rotating electric machines 11 and 12, and a flywheel connected to the other rotating electric machine may be used to convert the electric power regenerated by the first and second rotating electric machines 11 and 12 to motive power using the other rotating electric machine, and accumulate the motive power obtained by the conversion in the flywheel as kinetic energy. Alternatively, the electric power regenerated by the first and second rotating electric machines 11 and 12 may be directly supplied to another rotating electric machine or an actuator. Alternatively, a hydraulic motor capable of converting rotational energy to pressure energy as described above may be used in place of the first and second rotating electric machines 11 and 12, and the pressure energy obtained by the conversion by the hydraulic motor may be accumulated in the accumulator.

Further, although in the embodiments, the engine (3), which is a gasoline engine, is used as an energy output device of the present invention, any other suitable device which can output rotational energy, such as a diesel engine, an LPG engine, a CNG (Compressed Natural Gas) engine, an external combustion engine, or a hydraulic motor, may be used. Alternatively, any other suitable device which can not only output rotational energy but also input rotational energy, such as a rotating electric machine, may be used. Further, although in the embodiments, the engine (3) is used as a motive power source of the power plant, it is to be understood that the engine may be omitted. Further, although the embodiments are examples in which the power plant of the present invention is applied to a vehicle it the present invention is not limited to this, but it may be applied, e.g. to boats or aircrafts. It is to be further understood that various changes and modifications may be made without departing from the spirit and scope thereof.

REFERENCE SIGNS LIST

V vehicle (means of transportation)
SL left output shaft (driven part)
SR right output shaft (driven part)
3 engine (energy output unit)
GS differential gear unit
11 first rotating electric machine (first energy input/output unit)

12 second rotating electric machine (second energy input/output unit)
S sun gear (fourth gear, third gear, first outer rotary element)
31 carrier (second outer rotary element)
32 triple pinion gear
P1 first pinion gear
P2 second pinion gear
P3 third pinion gear
33 additional pinion gear
R1 first ring gear (first gear, second quasi-outer rotary element)
R2 second ring gear (second gear, first quasi-outer rotary element)
R3 third ring gear (third gear, central rotary element)
GSA differential gear unit.
SA sun gear (fourth gear, second outer rotary element)
51 carrier (central rotary element)
52 triple pinion gear
P1A first pinion gear
P2A second pinion gear
P3A third pinion gear
53 additional pinion gear
R1A first ring gear (first gear, first outer rotary element)
R2A second ring gear (second gear second quasi-outer rotary element)
R3A third ring gear (third gear, first quasi-outer rotary element)
GSB differential gear unit
SB sun gear (fourth gear, first outer rotary element)
61 carrier (second quasi-outer rotary element)
62 triple pinion gear
P1B first pinion gear
P2B second pinion gear
P3B third pinion gear
63 first additional pinion gear (additional pinion gear)
64 second additional pinion gear (additional pinion gear)
R1B first ring gear (first gear, first quasi-outer rotary element)
P2B second ring gear (second gear, second outer rotary element)
R3B third ring gear (third gear, central rotary element)
GSC differential gear unit
SC sun gear (fourth gear, second outer rotary element)
71 carrier (first quasi-outer rotary element)
72 triple pinion gear
P1C first pinion gear
P2C second pinion gear
P3C third pinion gear
73 first additional pinion gear (additional pinion gear)
74 second additional pinion gear (additional pinion gear)
R1C first ring gear (first gear, central rotary element)
R2C second ring gear (second gear, first outer rotary element)
R3C third ring gear (third gear, second quasi-outer rotary element)
GSD differential gear unit
SD sun gear (fourth gear, first outer rotary element)
81 carrier (second outer rotary element)
82 triple pinion gear
P1D first pinion gear
P2D second pinion gear
P3D third pinion gear
83 first additional pinion gear (additional pinion gear)
84 second additional pinion gear (additional pinion gear)
85 third additional pinion gear (additional pinion gear)
R1D first ring gear (first gear, second quasi-outer rotary element)
R2D second ring gear (second gear, first quasi-outer rotary element)
R3D third ring gear (third gear, central rotary element)
GSE differential gear unit
SE sun gear (fourth gear, second outer rotary element)
91 carrier (central rotary element)
92 triple pinion gear
P1B first pinion gear
P2E second pinion gear
P3E third pinion gear
93 first additional pinion gear (additional pinion gear)
94 second additional pinion gear (additional pinion gear)
95 third additional pinion gear (additional pinion gear)
R1E first ring gear (first gear, second quasi-outer rotary element)
R2E second ring gear (second gear, first quasi-outer rotary element)
R3E third ring gear (third gear, first outer rotary element)
GSF differential gear unit

The invention claimed is:
1. A power plant for driving two driven parts for propelling a means of transportation, comprising:
  a first energy input/output unit that is capable of inputting and outputting rotational energy;
  a second energy input/output unit that is capable of inputting and outputting rotational energy;
  a differential gear unit,
  wherein said differential gear unit includes:
  a rotatable carrier;
  a triple pinion gear that is formed by a first pinion gear, a second pinion gear, and a third pinion gear which are externally-toothed gears integrally formed with each other, and is rotatably supported by said carrier;
  a first gear that is one of a first sun gear which is formed by an externally-toothed gear and is provided, in a manner associated with said first pinion gear, radially inward of said first pinion gear, and a first ring gear which is formed by an internally-toothed gear and is provided, in a manner associated with said first pinion gear, radially outward of said first pinion gear;
  a second gear that is one of a second sun gear which is formed by an externally-toothed gear and is provided, in a manner associated with said second pinion gear, radially inward of said second pinion gear, and a second ring gear which is formed by an internally-toothed gear and is provided, in a manner associated with said second pinion gear, radially outward of said second pinion gear;
  a third gear that is one of a third sun gear which is formed by an externally-toothed gear and is provided, in a manner associated with said third pinion gear, radially inward of said third pinion gear, and a third ring gear which is formed by an internally-toothed gear and is provided, in a manner associated with said third pinion gear, radially outward of said third pinion gear; and
  an additional pinion gear that is in mesh with at least one of said first to third pinion gears, and one of said first to third gears associated with the at least one, said additional pinion gear being rotatably supported by said carrier,
  wherein said first pinion gear is in mesh with said first gear, when said additional pinion gear is not in mesh with either of said first pinion gear and said first gear, wherein said second pinion gear is in mesh with said second gear, when said additional pinion gear is not in mesh with either of said second pinion gear and said second gear, wherein said third pinion gear is in mesh with said third gear, when said additional pinion gear is not in mesh with either of said third pinion gear and said third gear, wherein rotational speeds of four rotary elements formed by said carrier and said first to third gears satisfy a collinear relationship in which the rotational speeds are aligned in a single straight line in a collinear chart, and wherein out of said four rotary elements, first and second outer rotary elements that are positioned at opposite outer sides of the straight line in the collinear chart, respectively, are mechanically connected to said first and second energy input/output units, respectively, and first and second quasi-outer rotary elements that are positioned adjacent to said first and second outer rotary elements, respectively, are mechanically connected to one and the other of the two driven parts, respectively.

2. The power plant according to claim 1, wherein said differential clear unit further includes a fourth gear that is one of said first to third sun gears and said first to third ring gears, other than said first to third gears, wherein said additional pinion gear is in mesh with the at least one of said first to third pinion gears, and said first to fourth gears associated with the at least one, wherein one of said first to third pinion gears, with which said fourth gear is associated, is in mesh with said fourth gear, when said additional pinion gear is not in mesh with either of the one of said first to third pinion gears and said fourth gear, wherein rotational speeds of five rotary elements formed by said carrier and said first to fourth gears satisfy a collinear relationship in which the rotational speeds are aligned in a single straight line in a collinear chart, and wherein out of said five rotary elements, said first and second outer rotary elements are mechanically connected to said first and second energy input/output units, respectively, and said first and second quasi-outer rotary elements are mechanically connected to the one and the other of the two driven parts, respectively.

3. The power plant according to claim 2, further including an energy output unit that is capable of outputting rotational energy and is provided separately from said first and second energy input/output units, and wherein a central rotary element which is a rotary element other than said first and second outer rotary elements and said first and second quasi-outer rotary elements of said five rotary elements is mechanically connected to said energy output unit.

4. The power plant according to claim 1, wherein said first and second quasi-outer rotary elements are one and another of said carrier and said first to third ring gears, as one and another of said carrier and said first to third gears.

5. The power plant according to claim 2, wherein said first and second quasi-outer rotary elements are one and another of said carrier and said first to third ring gears, as one and another of said carrier and said first to third gears.

6. The power plant according to claim 3, wherein said first and second quasi-outer rotary elements are one and another of said carrier and said first to third ring gears, as one and another of said carrier and said first to third gears.

* * * * *